(12) United States Patent  
Pinto et al.

(10) Patent No.: US 10,372,442 B2
(45) Date of Patent: Aug. 6, 2019

(54) METHOD AND SYSTEM FOR GENERATING A VIEW INCORPORATING SEMANTICALLY RESOLVED DATA VALUES

(71) Applicant: ThoughtWire Holdings Corp., Toronto (CA)

(72) Inventors: Ryan Evaristo Pinto, Toronto (CA); Stephen Paul Owens, Caledon (CA); Michael Lorne Monteith, Toronto (CA)

(73) Assignee: THOUGHTWIRE HOLDINGS CORP., Toronto, ON (CA)

( * ) Notice: Subject to any disclaimer, the term of this patent is extended or adjusted under 35 U.S.C. 154(b) by 113 days.

(21) Appl. No.: 14/165,217

(22) Filed: Jan. 27, 2014

(65) Prior Publication Data
US 2014/0281909 A1 Sep. 18, 2014

Related U.S. Application Data

(63) Continuation-in-part of application No. 13/967,643, filed on Aug. 15, 2013, and a continuation-in-part of
(Continued)

(51) Int. Cl.
*G06F 9/44* (2018.01)
*G06F 15/16* (2006.01)
(Continued)

(52) U.S. Cl.
CPC ............ *G06F 8/71* (2013.01); *G06F 9/45529* (2013.01); *G06F 16/958* (2019.01)

(58) Field of Classification Search
CPC ............................ G06F 17/30076; G06F 8/71
(Continued)

(56) References Cited

U.S. PATENT DOCUMENTS 6,292,804 B1 9/2001 Ardoin et al.
6,732,331 B1 * 5/2004 Alexander ............ G06F 17/218
715/234

(Continued)

FOREIGN PATENT DOCUMENTS

EP 2650832 A1 10/2013

OTHER PUBLICATIONS

Search Report for corresponding EP Patent Application No. 14275068. 6, dated Apr. 1, 2015.
(Continued)

*Primary Examiner* — Kevin T Bates
*Assistant Examiner* — Golam Mahmud
(74) *Attorney, Agent, or Firm* — Kagan Binder, PLLC

(57) ABSTRACT

A method and system for generating a view is provided. A first set of declarations in a metadata data model retrieved from a view definition are stored in storage of a computer system. The first set of declarations are static. A second set of declarations in the metadata data model that are associated with the first set of declarations are stored in the storage. At least one request for a set of requested data is resolved to a subset of the first set of declarations and the second set of declarations using semantic descriptions provided for the first and second sets of declarations and the requested data. A view rendered from the subset of the first set of declarations and the second set of declarations is updated whenever the second set of declarations is updated.

44 Claims, 51 Drawing Sheets

Related U.S. Application Data application No. 13/804,168, filed on Mar. 14, 2013, now Pat. No. 9,742,843.

(51) Int. Cl.
*G06F 8/71* (2018.01)
*G06F 9/455* (2018.01)
*G06F 16/958* (2019.01)

(58) Field of Classification Search
USPC ......................................................... 709/204
See application file for complete search history.

(56) References Cited

U.S. PATENT DOCUMENTS

| | | | |
|---|---|---|---|
| 7,526,481 B1 | 4/2009 | Cusson et al. | |
| 7,675,529 B1* | 3/2010 | Brunner | G06F 17/211 345/660 |
| 7,680,820 B2 | 3/2010 | Denoue et al. | |
| 7,853,618 B2 | 12/2010 | Yuan et al. | |
| 7,934,207 B2* | 4/2011 | Gustafsson | G06F 16/258 717/143 |
| 7,971,179 B2 | 6/2011 | Venolia | |
| 8,296,362 B2 | 10/2012 | Roberts et al. | |
| 8,301,660 B2 | 10/2012 | Yalamanchi | |
| 9,244,965 B2 | 1/2016 | Monteith et al. | |
| 2001/0018648 A1* | 8/2001 | Turner | G06F 8/36 703/22 |
| 2002/0010744 A1 | 1/2002 | Prell et al. | |
| 2003/0074352 A1 | 4/2003 | Raboczi et al. | |
| 2003/0105746 A1 | 6/2003 | Stickler | |
| 2003/0236820 A1 | 12/2003 | Tierney et al. | |
| 2004/0015426 A1 | 1/2004 | Tadayon et al. | |
| 2004/0044866 A1* | 3/2004 | Casazza | G06F 12/1466 711/163 |
| 2004/0049697 A1 | 3/2004 | Edwards, Jr. et al. | |
| 2004/0148333 A1 | 7/2004 | Manion et al. | |
| 2004/0221053 A1 | 11/2004 | Codella et al. | |
| 2004/0243531 A1 | 12/2004 | Dean | |
| 2005/0021523 A1 | 1/2005 | Farag | |
| 2005/0044063 A1 | 2/2005 | Barsness et al. | |
| 2005/0055211 A1 | 3/2005 | Claudatos et al. | |
| 2005/0060342 A1 | 3/2005 | Farag | |
| 2005/0066118 A1 | 3/2005 | Perry et al. | |
| 2005/0149852 A1* | 7/2005 | Bleicher | G06F 19/325 715/206 |
| 2005/0165719 A1 | 7/2005 | Greenspan et al. | |
| 2005/0202392 A1 | 9/2005 | Allen et al. | |
| 2006/0004847 A1 | 1/2006 | Claudatos et al. | |
| 2006/0117073 A1 | 6/2006 | Bosworth et al. | |
| 2006/0178910 A1 | 8/2006 | Eisenberger et al. | |
| 2006/0190455 A1 | 8/2006 | Braddy et al. | |
| 2006/0248200 A1 | 11/2006 | Stanev | |
| 2007/0011147 A1 | 1/2007 | Falkenberg | |
| 2007/0022107 A1 | 1/2007 | Yuan et al. | |
| 2007/0033109 A1 | 2/2007 | Patten et al. | |
| 2007/0033142 A1 | 2/2007 | Patten et al. | |
| 2007/0088831 A1 | 4/2007 | Pallamreddy et al. | |
| 2007/0124291 A1 | 5/2007 | Hassan et al. | |
| 2007/0150480 A1* | 6/2007 | Hwang | G06Q 10/00 |
| 2007/0180122 A1 | 8/2007 | Barrett | |
| 2007/0186028 A2* | 8/2007 | Kissell | G06F 9/30043 711/1 |
| 2007/0240055 A1 | 10/2007 | Ting et al. | |
| 2007/0255788 A1* | 11/2007 | Troung | G06Q 10/10 709/205 |
| 2007/0277148 A1 | 11/2007 | Venolia | |
| 2008/0040308 A1 | 2/2008 | Ranganathan et al. | |
| 2008/0044063 A1 | 2/2008 | Ranganathan et al. | |
| 2008/0046803 A1* | 2/2008 | Beauchamp | G06Q 10/00 715/212 |
| 2008/0059500 A1 | 3/2008 | Syemns | |
| 2008/0082612 A1 | 4/2008 | Declerck | |
| 2008/0134207 A1* | 6/2008 | Chamieh | G06F 11/3419 719/315 |
| 2008/0198871 A1 | 8/2008 | Shahidi et al. | |
| 2008/0208676 A1 | 8/2008 | Williams et al. | |
| 2008/0215580 A1 | 9/2008 | Altinel | |
| 2008/0224407 A1 | 10/2008 | Kuo et al. | |
| 2008/0256253 A1 | 10/2008 | Branson et al. | |
| 2008/0313229 A1* | 12/2008 | Taswell | G06Q 20/208 |
| 2008/0313296 A1 | 12/2008 | Muller | |
| 2008/0320417 A1 | 12/2008 | Begley et al. | |
| 2009/0006627 A1 | 1/2009 | Castellucci et al. | |
| 2009/0030982 A1* | 1/2009 | Spivack | G06Q 10/087 709/204 |
| 2009/0132556 A1* | 5/2009 | Gupta | G06F 8/35 |
| 2009/0144365 A1 | 6/2009 | Korat | |
| 2009/0189915 A1* | 7/2009 | Mercer | G06F 9/451 345/646 |
| 2009/0216714 A1 | 8/2009 | Gonzalez et al. | |
| 2009/0265464 A1 | 10/2009 | Jakobson | |
| 2009/0327502 A1 | 12/2009 | Brewer | |
| 2010/0131868 A1 | 5/2010 | Chawla et al. | |
| 2010/0179836 A1 | 7/2010 | Hasan et al. | |
| 2011/0040846 A1 | 2/2011 | Weinryb et al. | |
| 2011/0098056 A1 | 4/2011 | Rhoads et al. | |
| 2011/0131119 A1 | 6/2011 | Ernst | |
| 2011/0138446 A1 | 6/2011 | Barrett et al. | |
| 2011/0179110 A1* | 7/2011 | Soloway | G06Q 10/06 709/203 |
| 2011/0209138 A1 | 8/2011 | Monteith et al. | |
| 2011/0246530 A1* | 10/2011 | Malafsky | G06N 5/022 707/794 |
| 2011/0296043 A1 | 12/2011 | Sutton et al. | |
| 2011/0314387 A1 | 12/2011 | Gold et al. | |
| 2011/0314388 A1 | 12/2011 | Wheatley | |
| 2012/0232929 A1 | 9/2012 | Experton | |
| 2012/0290940 A1* | 11/2012 | Quine | G06F 16/212 715/744 |
| 2012/0310900 A1 | 12/2012 | Monteith | |
| 2013/0097086 A1 | 4/2013 | Dala et al. | |
| 2013/0151301 A1 | 6/2013 | Robb | |
| 2013/0268357 A1 | 10/2013 | Heath | |
| 2013/0318347 A1 | 11/2013 | Moffat | |
| 2014/0047498 A1 | 2/2014 | Malegeonkar et al. | |
| 2015/0213411 A1 | 7/2015 | Swanson et al. | |

OTHER PUBLICATIONS

Office Action for U.S. Appl. No. 13/804,168, dated Feb. 3, 2015.
Office Action for U.S. Appl. No. 13/578,552, dated Mar. 13, 2015.
Search Report for corresponding UK Patent Application No. GB1404645.2, dated Sep. 26, 2014.
Search Report for corresponding UK Patent Application No. GB1404638.7, dated Sep. 22, 2014.
Office action for U.S. Appl. No. 12/710,099, dated Jan. 5, 2015.
Office Action for U.S. Appl. No. 13/804,168, dated Feb. 2, 2015.
International Search Report for PCT/CA2011/050020, dated Feb. 14, 2011.
Office Action for U.S. Appl. No. 13/578,552, dated Jul. 25, 2014.
Office action for U.S. Appl. No. 12/710,099, dated Aug. 26, 2013.
Google, "Gadget-to-Gadget Communication (Deprecated)", http://code.google.com/apis/gadgets/docs/pubsub.html.
Expressor Software, "expressor data integration products", http://www.expressor-software.com/products-overview.htm.

* cited by examiner

1204 { @base            <http://thoughtwire.ca/ont/templates/1.0.0/> .

1208 {
@prefix rdfs:   <http://www.w3.org/2000/01/rdf-schema#> .
@prefix rdf:    <http://www.w3.org/1999/02/22-rdf-syntax-ns#> .
@prefix twd:    <http://thoughtwire.ca/ontology/2009/12/Directory#> .
@prefix twch:   <http://thoughtwire.ca/ontology/2010/10/ContentHost#> .
@prefix twconn: <http://thoughtwire.ca/ontology/2011/05/Connector#> .
}

1212 {
<SimpleFields>
    a     twd:Collaboration ;
    twd:Extends
        <http://thoughtwire.ca/ontology/2012/09/InteractiveCollaboration> ;
    rdfs:comment
        "Simple fields collaboration that shows an extremely simple input field semantic form with multi-lingual support" ;
    rdfs:label
        "Simple Fields Collaboration" ;
}

1216 {
    twd:hasParticipant
        <SimpleFields/Participant> ,
        <SimpleFields/Master> ,
        <SimpleFields/User> ,
        <SimpleFields/Inventory> .
}

Figure 28

```
@base <http://thoughtwire.ca/ont/templates/1.0.0/> .

@prefix rdf: <http://www.w3.org/1999/02/22-rdf-syntax-ns#> .
@prefix rdfs: <http://www.w3.org/2000/01/rdf-schema#> .
@prefix twd: <http://thoughtwire.ca/ontology/2009/12/Directory#> .
@prefix twco: <http://thoughtwire.ca/ontology/2010/10/Collaboration#> .
@prefix twser: <http://thoughtwire.ca/ontology/2012/02/Server#> .
```

1220 {
```
<SimpleFields/Participant>
    a twd:CollaborationParticipant ;
    twd:Extends
        <http://thoughtwire.ca/ontology/2012/02/
InteractiveCollaborationParticipant> ;
    rdfs:label
        "Simple Fields: collaboration participant" ;
    rdfs:comment
        "Collaboration participant for simple fields." ;
```

1221 {
```
    twco:Form
        <SimpleFields/Master> ,
    twd:hasConsumeRequest
        <CollaborationParticipant/DirectoryInfo> .
```

1222 {
```
<CollaborationParticipant/DirectoryInfo>
    a twd:DirectorySparqlConsumeRequest ;
    rdf:value
"""
        PREFIX rdfs: <http://www.w3.org/2000/01/rdf-schema#>
        PREFIX twd:   <http://thoughtwire.ca/ontology/2009/12/
Directory#>
        PREFIX twco: <http://thoughtwire.ca/ontology/2010/10/
Collaboration#>
        PREFIX self: <http://thoughtwire.ca/ont/templates/1.0.0/
SimpleFields/Participant>
```

Figure 29A

```
CONSTRUCT {
    self: rdfs:label                      ?label .
    self: rdfs:comment                    ?comment .
    self: twd:hasConsumeRequest           ?cr .

self: twco:ConnectorUris              ?connectorUris .
    self: twco:WebParticipantUris         ?webParticipantUris .
    self: twco:BookmarkUri                ?bookmarkUri .
    self: twco:CommunicationError         ?communicationError .
    self: twco:HelpLink                   ?helpLink .
    self: twco:AppLink                    ?appLink .
    self: twco:Form                       ?form .
    self: twco:PollingStyle               ?pollingStyle .
    self: twco:WarnOnClose                ?warnOnClose .
    self: twco:CloseMessage               ?closeMessage .
}
WHERE {
    self: rdfs:label ?label .
    OPTIONAL { self: rdfs:comment                    ?comment } .
    OPTIONAL { self: twco:ConnectorUris              ?connectorUris } .
    OPTIONAL { self: twco:WebParticipantUris         ?webParticipantUris } .
    OPTIONAL { self: twco:BookmarkUri                ?bookmarkUri } .
    OPTIONAL { self: twco:CommunicationError         ?communicationError } .
    OPTIONAL { self: twco:HelpLink                   ?helpLink } .
    OPTIONAL { self: twco:AppLink                    ?appLink } .
    OPTIONAL { self: twco:Form                       ?form } .
    OPTIONAL { self: twco:PollingStyle               ?pollingStyle } .
    OPTIONAL { self: twco:WarnOnClose                ?warnOnClose } .
    OPTIONAL { self: twco:CloseMessage               ?closeMessage . }
    OPTIONAL {
        self: twd:hasConsumeRequest ?cr .
        {
            ?cr  a   twd:SparqlConsumeRequest .
        } UNION {
            ?cr  a   twd:SharingSparqlConsumeRequest .
        }
    }
}
```

```
@base <http://thoughtwire.ca/ont/templates/1.0.0/> .

@prefix rdf: <http://www.w3.org/1999/02/22-rdf-syntax-ns#> .
@prefix rdfs: <http://www.w3.org/2000/01/rdf-schema#> .
@prefix twd: <http://thoughtwire.ca/ontology/2009/12/Directory#> .
@prefix twform: <http://thoughtwire.ca/ontology/2010/10/Form#> .
@prefix twelem: <http://thoughtwire.ca/ontology/2010/10/Form/
Element#> .
@prefix frm:    <SimpleFields/Master#> .
```

1228
```
<SimpleFields/Master>
    a    twd:Participant ;
    rdfs:label
        "Simple Fields: Semantic Form" ;
    rdfs:comment
        "Simple Fields: Semantic Form participant." ;
    twd:hasConsumeRequest
        <SemanticForm/DirectoryInfo> ,
        <SemanticForm/Fields/DirectoryInfo> ,
        <SimpleFields/Master/Cr> ;
    twd:hasShareId
        <SimpleFields/Master/Share> ;
    twform:Field
        frm:form ,
        frm:stockLevelText ,
        frm:stockLevel ,
        frm:quantity ,
        frm:submit .
```

Figure 30A

```
<SimpleFields/Master/Cr>
        a                    twd:SparqlConsumeRequest ;
    rdfs:label
        "Retrieve stock level" ;
    rdfs:comment
        "Fetches the latest stock that's available in the context" ;
    twd:ConsumeRequestJsonMapping
    """
        BASE              <http://thoughtwire.ca/ont/templates/1.0.0/
1252    >

SELECT ?stockLevel

WHERE {
            ?subj    <SimpleFields/latestStockLevel>    ?stockLevel .
        }
    """ .
```

```
<SimpleFields/Master/Share>
        a twd:Share ;
    rdfs:label
        "Share the purchase quantity" ;
    rdfs:comment
        "Shares the desired quantity entered by the user" ;
    twd:hasPredicate
        <SimpleFields/itemQuantity> ;
    twd:ShareJsonMapping
    """
    @base <http://thoughtwire.ca/ont/templates/1.0.0/> .
        <SimpleFields/purchaseItem> <SimpleFields/itemQuantity> "(quantity)" .
    """ .
```

1252 brackets the first block; 1256 brackets the second block.

Figure 30C

```
<SemanticForm/DirectoryInfo>
    a    twd:DirectorySparqlConsumeRequest ;
    rdf:value
    """
    PREFIX twd:      <http://thoughtwire.ca/ontology/2009/12/Directory#>
    PREFIX twco:     <http://thoughtwire.ca/ontology/2010/10/Collaboration#>
    PREFIX twform:   <http://thoughtwire.ca/ontology/2010/10/Form#>
    PREFIX rdf:      <http://www.w3.org/1999/02/22-rdf-syntax-ns#>
    PREFIX self:     <http://thoughtwire.ca/ont/templates/1.0.0/SimpleFields/Master>

CONSTRUCT {
            self: twd:hasConsumeRequest              ?cr .

self: twd:hasDirectoryConsumeRequest     ?dcr .

self: twd:hasShareId                     ?shareId .

self: twform:FormLayout                  ?layout .
        }
        WHERE {
            OPTIONAL {
                self: twd:hasConsumeRequest ?cr .
                {
                    ?cr    a    twd:SparqlConsumeRequest .
                } UNION {
                    ?cr    a    twd:SharingSparqlConsumeRequest .
                }
            }

OPTIONAL {
                self: twd:hasConsumeRequest ?dcr .
                ?dcr a    twd:DirectorySparqlConsumeRequest .
            }

OPTIONAL { self: twd:hasShareId      ?shareId . }
            OPTIONAL { self: twform:FormLayout   ?layout . }
        }
    """ .
```

```
<SemanticForm/Fields/DirectoryInfo>
    a    twd:DirectorySparqlConsumeRequest ;
    twd:MultiGraph true;
    twd:ConsumeRequestJsonMapping
"""
    PREFIX rdf:       <http://www.w3.org/1999/02/22-rdf-syntax-ns#>
    PREFIX rdfs:   <http://www.w3.org/2000/01/rdf-schema#>

PREFIX twform:     <http://thoughtwire.ca/ontology/2010/10/Form#>
    PREFIX self:       <http://thoughtwire.ca/ont/templates/1.0.0/SimpleFields/Master>

SELECT ?field ?type ?label ?value ?classes ?readonly ?shareld ?layout
           ?format ?formatOption ?maxLength ?required ?cr ?dataVar ?classVar

WHERE {

OPTIONAL {
           GRAPH <http://thoughtwire.ca/ontology/2010/01/tw-context>
           {
                         ?prefLangSubj twd:lang1 ?lang1 .
           }
       }

GRAPH <http://thoughtwire.ca/ontology/2010/01/tw-local-directory>
       {
           self: twform:Field        ?field .
           ?field    a                       ?type .

OPTIONAL {   ?field rdfs:label              ?label1
                        FILTER ( fn:lower-case(lang(?label1)) = fn:lower-case(?lang1) )
                    }
```

Figure 30E

```
                    OPTIONAL {   ?field rdfs:label              ?label2
                                 FILTER ( lang(?label2) = "" )
                    }

OPTIONAL {   ?field rdf:value               ?value1
                                 FILTER ( fn:lower-case(lang(?value1)) =
fn:lower-case(?lang1) )
                    }
                    OPTIONAL {   ?field rdf:value               ?value2
                                 FILTER ( lang(?value2) = "" )
                    }

OPTIONAL { ?field twform:classes
       ?classes       . }
                    OPTIONAL { ?field twform:readonly
       ?readonly      . }
                    OPTIONAL { ?field twform:dataVar
       ?dataVar       . }
1264                OPTIONAL { ?field twform:classVar
       ?classVar               . }
                    OPTIONAL { ?field twform:cr
       ?cr                     . }
                    OPTIONAL { ?field twform:shareId
       ?shareId                . }
                    OPTIONAL { ?field twform:layout
       ?layout                  . }
                    OPTIONAL { ?field twform:format
       ?format                  . }
                    OPTIONAL { ?field twform:formatOption
       ?formatOption            . }
                    OPTIONAL { ?field twform:maxLength
       ?maxLength               . }
                    OPTIONAL { ?field twform:required
       ?required              . }
                    }

BIND ( str(COALESCE(?label1, ?label2 )) AS ?label )
                    BIND ( str(COALESCE(?value1, ?value2 )) AS ?value )

```
@base            <http://thoughtwire.ca/ont/templates/1.0.0/> .

@prefix rdf:   <http://www.w3.org/1999/02/22-rdf-syntax-ns#> .
@prefix rdfs: <http://www.w3.org/2000/01/rdf-schema#> .
@prefix twd:   <http://thoughtwire.ca/ontology/2009/12/Directory#> .
@prefix twser:     <http://thoughtwire.ca/ontology/2012/02/Server#> .
@prefix twconn:    <http://thoughtwire.ca/ontology/2011/05/
Connector#> .
```

1260 {
```
<SimpleFields/User>
        a      twd:Participant ;
        rdfs:comment
                "This form defines the user data." ;
        rdfs:label
                "REST Connector participant for user data" ;
        twconn:HttpServer
                twser:RestServer ;
        twconn:HttpsServer
                twser:RestServerSecure ;
        twd:hasConsumeRequest
                <SimpleFields/User/Lang> .
                <RestConnector/DirectoryInfo> ;
        twd:hasShareId
                <SimpleFields/User/Lang/Share> .
```

1264 {
```
<SimpleFields/User/Lang>
        a twd:SparqlConsumeRequest ;
        twd:MultiGraph           true;
        rdfs:label
                "Trigger get current user language preference" ;
        rdfs:comment
                "A CR to trigger the retrieval of the currently logged in user
language." ;
```

Figure 31A

1264
```
twd:notifySatisfiedOnly true ;
twconn:restEndpointServer
    twser:IdentityRestServer ;
twconn:restEndpointPath
    "/identity/lang" ;
twconn:httpMethod
    "GET" ;
twconn:parameters
""""
{ "subjectid" : "sso" }
"""" ;
twd:ConsumeRequestJsonMapping
""""
BASE <http://thoughtwire.ca/ont/templates/1.0.0/>
PREFIX twd: <http://thoughtwire.ca/ontology/2009/12/Directory#>

SELECT ?sso
    WHERE {
?sub <loaded> ?sso .
    }
"""" .
```

1268
```
<SimpleFields/User/Lang/Share>
    a twd:Share ;
rdfs:label
    "Share user language" ;
rdfs:comment
    "Shares the currently logged in user language preference." ;
twd:hasPredicate
    <lang> ;
twd:ShareXmlMapping
""""

@base <http://thoughtwire.ca/ont/templates/1.0.0/> .
@prefix twd: <http://thoughtwire.ca/ontology/2009/12/Directory#> .

twd:CurrentUser twd:lang1 "((//attribute[@name='lang_pref']/value/text()))" .
"""" .
```

Figure 31B

```
<RestConnector/DirectoryInfo>
    a    twd:DirectorySparqlConsumeRequest ;
      rdf:value
        """
            PREFIX rdf:    <http://www.w3.org/1999/02/22-rdf-syntax-ns#>
            PREFIX rdfs:   <http://www.w3.org/2000/01/rdf-schema#>
            PREFIX twd:    <http://thoughtwire.ca/ontology/2009/12/Directory#>
            PREFIX twconn:      <http://thoughtwire.ca/ontology/2011/05/Connector#>
            PREFIX self:   <http://thoughtwire.ca/ont/templates/1.0.0/SimpleFields/User>

CONSTRUCT {
          self: rdfs:label ?label .
            self: rdfs:comment ?comment .
            self: twd:hasConsumeRequest ?hasConsumeRequest .
            self: twconn:ServicePath ?servicePath .
            self: twconn:PingPath ?pingPath .
            ?httpServer twconn:Server ?httpServerUrl .
            ?httpsServer twconn:SecureServer ?httpsServerUrl .
            }
            WHERE {
          self: rdfs:label ?label .
            self: rdfs:comment ?comment .
            self: twd:hasConsumeRequest ?hasConsumeRequest .
            self: twconn:HttpServer ?httpServer .
            self: twconn:HttpsServer ?httpsServer .
                OPTIONAL {
                    twd:RestConnector twconn:ServicePath ?servicePath .
                    twd:RestConnector twconn:PingPath ?pingPath .
                    ?httpServer rdf:value ?httpServerUrl .
                    ?httpsServer rdf:value ?httpsServerUrl .
                } .
            }
        """ .
```

| Widget (prefix: http://thoughtwire.ca/ontology/2010/10/Form#) | Data Key (prefix: http://thoughtwire.ca/ont/templates/1.0.0/) |
|---|---|
| form | |
| stockLevelText | |
| stockLevel | stockLevel |
| quantity | quantity |
| submit | |

Figure 32A

| Widget (prefix: http://thoughtwire.ca/ontology/2010/10/Form#) | Consume Request Definition (prefix: http://thoughtwire.ca/ont/templates/1.0.0/) |
|---|---|
| form | SimpleFields/Master/Cr |
| stockLevelText | |
| stockLevel | |
| quantity | |
| submit | |

Figure 32B

| Widget (prefix: http://thoughtwire.ca/ontology/2010/10/Form#) | Share Definition (prefix: http://thoughtwire.ca/ont/templates/1.0.0/) |
|---|---|
| form | |
| stockLevelText | |
| stockLevel | |
| quantity | |
| submit | SimpleFields/Master/Share |

Figure 32C

METHOD AND SYSTEM FOR GENERATING A VIEW INCORPORATING SEMANTICALLY RESOLVED DATA VALUES

This application is a continuation-in-part of U.S. application Ser. No. 13/804,168 filed on Mar. 14, 2013, and of U.S. application Ser. No. 13/967,643 filed on Aug. 15, 2013, the entire contents of which are incorporated herein by reference.

FIELD OF THE INVENTION

The present invention relates generally to information systems. In particular, the invention relates to a method and system for generating a view.

BACKGROUND OF THE INVENTION

More and more of the information that is used by humans is accessed via the Internet. Traditionally, much information has been presented via a static web page that is viewed using a web browser, such as MICROSOFT INTERNET EXPLORER or FIREFOX. A static web page (sometimes called a flat page/stationary page) is a web page that is delivered to the user exactly as stored. As a result, a static web page displays the same information for all users and from all contexts. Static web pages are typically hypertext markup language ("HTML") documents stored as files in the file system and made available by the web server computer over hypertext transfer protocol ("HTTP"). In some cases, cascading style sheets ("CSS") can be employed in conjunction with the HTML documents to modify the presentation of the fixed information. As the information is embedded in the static web pages, as well as some representation of the style in which the information is to be presented, a change in either the information or the presentation format requires modification of the static web pages. Further, a new static web page must be generated for each new set of information to be presented.

More recently, dynamic web pages that present information in a more flexible manner have become more prevalent. The information is generally injected into the page and the page's behavior is controllable by the server computer serving the page and/or by the client viewing the page.

A program running on the server computer can be used to change the content of the web pages, adjust their sequence, or their reloading. The server computer can use various inputs in selecting and infusing web pages delivered to a client with information and behavior. The inputs can include, for example, data in a posted HTML form (i.e., data returned with the request for the web page), parameters in the uniform resource locator ("URL"), the type of browser being used, the passage of time, or a database or server state (i.e., the data stored therein). Such web pages are typically created using server-side languages, such as Active Server Page ("ASP"), Personal Home Page ("PHP"), and Ruby.

The information and/or behavior may also be modified client-side, such as in response to mouse or keyboard actions, or at specified timing events. The dynamic behavior can occur within the presentation of a web page that uses a client-side scripting language, such as JAVASCRIPT or ActionScript. These client-side scripting languages enable the control of media types, such as sounds, animations, changing text, etc. Such scripting also enables additional information to be retrieved from the server computer and presented in a web page without reloading the web page.

Asynchronous JavaScript and XML ("AJAX") is a web development methodology for dynamically exchanging data with a server computer. Using this technique, the client sends a request for data from the server computer, and formats the data returned by the server computer via a client side script. This enables only those portions of a web page that change to be loaded from a server computer instead of reloading the entire page when changes in the information occur.

In each of these cases, the development of a dynamic web page generally requires knowledge of the scripting languages and markup languages employed, programmatic data linking, and programmatic event handling. The intermingled presence of both scripting languages and markup languages in the same source document complicates the job of both developers and development tools.

Further, the inputs are received in a variety of formats. These formats differ from the format of the HTML page that is generated. As a result, the inputs require translation into HTML format. Some of the predefined methods for presenting such data from other sources can be limited. Still further, such programmatic data connections create dependencies between the program structure and the format of the data being retrieved. This makes it hard to modify the output format of the data as a change in the data must be matched by a corresponding change in the program code.

Pages and/or applications that have to dynamically respond to user data require the addition of another layer of scripting language, further complicating the job of authors and tools. As a result, pages are frequently far less dynamic and responsive than would be optimal for their intended purpose. Additionally, web page designers who have the most experience and ability to create a useable experience often do not have access or ability to affect the changes they desire.

Another approach to delivering web pages is to transform data in an extensible markup language ("XML") document using Extensible Stylesheet Language Transformations ("XSLT") into another document. These transformations are performed either server-side or client-side by an XSLT processor. The XSLT processor takes one or more source XML documents, plus one or more XSLT stylesheet modules, and processes them to produce an output document. The XSLT stylesheet contains a collection of template rules: instructions and other directives that guide the processor in the production of the output document. The source XML document could include, for example, the result data from an SQL query. The resulting document can be in any of a variety of formats, including XML, HTML, etc. During a transformation, the data from the source XML document is read in and transformed, and neither the source XML data nor the XSLT are thereafter accessible on the client side (i.e., at the web browser). Once the transformation by the XSLT processor is completed, the data within the original source XML document is no longer accessible. XSLT also typically combines more than one markup languages in a single document with the potential for author and tool confusion.

It is therefore an object of the invention to provide a novel method and system for generating a view.

SUMMARY OF THE INVENTION

According to an aspect of the invention, there is provided a method for generating a view, comprising:

storing, in storage of a computer system, a first set of declarations in a metadata data model retrieved from a view definition, said first set of declarations being static;

storing, in said storage, a second set of declarations in said metadata data model that are associated with said first set of declarations;

resolving, via said computer system, at least one request for a set of requested data to a subset of said first set of declarations and said second set of declarations using semantic descriptions provided for said first and second sets of declarations and said requested data; and updating a view rendered from said subset of said first set of declarations and said second set of declarations whenever said second set of declarations is updated.

The first set of declarations can identify at least some of the set of requested data resolving to one of the second set of declarations. The view definition can include at least some of said requests.

At least some of the first set of declarations can provide view configuration data. At least some of said second set of declarations can provide view configuration data. The first set of declarations can correspond to a first software system, and at least some of the second set of declarations can be received from a second software system.

The computer system can include a server computer system and a personal computing device, wherein the server computer system can include the storage, and wherein the rendering can include presenting the view by the personal computing device. The view can be presented by a web browser executing on the personal computing device. The rendering can include loading program code via the web browser.

The rendering can further include:

retrieving, via said at least one script, view configuration data from said server computer system; and updating a document object model of said web browser for said view configuration data.

The rendering can further include:

retrieving, via said at least one script, updates to said view configuration data from said server computer system; and updating said document object model of said web browser for said updates to said view configuration data.

The rendering can further include:

retrieving, via said at least one script, updates to form data from said server computer system; and updating said document object model of said web browser for said updates to said form data.

The metadata data model can be Resource Description Framework. The at least one request can be specified in SPARQL.

According to another aspect of the invention, there is provided a computer system for generating a view, comprising:

at least one processor;

storage accessible to said processor;

computer executable instructions executed by said at least one processor and causing said at least one processor to:

store, in said storage, a first set of declarations in a metadata data model retrieved from a view definition, said first set of declarations being static;

store, in said storage, a second set of declarations in said metadata data model that are associated with said first set of declarations;

resolve at least one request for a set of requested data to a subset of said first set of declarations and said second set of declarations using semantic descriptions provided for said first and second sets of declarations and said requested data; and update a view rendered from said subset of said first set of declarations and said second set of declarations whenever said second set of declarations is updated.

The first set of declarations can identify at least some of the set of requested data resolving to one of the second set of declarations. The view definition can include at least some of the requests.

At least some of the first set of declarations can provide view configuration data. At least some of the second set of declarations can provide view configuration data. The first set of declarations can correspond to a first software system, and at least some of the second set of declarations can be received from a second software system.

The computer system can include a server computer system having the storage and a personal computing device presenting the view. The view can be presented by a web browser executing on the personal computing device. The personal computing device can load program code from the server computer system. The personal computing device can retrieve, via the at least one script, view configuration data from the server computer system, and update a document object model of the web browser for the view configuration data. The personal computing device can retrieve, via the at least one script, updates to the view configuration data from the server computer system, and can update the document object model of the web browser for the updates to the view configuration data. The personal computing device can retrieve, via the at least one script, updates to form data from the server computer system, and updates the document object model of the web browser for the updates to the form data.

The metadata data model can be Resource Description Framework. The at least one request can be specified in SPARQL.

According to further aspect of the invention, there is provided a method for generating a view, comprising:

receiving, via a computer system, a static first set of declarations in a metadata data model from a view definition;

receiving, in said storage, a second set of declarations in said metadata data model that are associated with said first set of declarations;

resolving, via said computer system, at least one request for a set of requested data to a subset of said first set of declarations and said second set of declarations using semantic descriptions provided for said first and second sets of declarations and said requested data; and updating a view rendered from said subset of said first set of declarations and said second set of declarations whenever said second set of declarations is updated.

According to yet another aspect of the invention, there is provided a computer system for generating a view, comprising:

at least one processor;

storage accessible to said processor;

computer executable instructions executed by said at least one processor and causing said at least one processor to:

receive, via a computer system, a static first set of declarations in a metadata data model from a view definition;

receive, in said storage, a second set of declarations in said metadata data model that are associated with said first set of declarations;

resolve, via said computer system, at least one request for a set of requested data to a subset of said first set of declarations and said second set of declarations using semantic descriptions provided for said first and second sets of declarations and said requested data; and update a view rendered from said subset of said first set of declarations and said second set of declarations whenever said second set of declarations is updated.

According to yet a further aspect of the invention, there is provided a method for generating a view, comprising:

receiving, via a server computer system, a static first set of declarations in a metadata data model from a view definition;

receiving, via said server computer system, a second set of declarations in said metadata data model that are associated with said first set of declarations;

resolving, via said server computer system, at least one request for a set of requested data to a subset of said first set of declarations and said second set of declarations using semantic descriptions provided for said first and second sets of declarations and said requested data; and transmitting, via said server computer system, an updated subset of said requested data to a personal computing device whenever said second set of declarations is updated.

The method can further include:

updating a view rendered from said requested data on said personal computing device whenever said updated subset of said requested data is received from said server computer system.

The first set of declarations identifies at least some of the set of requested data resolving to one of the second set of declarations. The view definition can include at least some of the requests.

At least some of the first set of declarations can provide view configuration data.

At least some of the second set of declarations can provide view configuration data. The first set of declarations can correspond to a first software system, and at least some of the second set of declarations can be received from a second software system.

The view can be presented by a web browser executing on the personal computing device. The rendering can include loading, via the personal computing device, program code via the web browser.

The rendering can further include:

retrieving, via said program code executed by said personal computing device, view configuration data from said server computer system; and updating a document object model of said web browser on said personal computing device for said view configuration data.

The rendering can further include:

retrieving, via said program code executed by said personal computing device, updates to said view configuration data from said server computer system; and updating said document object model of said web browser on said personal computing device for said updates to said view configuration data.

The rendering can further include:

retrieving, via said program code executing on said personal computing device, updates to form data from said server computer; and updating said document object model of said web browser on said personal computing device for said updates to said form data.

The metadata data model can be Resource Description Framework. The at least one request can be specified in SPARQL.

BRIEF DESCRIPTION OF THE DRAWINGS

Embodiments will now be described, by way of example only, with reference to the attached Figures, wherein:

FIG. 28 illustrates an exemplary collaboration definition for the system of system of FIGS. 1 to 3;

FIGS. 29A and 29B illustrate an exemplary participant definition for a collaboration participant for the system of FIGS. 1 to 3;

FIGS. 30A to 30F illustrate an exemplary participant definition for a master semantic form participant for the system of FIGS. 1 to 3 for generating the view of FIG. 27;

FIGS. 31A to 31C illustrate an exemplary participant definition for a proxy connector participant connecting to the REST server for the system of FIGS. 1 to 3; and FIGS. 32A to 32C illustrate the lists of associations between widgets and data keys, consume request definitions, and share definitions registered during processing of the master semantic form of FIGS. 30A to 30F.

DETAILED DESCRIPTION OF THE EMBODIMENTS

Figure 1:
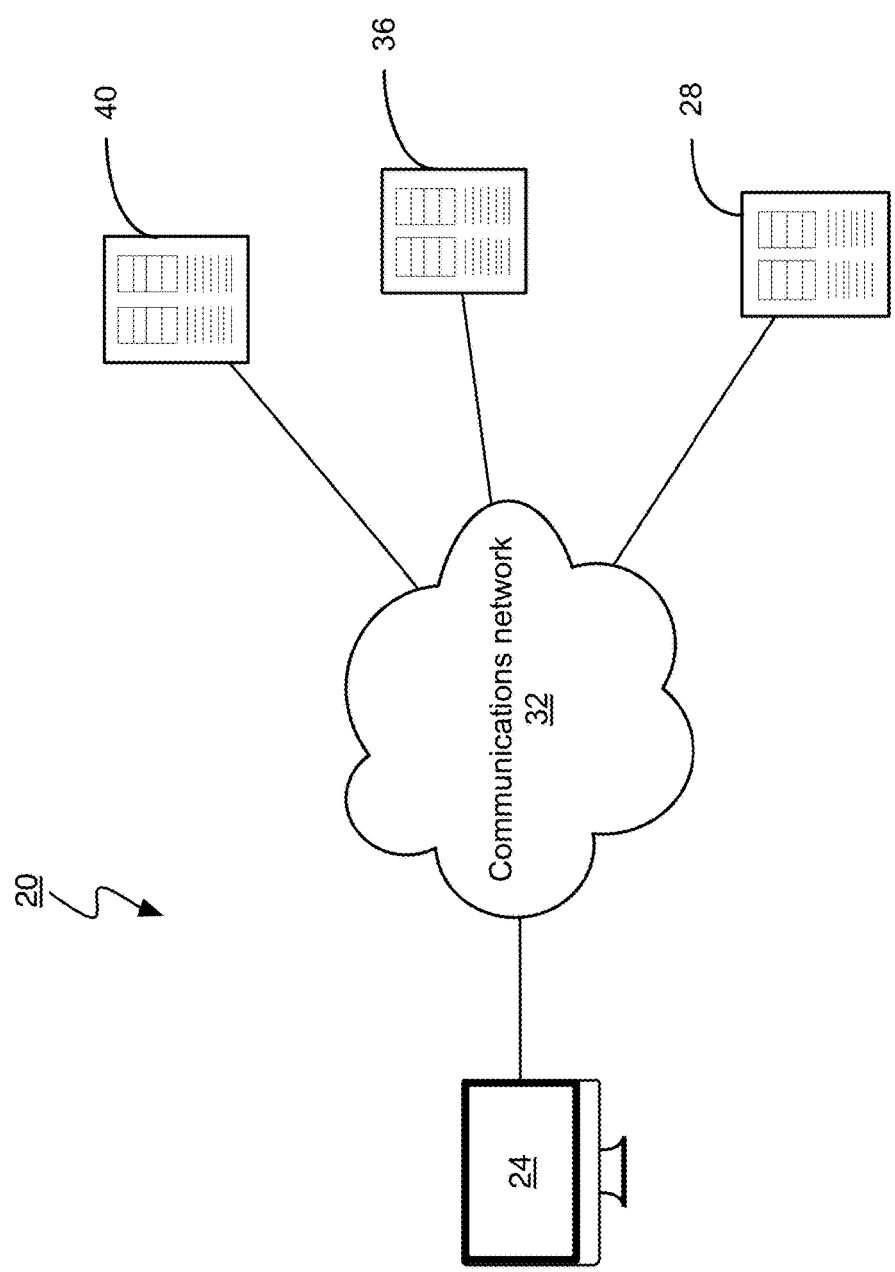
FIG. 1 shows a high-level architecture of a data-sharing server computer system for enabling data-sharing between software systems in accordance with an embodiment of the invention and its operating environment.

The invention provides a new method and system for generating a view. A view configuration from a view configuration store is stored in storage. View configurations are sets of data that define how at least a part of a view should be laid out. Further, the view configurations in the current implementation include at least some of the behaviors for the view, if any. The view configuration is defined using a first set of declarations in a metadata data model, such as, for example, the Resource Data Framework ("RDF") set of specifications. RDF is a metadata data model that is defined via a family of World Wide Web Consortium ("W3C") specifications for modeling information conceptually that can be found on their web site. Metadata data models allow both data values and the description of the values to coexist with a consistent representation. A second set of declarations in the metadata data model for data items that are associated with the view configuration are stored in the storage. At least one request for a set of requested data is resolved to a subset of the first set of declarations and the second set of declarations using semantic descriptions provided for the first and second sets of declarations and the requested data. A view is rendered from the subset of the first set of declarations and the second set of declarations.

A number of advantages are realized using the invention. As the same metadata data model is used to define both the view configuration and the data items, it can be easier for a person to create or modify view configurations and/or the data items that are used to populate them. Additionally, the person developing an application using the system may be more readily able to debug the application as the data items are defined in the same metadata data model as used to define the view configurations.

Further, as the data items are defined in the same metadata data language as the configuration view, little or no translation is required to integrate the data items received from the data-sharing session into the view configuration.

Additionally, formatting/rendering instructions traditionally provided in programs for generating dynamic pages can be provided via the data items received from the data-sharing session. This enables the formatting applied to the resulting view to be very dynamic. For example, when presenting a data value from the data-sharing session in a view, the type for the data value can be passed with the data value to enable the value to be rendered appropriately. In this manner, multiple entry of the same information (e.g., the data value format) in the view configuration and the data being received from other software systems can be avoided. Further, synchronization errors for the data value types between view configurations and the data values themselves can be reduced.

Still further, the data being displayed can be formatted closer to the time of presentation using formatting instructions that are specified once. For example, where a page is generated using XSLT, data may be retrieved and formatted (e.g., "(100.00)") in a certain matter based on the value. The generated page may include AJAX calls to update the value. If the value changes, any corresponding changes required in the formatting would have to be handled via a scripting language such as JavaScript. Thus, values may be formatted via two different mechanisms, thereby adding to the complexity of developing the page. Further, the JavaScript for formatting values is coded in each location in which values appear, leading to repetitive entry and increased chances of typographical errors.

Another advantage is that data provided with the view configuration can be augmented with data from the data-sharing session. For example, additional declarations received can augment the view specified in the view configuration.

FIG. 1 shows a system 20 for generating a view in accordance with an embodiment of the invention and its operating environment. A personal computing device, personal computer 24, is in communication with a data-sharing server computer system 28 via a communications network 32. As used herein, "personal computing device" is a computing device with which a user directly interacts that is capable of presenting views on a display screen. Examples of personal computing devices include smartphones, tablet computing devices, personal computers, smart thermostats, portable media players, global positioning system units, and display panels. A data-sharing server computer system 28 is a computer system that manages the exchange of data between various software systems. In addition, the data-sharing server computer system 28 operates a web-based application, and generates data for rendering views for the application in a web browser executing on the personal computer 24. A REpresentational State Transfer ("REST") server computer 36 and a database server computer 40 are also in communication with the data-sharing server computer system 28 via the communications network 32.

The data-sharing server computer system 28, the REST server computer 36, and the database server computer 40 are computer systems that can include one or more physical computers, but are each a single physical computer in the illustrated embodiment. The communications network 32 may be a wired network such as the Internet or an intranet, a wireless network, or a combination thereof. The personal computer 24 is in communication with the data-sharing server computer system 28 via the communications network 32.

In the illustrated example, the personal computer 24 is used by a person to access various resources and systems.

Data-Sharing Server

The data-sharing server computer system 28 enables people to complete tasks using a variety of software systems that work together in a very loosely coupled manner without programmatic knowledge of the other software systems. As used herein, "software system" refers to one or more applications, programs, services, databases, firmware, executed scripts, middleware, sets of functionality available via web pages, etc. that share and/or receive data. In many cases, no single software system contains all of the required information or functionality and it is often the individual's job to act as the point of connection amongst the software systems they use.

Software systems include resources that a person has access to. The resources can include data sources and/or functionality, such as web applications, databases, REST services and desktop applications, such as Microsoft Excel. Further, software systems can have multiple components that execute on the same or on two or more computing devices. For example, a web page that is served to and is rendered on a personal computing device can interact with a web server computer to provide access to resources available through the web server computer, such as an application server computer or a database. Collectively, the web page, the web server computer and other resources to which it is coupled form a software system.

Semantic forms, together with the program code for managing them, represent another type of software system. A semantic form is defined via a view definition that specifies semantically the view configuration data that makes up a view. View configuration data can be provided by the view definition and also by other software systems. A set of JavaScript uses the view configuration data and form data to dynamically generate a view. Additionally, semantic forms can share data from their associated view definition, received from the user as input or other interaction with the controls in the view. Semantic forms can present one or more other semantic forms (i.e., subviews) in portions of their display region.

Software systems assist in the completion of tasks in the system by participating in data-sharing sessions referred to as "collaborations". A "collaboration" is an arena managed by a stateful data-sharing service executed on the data-sharing server computer system 28 in which each software system can share semantically identified data items and specify data that they need based on the semantics of that data. A collaboration is typically designed for the completion of a task. The stateful data-sharing service matches data shared by software systems with data other software systems requested using the semantic descriptions provided for both, and then notifies those other software systems when data matching what they requested is updated.

Figure 2:
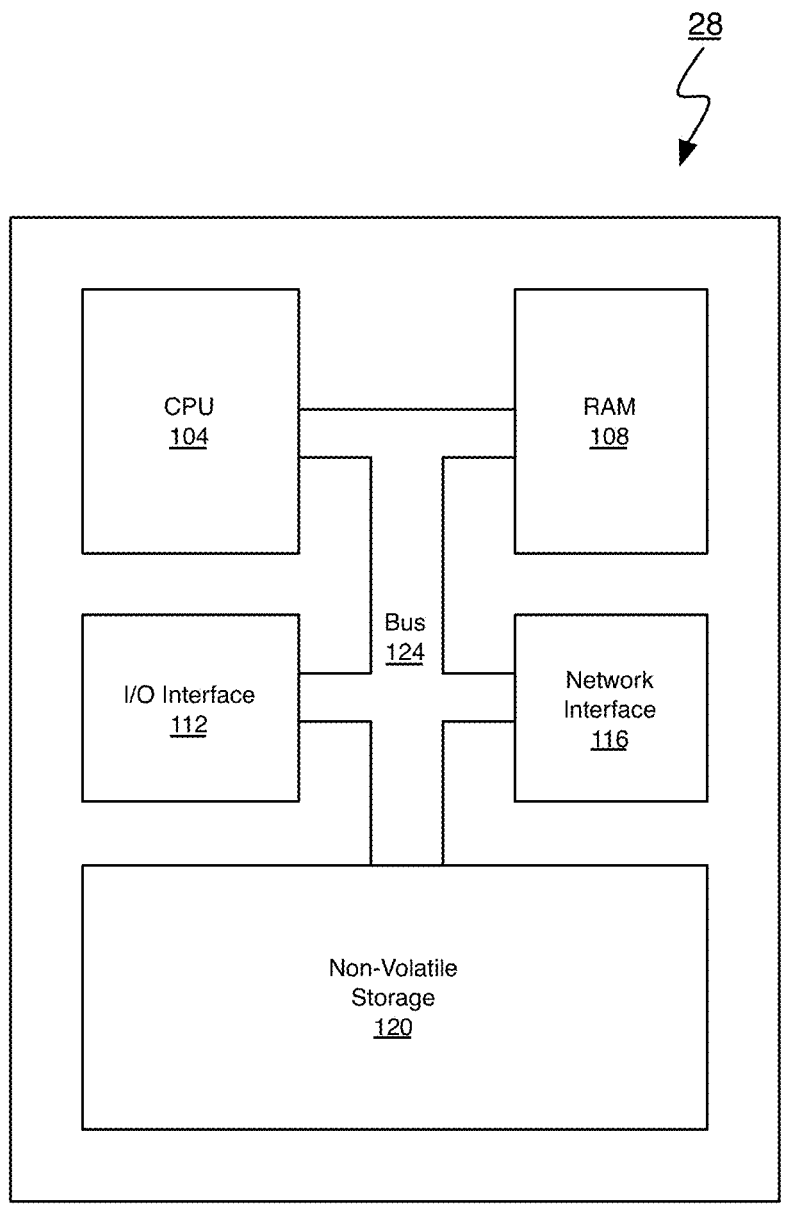
FIG. 2 shows a schematic diagram of the data-sharing server computer system of FIG. 1.

FIG. 2 is a high-level schematic diagram of the data-sharing server computer system 28 of FIG. 1. As shown, the data-sharing server computer system 28 has a number of physical and logical components, including a central processing unit ("CPU") 104, random access memory ("RAM") 108, an input/output ("I/O") interface 112, a network interface 116, non-volatile storage 120, and a local bus 124 enabling the CPU 104 to communicate with the other components. The CPU 104 executes an operating system, a stateful data-sharing service, a web service, and possibly one or more software system components. RAM 108 provides relatively-responsive volatile storage to the CPU 104. The I/O interface 112 allows for input to be received from one or more devices, such as a keyboard, a mouse, etc., and outputs information to output devices, such as a display and/or speakers. The network interface 116 permits communication with other computing devices, such as the personal computer 24. Non-volatile storage 120 stores the operating system and programs, including computer-executable instructions and artefacts for implementing the stateful data-sharing service, the web service, and the software system components, if any. The data-sharing server computer system 28 may also use part of the non-volatile storage 120 as a temporary swap file that augments the volatile storage provided by RAM 108. During operation of the data-sharing server computer system 28, the operating system, the programs and the artefacts may be retrieved from the non-volatile storage 120 and placed in volatile storage to facilitate execution. Data shared by software systems is maintained by the stateful data-sharing service in volatile storage.

Figure 3:
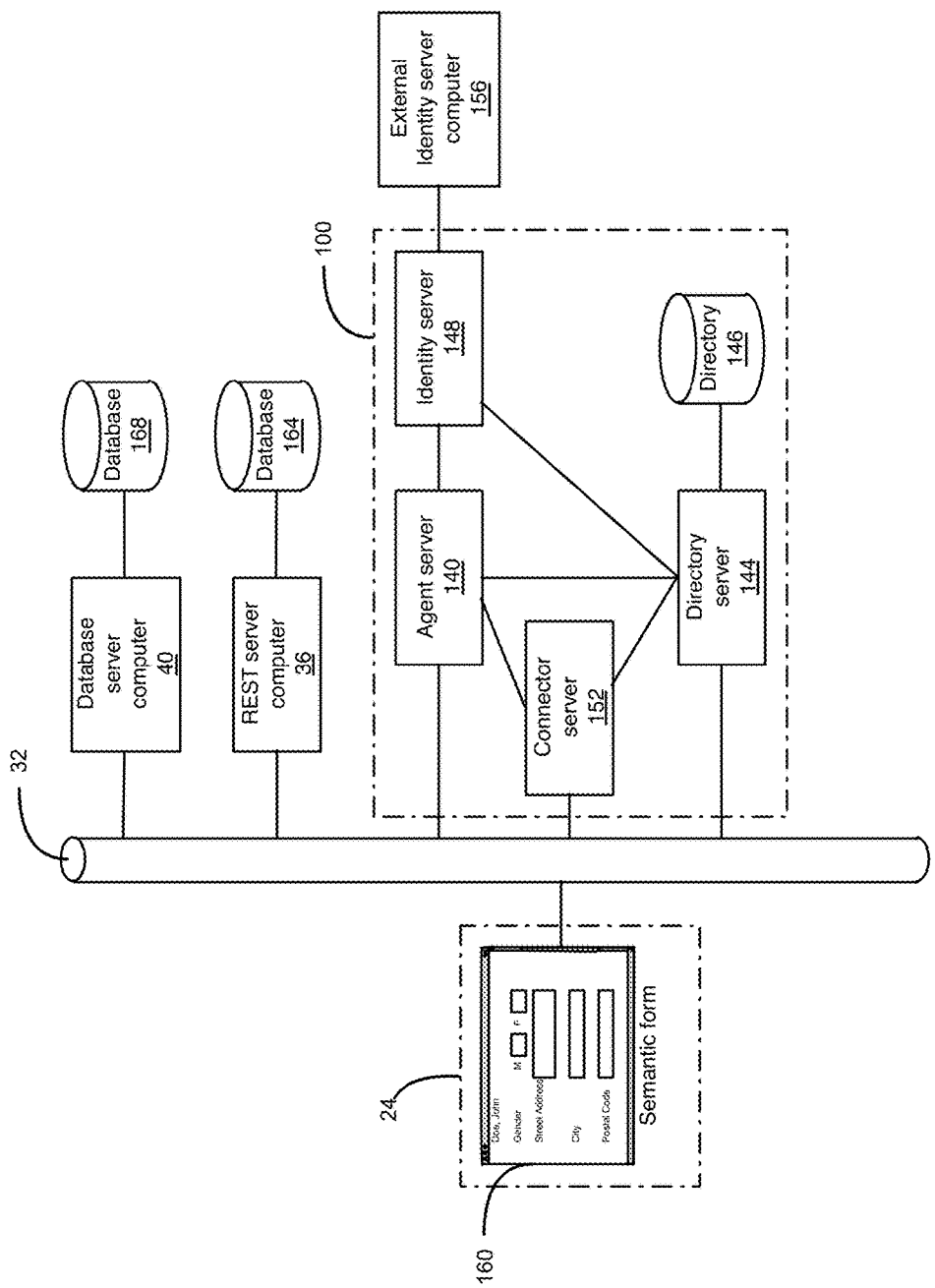
FIG. 3 shows software systems and various components of a stateful data-sharing service executing on the hardware of FIG. 1.

Referring now to FIGS. 1 and 3, various logical and physical components of the system 20 are shown and will be described. The stateful data-sharing service executing on the data-sharing server computer system 28 for managing collaborations includes various software modules, including an agent server 140, a directory server 144 that manages a directory 146 and operates a web service, an identity server 148, and a connector server 152. The agent server 140 orchestrates the grouping of software systems into collaborations, and the exchange of data between the software systems via the collaboration. The directory 146 managed by the directory server 144 stores static artefacts used by the agent server 140 to create and manage collaborations, as well as JavaScript code for generating web pages. The identity server 148 manages user identities in the stateful data-sharing service, and can communicate with an external identity server computer 156 to retrieve authorization information for users via standards, such as Lightweight Directory Access Protocol ("LDAP"). The connector server 152 executes various "connectors". Some connectors communicate with various resource types, such as relational databases or web services. Other connectors are helper applications that perform simple functions like unit conversions.

A semantic form 160 is shown executing on the personal computer 24. The semantic form 160 can include JavaScript for managing the view and behavior of the semantic form, and data validation performed by the semantic form. The semantic form 160, JavaScript in a web page for loading the semantic form and for enabling communication with the agent server 140, and the participant definition for the semantic form stored in the directory 146 via the directory server 144 and/or retrieved from a collaboration via the agent server 140 form a first software system.

A second software system for managing cross-system user preferences and other configuration information includes a proxy connector participant executed by the agent server 140 in communication with a REST connector executed by the connector server 152. The REST connector communicates with the REST server computer 36, which manages and stores the user preferences and other configuration information in a database 164. The REST connector exposes the user preferences and other configuration information from the REST server computer 36 in collaborations. One user preference that the REST server computer 36 manages is the preferred language for each user. This user preference is used by a number of different software systems, including some that do not interact with the data-sharing server computer system 24, and is thus centrally managed by the REST server computer 36.

A third software system for managing inventory of products available on an commerce site includes a proxy connector participant executed by the agent server 140 in communication with a database connector executed by the connector server 152. The database connector communicates with the database server computer 40, which manages inventory data in a database 168. The database connector exposes the inventory data from the database server computer 40 in collaborations.

The agent server 140 enables these software systems to share data via a collaboration. Each collaboration relates to a task, and software systems used to complete that task are participants in that collaboration. As used hereinafter, it should be understood that "participant" refers to a software system that participates in a collaboration, or a component of a software system that participates in a collaboration on behalf of the software system. As previously noted, software systems can include one or more applications, programs, services, databases, firmware, executed scripts, middleware, sets of functionality available via web pages, etc. that share and/or receive data. It is said that the software system participates in a collaboration even when only a component thereof interacts with the agent server 140. Where such software systems have one or more components that execute on a personal computing device, such as the personal computer 24, one of these components typically communicates with the agent server 140 on behalf of the software system. These types of software systems are referred to as client-side participants. Client-side participants generally actively initiate communications with the agent server 140 to register in a collaboration.

Collaborations generally include at least two client-side participants: a collaboration participant, and another client side participant that receives some data from a user and/or provides some data and/or feedback to the user. The collaboration participant is a special type of client-side participant that provides configuration information for the collaboration. For example, where a collaboration includes semantic forms, the collaboration participant indicates what semantic form participant should be loaded first. Additionally, the collaboration participant may provide the base path for CSS and images used in semantic forms. Further, the collaboration participant may include error messages to be presented to a user when a user starts to close a web browser tab containing a semantic form.

Semantic forms form part of one such type of client-side participant. Each semantic form is the product of view configuration data identified in the semantic form's participant definition and retrieved from a collaboration by the JavaScript modules. The view configuration data retrieved from the collaboration controls how the semantic form:

interacts with the collaboration, including what further data to request from and share with the collaboration;
interprets the data, including formatting, control type to use and other metadata;
generates a view in a web browser, including any behaviors for the view, using the data received from the collaboration;
invokes other semantic forms;
validates data entered by a user and retrieved from a collaboration; and
controls page navigation for the web user interface provided at least partially by the semantic form.

In contrast, server-side participants are components of software systems that are executed remotely on server computers on behalf of users to perform actions and/or access data that a user would otherwise perform through a database client, web browser, etc. Typically, server-side participants are invoked by the agent server 140 when a collaboration in which they are to participate is created.

In the system shown in FIG. 3, the semantic form 160 forms part of a client-side participant, and the proxy connector participants that communicate with the REST and database connectors executed by the connector server 152 act as server-side participants in a collaboration.

The agent server 140 is responsible for managing collaborations and the participation of various software systems therein for each of a number of users that may be in the process of completing the same task, albeit for their context(s), and/or different tasks. In some cases, a user may be in the process of completing different tasks simultaneously, or even a particular task multiple times simultaneously. To safeguard against accidental access of a first user's data by a second user, the agent server 140 maintains the data shared by each user in separate user spaces. The user spaces are virtual sandboxes that ensure the information of a given user is only available to that user in the presence of their authentication. In addition, the agent server 140 manages a separate collaboration in the corresponding user space for each task that the user is pursuing.

The agent server 140 ensures that the participants share data according to an established set of rules. For example, the agent server 140 ensures that each data item value shared by a participant can be associated with a share definition that includes a semantic description so that its semantics can always be determined. Semantic descriptions allow the agent server 140 to define and then process non-explicit relationships between the data items shared by software systems and data requested by other software systems using ontologies. Semantics and ontologies enable, for example, two different properties like "YearsOld" and "Age" to be equated; even something this simple can require extensive rework without semantic descriptions, especially over a large number of software systems. These declarative semantics enable the software systems to declare the data items they share values for and the data items for which they would like to receive, or "consume", values in a manner that is independent of their internal representation, and allow them to be unambiguously identified. The use of semantics and ontologies allows the agent server 140 to properly determine the relationships between data items and software systems without point-to-point connections established by the software systems themselves or an external integration system.

The agent server 140 includes a query evaluator that evaluates whether there is a change in the state of consume requests registered by software systems. Consume requests are akin to standing queries for values of sets of data as the values become available or are updated. The state of a consume request is determined by whether or not the consume request is satisfied and, if satisfied, the values that satisfied it. A consume request is deemed satisfied when values are available for each shared data item to which the set of data specified by the consume request semantically resolves. Thus, the query evaluator determines that there is a change in the state of a consume request if one or more new values are shared and the consume request is satisfied, or if the consume request becomes unsatisfied as a result of one or more values being removed from the collaboration. Consume requests are defined such that software systems are not notified of new shared values unless values are available for each of the shared data items to which said sets of data specified in the consume request semantically resolve. In this manner, control is afforded to the software systems as to when notifications occur.

The data for which values are desired are described semantically in the consume requests. The query evaluator includes a reasoner module that semantically resolves the data requested in the consume requests to data items for which values have been received, if possible, via their semantic descriptions using ontologies. The reasoner module does this by computing inferences between the semantic description of the requested data and the semantic description of the data items for which values are shared in the collaboration. It will be appreciated that, in some cases, the query evaluator may be unable to resolve the requested data to data items in the collaboration. For example, the requested data may not yet be available as a particular software system type having data items to which the requested data semantically resolves may not have registered yet or has not shared values for these data items yet, or the requested data may simply not match any of the data items defined in the share definitions of the participant definitions for a collaboration. The query evaluator then determines if values for the matched data items have been received by checking the collaboration instance data. The particular query evaluator implemented in this embodiment is from Jena, an open source JAVA framework for building semantic web applications.

The agent server 140 manages the shared data set as it is shared by software systems and then subsequently provided to other software systems. The data shared in a collaboration is stored during the lifetime of the collaboration, or for some shorter specified period, such as the lifetime of a participant, a set period of time, etc. The shared data is stored in a non-permanent manner in volatile storage, such as in RAM 108, a temporary swap file that may be stored in non-volatile storage 120, etc. The agent server 140 does not need a database or other persistence mechanism because, by design, it does not permanently store the information it manages. By not storing the shared data permanently, greater security is afforded to the data shared.

The agent server 140 is implemented as a JAVA web application deployed on the data-sharing server computer system 28. An administrative user interface of the agent server 140 enables configuration thereof, but most of its functionality is exposed as multi-user web service application programming interface ("API") via HyperText Transfer Protocol ("HTTP") and Secure HTTP ("HTTPS") that is used during regular operation. The API provides access to collaborations and participants and supports core operations, namely:
  create a collaboration
  destroy a collaboration
  register a participant
  de-register a participant
  suspend a participant
  enable notifications for consume requests for a participant
  share information in the collaboration from a participant
  remove shared information from the context for a participant
  send notification of shared information to a participant The directory server 144 maintains information used by the agent server 140 to manage collaborations and the participation of software systems in those collaborations, and by the connector server 152 to configure connectors. In addition, the directory server 144 includes a web service for generating and serving dynamic web pages with embedded JavaScript code that provide instructions on how to retrieve and instantiate the various JavaScript objects and modules stored in the directory 146 for providing semantic forms.

Figure 4:
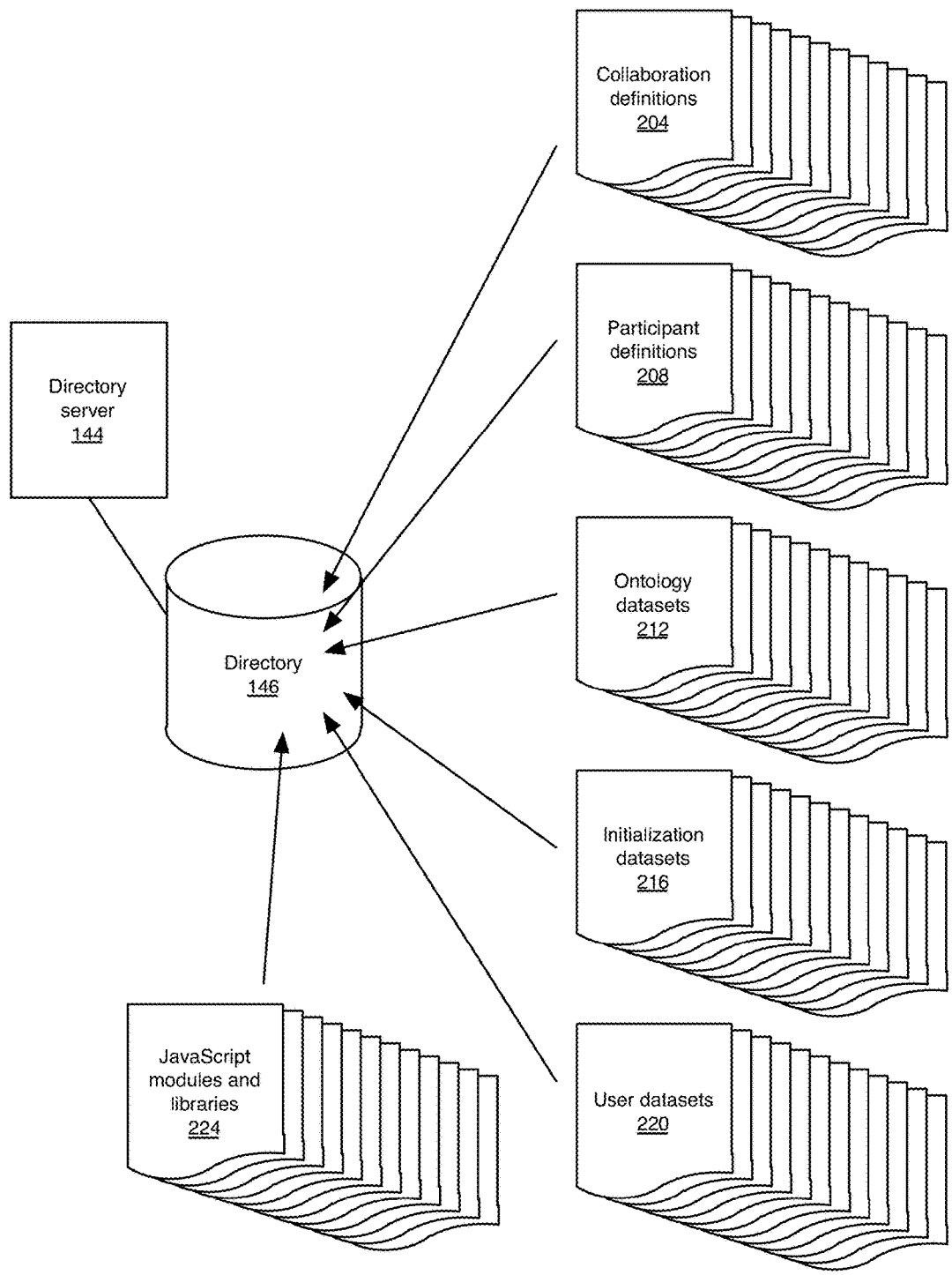
FIG. 4 shows the directory server of the data-sharing server computer system of FIG. 3, together with various artefacts stored in a directory it maintains.

Referring now to FIGS. 3 and 4, the directory server 144 is shown managing the directory 146. The directory 146 stores various static artefacts, including collaboration definitions 204, participant definitions 208, ontology datasets 212, initialization datasets 216 and user datasets 220. In addition, the directory 146 stores a set of JavaScript modules and libraries 224. The collaboration definitions 204 and the participant definitions 208 represent collaboration and participant policy statements regarding what can happen in a collaboration and what each participant can do in a collaboration respectively.

Collaboration definitions 204 are used by the agent server 140 to create and manage collaborations. Each collaboration definition 204 delineates a pre-defined type of collaboration, and is set out in Terse RDF Triple Language ("Turtle"); that is, a serialization format, the standard for which is published via the W3C's web site for RDF graphs. The RDF statements specify the participant definitions 208 for the types of participants allowed in a collaboration of the type defined by the collaboration definition, the initialization datasets 216 that the collaboration is to be populated with at initialization, and the ontology datasets 212 that are to be used in the collaboration.

A collaboration only has capacity for (i.e., allows participation therein by) one participant of each participant type matching the specified participant definitions 208 in the collaboration definition 204 used to create the collaboration. This ensures that two participants of the same type do not provide competing data to the collaboration. The collaboration definitions 204 are identified using a universal resource identifier ("URI") and, likewise, refer to the participant definitions 208, the ontology datasets 212, and the initialization datasets 216 via URIs. The URIs are unique identifiers that identify the collaboration definitions 204, the participant definitions 208, the ontology datasets 212, and the initialization datasets 216 within a scope owned by the author of the software system, for example the domain name system ("DNS") name of the company that authored the component could be used to scope the identifier to that company with a suffix identifying the particular data item being shared.

During runtime, the agent server 140 retrieves collaboration definitions 204 from the directory server 144 and uses them to create and initialize collaborations, as will be described below.

Each participant definition 208, like the collaboration definitions 204, is specified in Turtle and includes a set of RDF statements for the participant type, including the participant class, participant configuration information, share definitions, and consume request definitions. The share definitions define what data the participant type is allowed to share. The consume request definitions define what data the participant type is allowed to receive when it is available and/or updated within the scope of the particular task associated with the collaboration. Thus, participant definitions 204 are akin to policy statements that delineate what a participant can and cannot do.

The participant configuration information, the share definitions, and the consume request definitions included in the participant definition 208 are loaded by the agent server 140 from the directory 146 via the directory server 144 when a collaboration is created.

Participants are loosely coupled in collaborations. For this purpose, the details of the participant class, the participant configuration information, consume request definitions and share definitions as specified in each participant definition 208 are only used in the management of that particular participant by the agent server 140, and not shared with other participants of other types. Neither the participant configuration information, the consume request definitions nor the share definitions for participant types form part of the collaboration definition 204 other than by reference to the participant definition 208 that contains them. This enables participant types to be swapped in a collaboration definition 204 without worrying about any binding other than that expressed by their share definitions and consume request definitions.

As noted, each participant definition 208 has a URI. Software systems that participate in collaborations identify themselves using the URI of the corresponding participant definition 208 when registering with the agent server 140. Additionally, each share definition and consume request definition is identified within a participant definition 208 using a URI.

A participant definition for a semantic form is referred to as a view definition as it defines the basis for how a view is generated for the semantic form, including its presentation, behavior, and the form data used to populate the view.

The participant class indicates whether the participant is a server-side participant or a client-side participant.

The participant configuration information includes a description of the participant type and other desired declarations, enabling the storage of configuration information for software systems in their corresponding participant definitions 208. The participant configuration information can also include a list of URIs for consume request definitions established for the participant definition 208. Participants can get access to the participant configuration information for their participant type by registering a special type of consume request called a directory consume request for it with the agent server 140. Examples of participant configuration information include a name for the participant, a description for the participant, and a URL for a resource or other server computer to connect to.

The participant configuration information for a semantic form includes view configuration data. The view configuration data is interpreted by JavaScript code within a web browser on a personal computing device to generate a view. The view configuration data is made up of a set of RDF declarations that determine at least part of the presentation, behavior, and form data of the view rendered therefrom. The semantic form framework, through the use of widgets and styles, includes all of the standard web interface features a user expects: grids, tables, images, data visualization, checkboxes, sliders, spinners, text areas, etc. These various widgets and styles have been pre-defined to allow for rapid creation of views. Values from the collaboration can be used as parameters for these widgets by identifying these values with data keys in the consume request definitions and then placing these data keys into the locations in the view configuration data in which the values are to be injected. The data keys are passed back with the values from the collaboration and can be used to identify the locations into which to insert these values.

The view configuration data can specify styles to be applied to the form when rendered. These styles are defined in CSS.

The declarations and other information in a view definition for a semantic form are static in that they do not change during the course of a collaboration.

The share definitions in a participant definition 208 represent the sets of data items allowed to be shared by a participant type. Each share definition delimits and identifies a set of information that the participant type may provide to the collaboration. Each participant type can have zero to many share definitions. The share definitions provide a list of the data items to be shared, including the formal semantic definition for these data items to permit useful matching and discovery of the data items by the reasoner module of the agent server 140, as well as transformation of the data items.

As previously noted, share definitions are uniquely identified by URI. In addition, each data item specified in a share definition has a formal definition that is identified using a URI. Uniqueness across all the software systems enables each use of that data item identifier (i.e., the URI) to reliably identify a data item with the same characteristics. In simple terms, if software system A publishes a value for data item with a URI of http://example.com/2010/C1 and software system B wants to consume data with a semantic description matching that of the data item, it can count on the fact that the data item with the URI http://example.com/2010/C1 from software system A is the expected data.

At runtime, when a participant wants to share data item values, it refers to the URI of a valid share definition specified in the participant definition 208 corresponding to the type of the participant and passes along the values. This limits information shared by the participant to a subset of the information specified in the share definitions set out in the participant definition 208.

As previously noted, consume requests are akin to standing queries for values of shared data items to which the sets of data specified in the consume requests semantically resolve as they become available (thus satisfying the consume requests), are updated while the consume request is satisfied, and/or are removed from the collaboration (thus causing the consume requests to become unsatisfied). In all of these cases, the state of the consume requests change. The consume request definitions specified in the participant definition 208 delimit the consume requests allowed to be registered by a participant. Each consume request definition specifies a standing query for data from the collaboration with sufficient semantics to enable the agent server 140 to semantically resolve the requested data to the values of one or more data items, when available. Each participant type can have zero to many consume request definitions. The consume request definitions in a participant definition 208 for a software system type are standing queries written in the SPARQL Protocol and RDF Query Language ("SPARQL") that is another W3C specification for querying information semantically.

As previously noted, consume request definitions are identified by URIs. When a participant registers with the agent server 140, it provides a list of consume request definition URIs that it wants to be notified for; those URIs should relate to a subset of the consume request definitions defined in the participant definition 208. When a participant provides the URIs of one or more consume request definitions with the participant registration request, it is said that it is registering consume requests.

Consume request definitions generally are defined for data shared by other software systems, but can also include information from the participant definition 208 that is instantiated in the collaboration. Such consume request definitions are referred to as multi-graph consume request definitions. Multi-graph consume request definitions can specify a preference for requested data from the participant definition or from the data shared by other software systems. That is, a multi-graph consume request definition can specify a query for data in the participant definition and data shared by other software systems, but that one overrides the other where there are overlaps.

Consume request definitions can be defined to look for information from the participant definition 208 only. These consume request definitions are referred to as directory consume request definitions, and consume requests derived from such consume request definitions are referred to as directory consume requests, as the information being requested is ultimately stored in the participant definition 208 in the directory 146. This enables configuration information used by participants of that type to be stored in the participant definition 208, thereby permitting its central management and removing the need to recode participant types for configuration changes.

In the current implementation, each participant definition 208 includes a single primary directory consume request definition, and its URI is designated using a standard naming convention given the participant definition URI. Further, participant definitions 208 can also specify one or more secondary directory consume request definitions.

A participant type can be designed to register a directory consume request for configuration information, and then use the configuration information once received from the agent server 140. This enables the configuration of a participant to be changed as needed via changes to the configuration information in the participant definition 208.

In order to support automated discovery of allowable consume requests, participant types can be configured to register with the agent server 140 with a primary directory consume request for a list of consume request definition URIs from its corresponding participant definition 208, and then re-register with consume requests corresponding to the list of consume request definition URIs found in the participant definition 208.

A subset of the list of consume requests found in the configuration information of the participant definition 208 return view configuration data from the participant definition 208 that is instantiated in the collaboration. Of note is that changes to the view configuration data in the participant definition 208 will only be implemented in collaborations created thereafter and will not affect previously-created collaborations.

For semantic forms, the consume request definitions can specify additional view configuration data to be received from other software systems. This enables other software systems to influence the view generated for a semantic form.

Consume request definitions for providing values to semantic forms include unique data keys identifying each value in the consume request that match data keys placed in the view configuration data. The data keys enable the insertion of values satisfying the consume requests into the appropriate location in the view configuration data. These data keys match the identifiers used in the view configuration data that was previously provided to identify how the data should be used. Where the retrieved values are presented via a generated view as information for a user, but are not generally used to modify the look or behavior of a view, they are referred to as form data.

These artefacts are static as they don't change based on the current context of any user. The directory 146 holds these definitions and, whenever other components of the system need access to this information, they request it from the directory server 144. The definitions can be updated in the directory 146 and immediately have the agent server 140 use the updated definitions for new collaborations.

Ontology datasets 212 provide information about data items and how they are interrelated. The ontology information from the ontology datasets 212 extends the semantics of the participant share definitions and consume request definitions by stating relations between the semantic descriptions of the data items. Using these relations, the reasoner module of the agent server 140 can semantically resolve information requested in consume requests to data item values shared in the collaboration despite mismatches in the literal identifiers of the data specified in the consume request definitions and the data items in the share definitions of the various participants.

Initialization datasets 216 are also specified in Turtle and include a set of RDF statements for data that can be used to populate a collaboration at initialization. The data can include, for example, days of the week, months of the year, number of days in each month, provinces and states, etc.

The directory server 144 can store user-specific information, like the user's name and login credentials, on behalf of the user for resources that are accessed by a participant during a collaboration in user datasets 220. These resources can be web pages, databases, services, etc. The agent server 140 collects login credentials for each site and system from interactions of the user with the site via a participant and stores them in the user dataset 220 maintained for the particular user; that is, the user datasets 220 are associated with identities of the users. The user datasets 220 may also be proactively populated with these login credentials. The user datasets 220 are not referenced by any collaboration definitions 204. Instead, the user dataset 220 corresponding with the identity of the user is retrieved by the agent server 140 from the directory server 144 when creating a collaboration for a user based on user identity available from the user's authentication token.

The directory server 144 stores various JavaScript libraries and modules 224 that are used in the process of generating and rendering semantic forms, as well as enabling them to participate in collaborations. These include an agent JavaScript API, a semantic form util module, a semantic form library, a form engine library, a layout engine library, a basic widgets library, and a complex widgets library. The functionality provided by these various libraries and modules will be described hereinafter.

The directory server 144 has a minimal administrative user interface for facilitating access to and management of the artefacts, but most of the capability is exposed as a HTTP and HTTPS API that affords flexibility in its location. The API provides access to the artefacts and supports operations like create, update and delete, as well as more complex logical operations like adding a participant type to a collaboration definition.

The identity server 148 acts as an identity gateway and may manage the identity of users in the system, including any roles that the users have. These identities are used by the agent server 140, the directory server 144 and the connector server 152. The agent server 140 reviews the roles the user has, as provided by the identity server 148, to determine if the user is authorized to launch certain collaborations in accordance with configuration information in the directory server 144.

There are a number of ways in which software systems can identify themselves with a user. Software systems that execute at least partially on a user's personal computing device can be configured with user credentials, can retrieve these user credentials from another location or directory, or can obtain them from the user as part of the initialization process. When one software system provides the user credentials to the agent server 140, the agent server 140 relays them to the identity server 148, which generates and returns a user token associated with the identity of the user to the software system to the agent server 140 if the user is authenticated. The agent server 140 provides the user token to the software system, which can then share this user token with other software systems on the personal computing device.

Where a user attempts to launch a collaboration that is accessed through a semantic form on a web page, the request for the web page is made to the directory server 144. In this case, the directory server 144 returns a login web page into which the user can enter his credentials. The directory server 144 then relays them to the identity server 148, which generates and returns a user token associated with the identity of the user to the directory server 144. The directory server 144 then embeds the user token into the browser cookie for its domain and returns it to the web browser, along with the web page that the web browser initially requested. Thereafter, each time that web browser attempts to access a web page that is access-restricted on the directory server 144 (such as is the case for all web pages that include semantic forms), the directory server 144 extracts the user token from the browser cookie that is presented with the request.

Alternatively, other software systems can be configured with the same user credentials and use the same process to receive a user token corresponding to the same identity. The software systems of the stateful data-sharing service can then use these user tokens to assert the identity of the user with various components of the stateful data-sharing service.

The connector server 152 executes "connectors" that provide access to resources. Each connector is a generally stateless service that provides functionality to interact with a particular resource type, such as an SQL database or a REST server, or to perform a particular type of translation. Connectors are interacted with via server-side participants known as proxy connector participants. Proxy connector participants are instantiated and registered in a collaboration by the agent server 140 when the proxy connector participant is identified as a participant in the collaboration definition 204. When a consume request is satisfied for a proxy connector participant, the agent server 140 notifies the proxy connector participant with the following information:
  the user token;
  a participant token generated by the agent server 140 that uniquely identifies the connector participant;
  the participant definition URI;
  the URI of the consume request definition that was satisfied;
  the data item values satisfying the consume request; and
  the transaction ID, if any.

In response, the proxy connector participant passes this information, except for the participant token and the transaction ID, to the appropriate connector server 152. The connector does not need the participant token as it does not need to know which collaboration it is participating in or for what transaction, and merely performs the action requested by the proxy connector participant as long as the identity associated with the user token has the appropriate rights to do so.

Upon receiving the information from the proxy connector participant, the connector server 152 requests the consume request definition corresponding to the participant URI and consume request URI from the directory server 144. The consume request definitions include the URL for the resource to be connected to, the syntax of the message to be sent to the resource, and any required parameters for such communications. In many cases, consume request definitions for proxy connector participants involve retrieving data from a resource. For example, data item values from a collaboration can be used to generate a structured query language ("SQL") query to a database that returns one or more values. In such cases, a share definition associated with the consume request definition in the participant definition 208 is returned by the directory server 144 with the consume request definition.

The connector confirms that it has the right to perform the requested action on behalf of the identity associated with the user token and then performs the requested action. If there is an associated share definition, the connector provides the data item values for the share definition, together with the share definition URI, to the proxy connector participant for sharing with the collaboration. Upon providing any results back to the proxy connector participant, the connector server 152 and the connector retain no knowledge of the data exchange; i.e., they are stateless. The proxy connector participant can then share the resulting data item values, if any, from the connector with the agent server 140 using the share definition URI and the transaction ID, if any.

When the agent server 140 destroys a collaboration, it also destroys the proxy connector participants registered in that collaboration.

The data consumed and shared by connectors is tightly restricted by the consume request definitions and share definitions set out in the corresponding participant definitions 208. Thus, the connectors will not share or consume data unless explicitly specified.

Connector types include, but are not limited to, database connectors, REST connectors, terminal services connectors, web connectors, content connectors, and persist connectors.

Database connectors enable the exposing of data in a database in a collaboration. In response to receiving the above-noted information from the proxy connector participant, database connectors generate and execute database queries on or writes data to the database 52 via the database server computer 28. In the case of a database query, database connectors return the results to the proxy connector participant that shares them with the collaboration. Thus, as new data forming part of the basis for a query is added to the collaboration, the data is passed to the database connector, which forms a query or write message sent to the database server computer 28, and the collaboration is further enhanced by the corresponding new query results.

REST connectors enable web services data to be exposed in a collaboration. In response to receiving the above-noted information from the proxy connector participant, REST connectors generate and transmit HTTP Get requests to a REST server computer for data accessed via the REST server computer. After receiving data back from the REST server computer, REST connectors return any results to the proxy connector participant that shares them with the collaboration. Alternately, the consume request definition may direct REST connectors to generate and transmit HTTP POST requests to a REST server computer to cause a change in the data maintained via the REST server computer.

Terminal services connectors expose terminal services data in a collaboration. In response to receiving the above-noted information from the proxy connector participant, terminal services connectors generate and transmit terminal commands to a terminal server computer. Any data returned by the terminal server computer can be returned by the terminal services connector to the collaboration via the proxy connector participant.

Web connectors enable data exchange with web applications that are not designed to natively interact with collaborations. In response to receiving the above-noted information from the proxy connector participant, web connectors complete a request for a web page, either by completing a form or by generating a request for a web page with a Universal Resource Locator ("URL") constructed using the data. The web connector then returns data from the resultant web page to the proxy connector participant so that it can be shared in the collaboration.

Content connectors expose file contents in a collaboration. They are used to access content from applications such as Microsoft Excel or flat file text formats. In response to receiving the above-noted information from the proxy connector participant, content connectors generate read or write requests for a data source. Where data is read by the content connector, it is passed back to the associated proxy connector participant for sharing in the collaboration.

Persist connectors enable the persistence of data from the collaboration beyond the lifetime of the collaboration where explicitly configured to do so. The agent server 140 stores data shared in a collaboration in a volatile manner to afford it security. In some scenarios, however, it can be desired to persist data across collaborations for a user. For example, it can be desirable to store an audit trail of the information available in the collaboration instance data across the lifetime of multiple collaborations. In response to receiving the above-noted information from the proxy connector participant, persist connectors store specified data persistently or retrieve data stored in RDF statements in a datastore it maintains. Alternatively, this data could be stored by the persist connectors in the directory 146. The consume requests for the persist connectors are designed so that only the data that should persist beyond the lifetime of a collaboration does.

Additionally, the connector server 152 executes "transformers" that perform translations on the data. Transformers are similar to connectors and are invoked by the agent server 140 in a similar manner, but do not connect to other resources. Transformers transform data in a collaboration from one form to another. For example, transformers can perform a simple transformation on data provided by a proxy transformer participant and then provide the transformed data back to the proxy transformer participant to share in the collaboration for other participants to consume. A first example of a data transformation is the conversion of data values from one unit of measure to another. Another example of a transformation performed by transformation connectors is the reformatting of dates from one format to another.

Each connector (or transformer) and its associated proxy connector participant (or proxy transformer participant), if any, when configured using a participant definition 208, and the resource(s) and/or other server computer(s) it connects to form a software system that can participate in a collaboration.

Collaboration and Participant Life Cycles

The life cycles of collaborations and participants are intertwined. While a participant can exist without a collaboration, it neither adds value to others nor is its own data enriched. Likewise, a collaboration without participants can neither aggregate new information nor share any information that it might have previously obtained from a participant that is no longer active.

Figure 5:
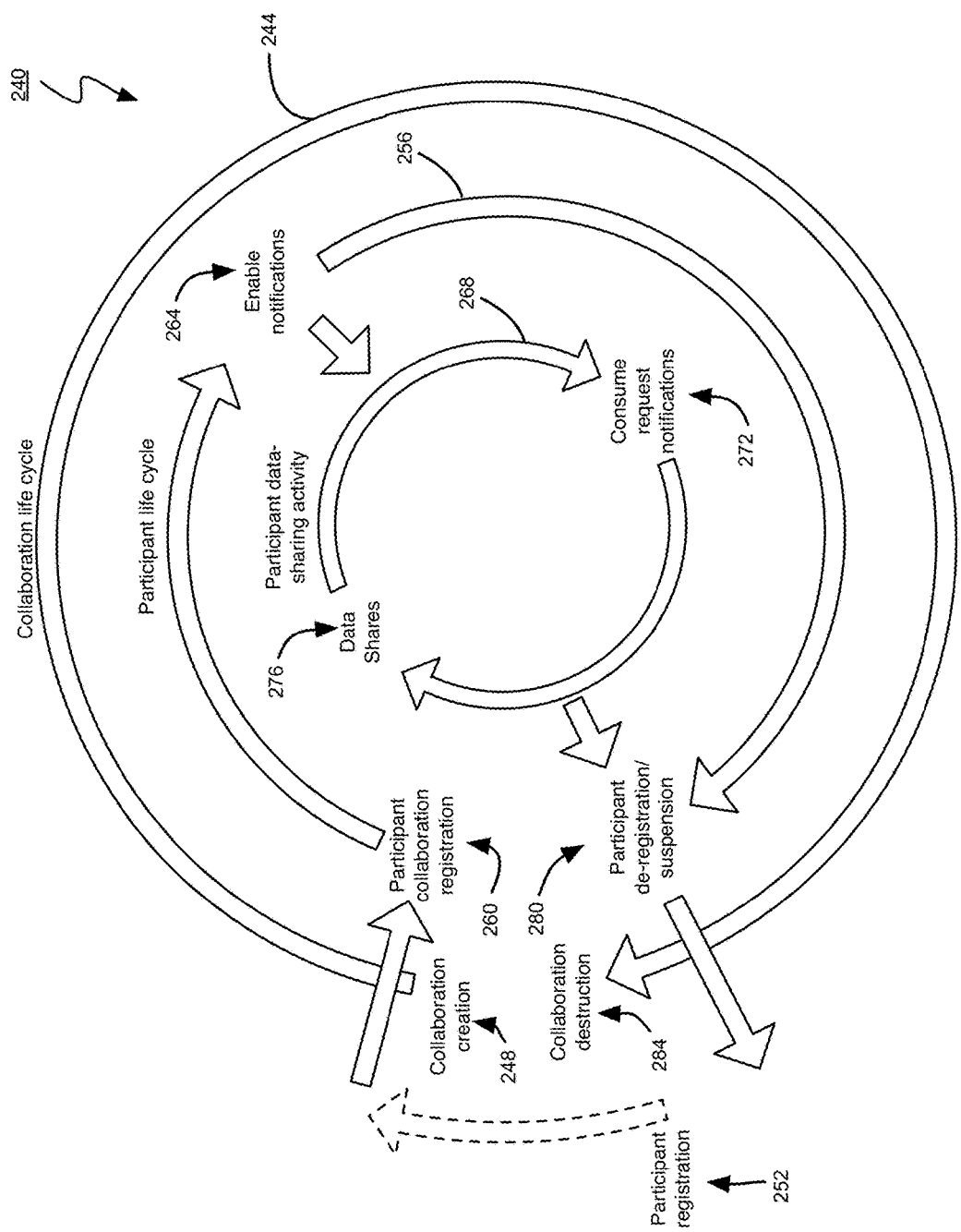
FIG. 5 shows the general lifecycle for a collaboration in the system of FIGS. 1 to 3.

FIG. 5 shows the life cycles of collaborations and participants. A collaboration life cycle 244 is shown. Collaboration creation 248 is effected by the agent server 140 in response to receiving a collaboration creation request. As noted above, collaboration creation requests are typically generated by one of the software systems that would like to participate in a collaboration or some programming code that is related thereto. The agent server 140 creates a collaboration should it determine that certain conditions have been met.

If a participant registration 252 with the agent server 140 occurs prior to the availability of a collaboration that it can join, the participant is made pending until such a corresponding collaboration is created. Participant life cycles 258 within the collaboration life cycle 244 commence with a participant collaboration registration 260. As software systems configured to participate in the collaboration generate registration requests, the agent server 140 registers these participants in the collaboration. Additionally, if a participant has registered prior to the creation of the collaboration, the pending participant is registered into the collaboration by the agent server 140 when the collaboration is created. The registration requests received from the software systems include consume requests in the form of identifiers of the consume request definitions from the corresponding participant definitions 208 for the sets of data item values that the software system wishes to receive updates for. The participant may be configured to request to commence receiving notifications of updates to sets of data item values in the collaboration matching its consume request(s) via an enable notifications request 264 either immediately or at a later time. In some cases, a participant may be configured to delay receiving notifications of data item values as they become available (thus causing a change in state of its consume requests), are updated while the consume request is satisfied, and/or are removed from the collaboration (thus causing the consume requests to become unsatisfied) until the participant has completed its initialization.

Once the enable notifications request 264 from a participant has been received, the participant data-sharing activity 268 commences. When the agent server 140 processes the enable notifications request 264, it evaluates all consume requests registered for the participant to determine whether the state of a consume request has changed. If the satisfaction state of any consume request has changed, or if the values that satisfy a consume request change, the agent server 140 flags the consume request for notification as its state has changed. Additionally, when data item values are received by the agent server 140 from any participant and updated in the collaboration instance data, the agent server 140 determines which registered consume requests, if any, have states that have changed and flags these consume requests for notification. Participants poll the agent server 140 regularly for consume request notifications. When the agent server 140 receives this poll message, it replies with an identification of the registered consume requests that have undergone state changes via a consume request notification 272. Upon receiving the consume request notification 272, the participant generates a request for the data item values identified as updated in the consume request notification 272 and is provided these values by the agent server 140. If the consume request notification was triggered as a result of the consume request becoming unsatisfied, the agent server 140 provides a notice of the consume request's state to the participant instead of the values. During the course of participant data-sharing activity 268, the participant can provide data to the collaboration via data shares 276. The pattern of data shares 276 and consume request notifications 272 can vary entirely from participant to participant. Participants may be configured to only share data, to only consume data or to both share and consume data. It will be understood that the data-sharing activity of one participant can impact the pattern of consume request notifications for another participant.

The participant life cycle 256, and thus the participant data-sharing activity 268, can end in a number of manners, including the de-registration of the participant in the collaboration via a de-registration or suspension request generated by the participant, or the destruction of the collaboration. A participant can generate a de-registration request or suspension request 280 to indicate that it would like to permanently or temporarily stop participating in the collaboration. The agent server 140 receives polls from participants regularly or intermittently to check if there are updated values they would like to receive. If the agent server 140 has not received a poll from a participant within a specified period of time, it can suspend and/or de-register the participant. Where a participant has been suspended, consume request notifications 272 are halted until the participant becomes active again via a participant collaboration registration 260. During this period of participant suspension, the agent server 140 continues to determine which consume requests for the participant have undergone state changes, and flags these consume requests. Upon re-registration of the suspended participant, the agent server 140 notifies the participant of the consume requests that have undergone state changes since suspension. Where a participant has de-registered and then registers again via a participant collaboration registration 260, the agent server 140 treats the participant as if the participant never previously participated and evaluates all consume requests for the participant to determine if any have undergone state changes. After a software system has registered, it may share data in the collaboration. The data to be shared may be generated by the software system independent of data received from a collaboration as part of a new transaction, or may be generated in response to receiving data from a collaboration and form part of that existing transaction.

Collaboration destruction 284 is effected by the agent server 140 upon determining that the collaboration is unlikely to provide further benefit or when the agent server 140 receives an explicit instruction from a participant to do so. For example, where there has been no data-sharing activity in the collaboration for a period of time, or where there are no remaining participants registered in the collaboration, the agent server 140 may destroy the collaboration.

Figure 6:
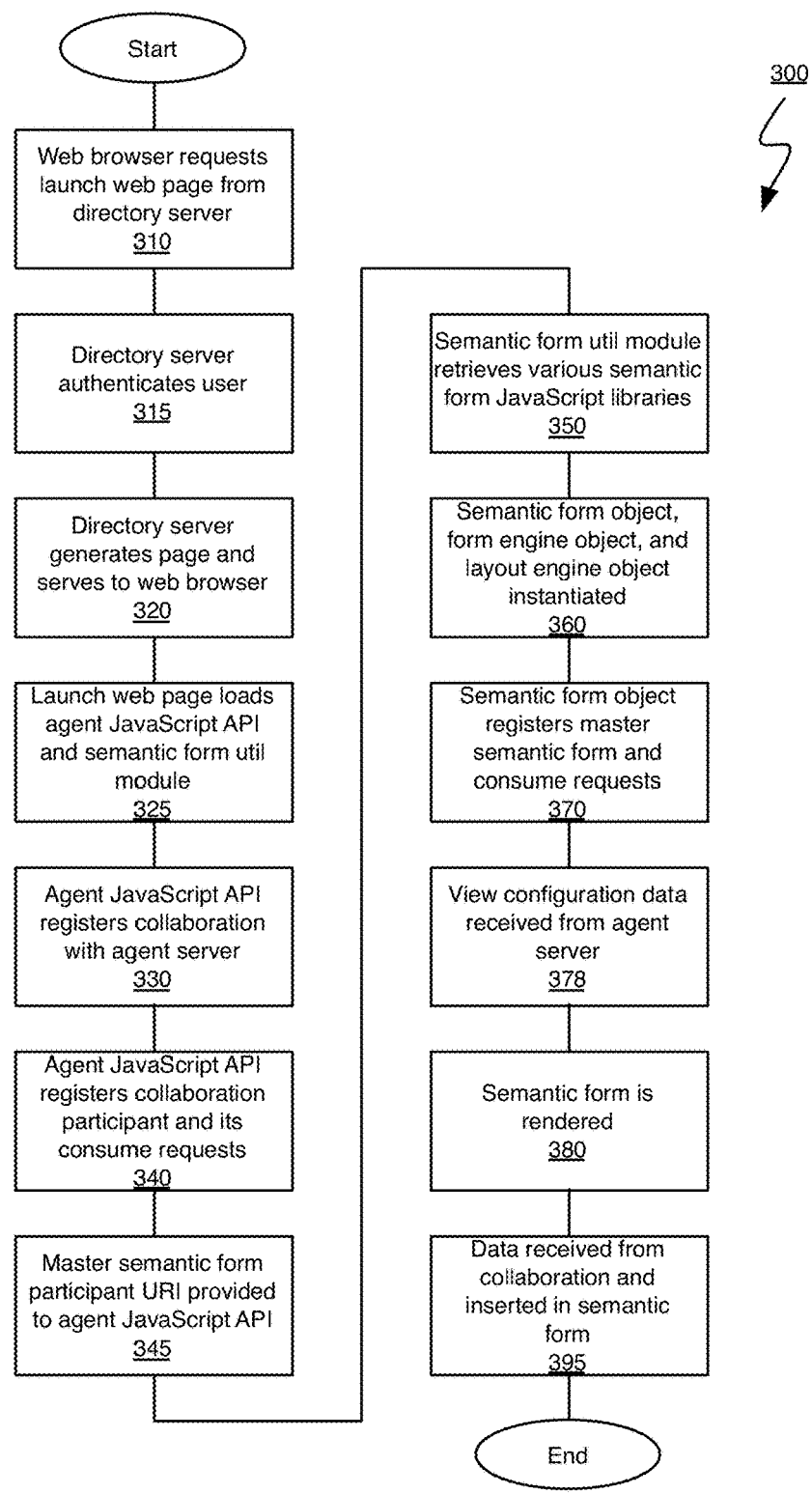
FIG. 6 is a flow chart of the general method of generating a view with a semantic form via the system of FIG. 1.
Figure 7:
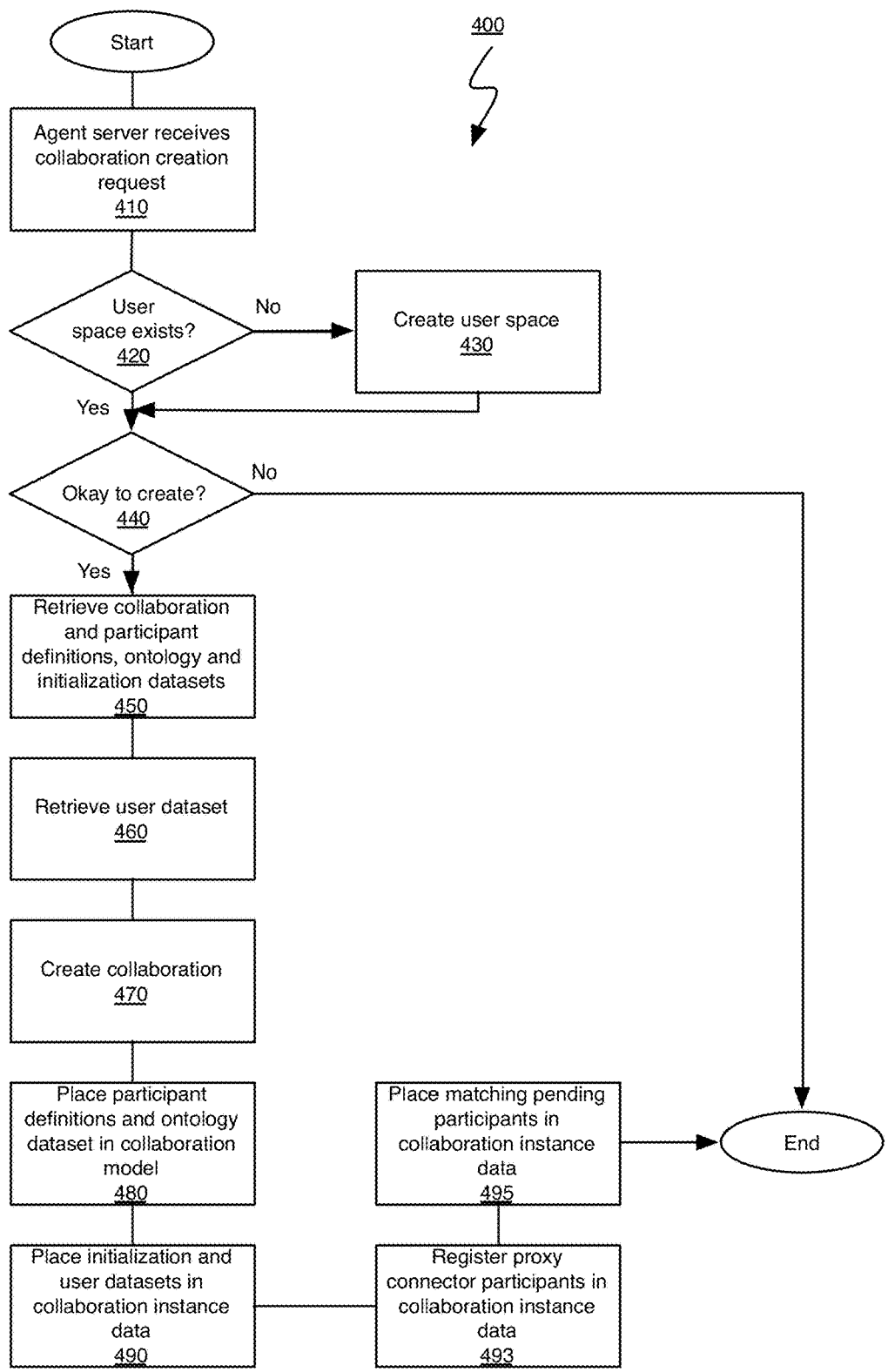
FIG. 7 is a flow chart of the general method of creating a collaboration employed by the data-sharing server computer system of FIGS. 1 to 3.

FIG. 6 illustrates a general method 300 of generating a view via a semantic form. In the method, a web browser requests a launch web page that is to include a semantic form, and, in response, various JavaScript code is retrieved from the directory server 144, a collaboration is launched, the semantic form participates in the collaboration to receive view configuration data, and a view is rendered in the web browser.

The method 300 commences with the web browser requesting from the directory server 144 the launch web page in which a view generated by the semantic form is presented (310). For example, the user may activate a hyperlink with the URL of the launch web page, such as http://dirserv.example.com/launch?uri=http://www.example.com/semanticformapp/collab. The URL includes the hostname (dirserv.example.com) that maps to the web service of the directory server 144, the path of a generic launch web page for the semantic form (/launch), and a collaboration definition URI passed as a parameter (http://www.example.com/semanticformapp/collab). The launch web page is a shell in which views generated by semantic forms are presented.

The directory server 144, upon receipt of the request, authenticates the user (315). It determines from the browser cookie for its domain whether there is a user token present. If a user token is found in the domain cookie, the directory server 144 passes the user token to the identity server 148 for authentication. If the identity server 148 notifies the directory server 144 that the user token is authenticated, the directory server 144 is satisfied that the user is authenticated. If, instead, the directory server 144 is notified that the user token is not authenticated, or if a user token is not located in the browser cookie, the directory server 144 presents a login web page enabling the user to enter his user credentials for the system 20. The directory server 144 then passes these user credentials for authentication to the identity server 148. Upon authenticating the user credentials, the identity server 148 generates a user token and returns it to the directory server 144 for placement in the domain cookie.

Upon authenticating the user, the directory server 144 generates a launch web page and serves it to the web browser on the personal computing device 24 (320). The launch page is a JavaServer Page ("JSP") that is generated dynamically by the directory server 144. The launch page generated includes a JavaScript loader to retrieve core JavaScript modules stored by the directory server 144. In addition, the directory server 144 also injects into the launch web page the collaboration definition URI initially passed with the first request as a parameter.

Upon receipt, the web browser on the personal computer 24 executes the JavaScript loader on the launch web page to retrieve the core JavaScript modules from the directory server 144 (325). The core JavaScript modules include an agent JavaScript API and a semantic form utilities ("util") module. The agent JavaScript API establishes a communication channel with the agent server 140 and then exposes the API of the agent server 140 locally. The semantic form util module is responsible for the creation and management of semantic forms on the launch web page. Upon retrieval of the core JavaScript modules, the web browser loads them.

When executed, the agent JavaScript API sends a collaboration registration request to the agent server 140 (330). The collaboration registration request includes the collaboration definition URI injected into the launch web page by the directory server 144. Upon receiving the collaboration registration request, the agent server 140 creates and registers the collaboration. In the process, it generates a collaboration ID that it returns to the agent JavaScript API. The agent JavaScript API stores the collaboration ID and transmits it to the agent server 140 with each communication for that collaboration to the agent server 140.

Collaboration Creation

The method 400 of creating a collaboration will be described with reference to FIGS. 1 to 7. This method 400 commences with the agent server 140 receiving a collaboration creation request (410). The collaboration creation request is typically generated by a software system that is configured to participate in a collaboration, such as a semantic form, but may be also generated by another related software system. This collaboration creation request includes a user token associated with the identity of the user (passed via the browser domain cookie) and the URI of the collaboration definition 204 to be used to create a collaboration. In addition, a collaboration ID may optionally be provided with the collaboration creation request. The collaboration ID uniquely identifies a collaboration to enable referral to the specific collaboration in communications from the participants to the agent server 140. One or more participants may be provided with this collaboration ID prior to attempting to join a collaboration to ensure that they share data with other specific participants. Where a collaboration is launched via a launch web page for a semantic form, the launch web page does not typically provide a collaboration ID with the collaboration registration request.

Upon receiving the collaboration creation request, the agent server 140 then determines if it is already managing a user space for the user (420). The agent server 140 maintains user spaces for each user that has ever had an active collaboration or one or more active participants waiting to join a collaboration. These user spaces are tied to the identities of the users managed by the identity server 148. If the agent server 140 determines that a user space does not exist for the identity associated with the user token provided with the collaboration creation request at 420, the agent server 140 creates a user space (430).

The agent server 140 then determines if creation of the collaboration is possible (440). In order for the agent server 140 to create a collaboration, a number of conditions must be met. The directory server 144 must be responding to communications from the agent server 140. A collaboration definition 204 having the collaboration definition URI specified in the collaboration creation request must exist in the directory 146. The collaboration ID (if provided) must not already be in use for the particular user. If any of these conditions are not met, then the method 400 ends.

If, instead, the agent server 140 determines that creation of the collaboration is possible, it sends a request via HTTPS to the directory server 144 to retrieve the collaboration definition 204 identified by the collaboration definition URI specified in the collaboration creation request and referenced artefacts (450). The directory server 144 retrieves the specified collaboration definition 204 from the directory 146 and parses it to determine what participant definitions 208, ontology datasets 212, and initialization datasets 216 are referred to therein. The collaboration definition 204 specifies these artefacts by URI. The directory server 144 then retrieves each of these additional artefacts and returns the collaboration definition 204, as well as the referenced participant definitions 208, ontology datasets 212 and initialization datasets 216, back to the agent server 140. The agent server 140 then requests the user dataset 220 that contains user-specific data, such as the user's name and login credentials for services accessed by the user in interacting with various participants, from the directory server 144 (460). The directory server 144 retrieves the user dataset 220 from the directory 146 and returns it to the agent server 140.

Upon retrieving all of the artefacts and user data associated with the collaboration, the agent server 140 creates the collaboration (470). The agent server 140 maintains the collaboration in volatile storage, such as RAM 108 and/or a swap file, so that none of the information therein is stored persistently unless explicitly specified. A unique identifier for the collaboration, referred to as the collaboration ID, is generated for the collaboration by the agent server 140 if it was not provided with the collaboration creation request.

The agent server 140 then places the participant definitions 208 and the ontology datasets 212 in the collaboration as a collaboration model (480). The collaboration model stores what is referred to as directory information; that is, information that is retrieved from the directory 146. The collaboration model serves as a policy description of what data the participants can and cannot share and request, and provides configuration information for the participants and collaboration. Further, the ontology information from the ontology datasets 212 extends the semantics of the participant share definitions and consume request definitions, enabling the reasoner module of the agent server 140 to semantically resolve information requested in consume requests to data items shared in the collaboration. The agent server 140 generates a graph data structure definition in the collaboration model from the collaboration definition 204, and the share definitions, consume request definitions, and participant configuration information in the participant definitions 208 using the ontology datasets 212.

Once the information model for the collaboration is complete, the agent server 140 places the initialization datasets 216 and the user dataset 220 into the instance data of the collaboration (490). The instance data represents data that can change during the lifetime of a collaboration. As previously noted, the initialization datasets 216 contain parameters used within collaborations, such as the number of days in each month, the names of provinces and states, etc. The user dataset 220 contains login credentials and other user-specific information, such as a name.

Upon instantiating the collaboration model and instance data, the agent server 140 registers any proxy connector participants and proxy transformer participants in the collaboration instance data (493). If there are proxy connector participants or proxy transformer participants specified for the collaboration, as identified by the participant definitions 208 referenced in the collaboration definition 204, the agent server 140 registers the proxy connector participants and/or proxy transformer participants in the collaboration instance data.

The agent server 140 then registers any matching pending participants in the collaboration instance data (495). Participants that registered with the agent server 140 prior to the availability of a joinable collaboration with capacity and were made pending can now be registered in the newly-created collaboration if their participant definition URI is included in the collaboration definition 204 and the collaboration has capacity for a participant of that type. Upon registering any matching pending participants, the method 400 of creating a collaboration is complete.

Figure 8:
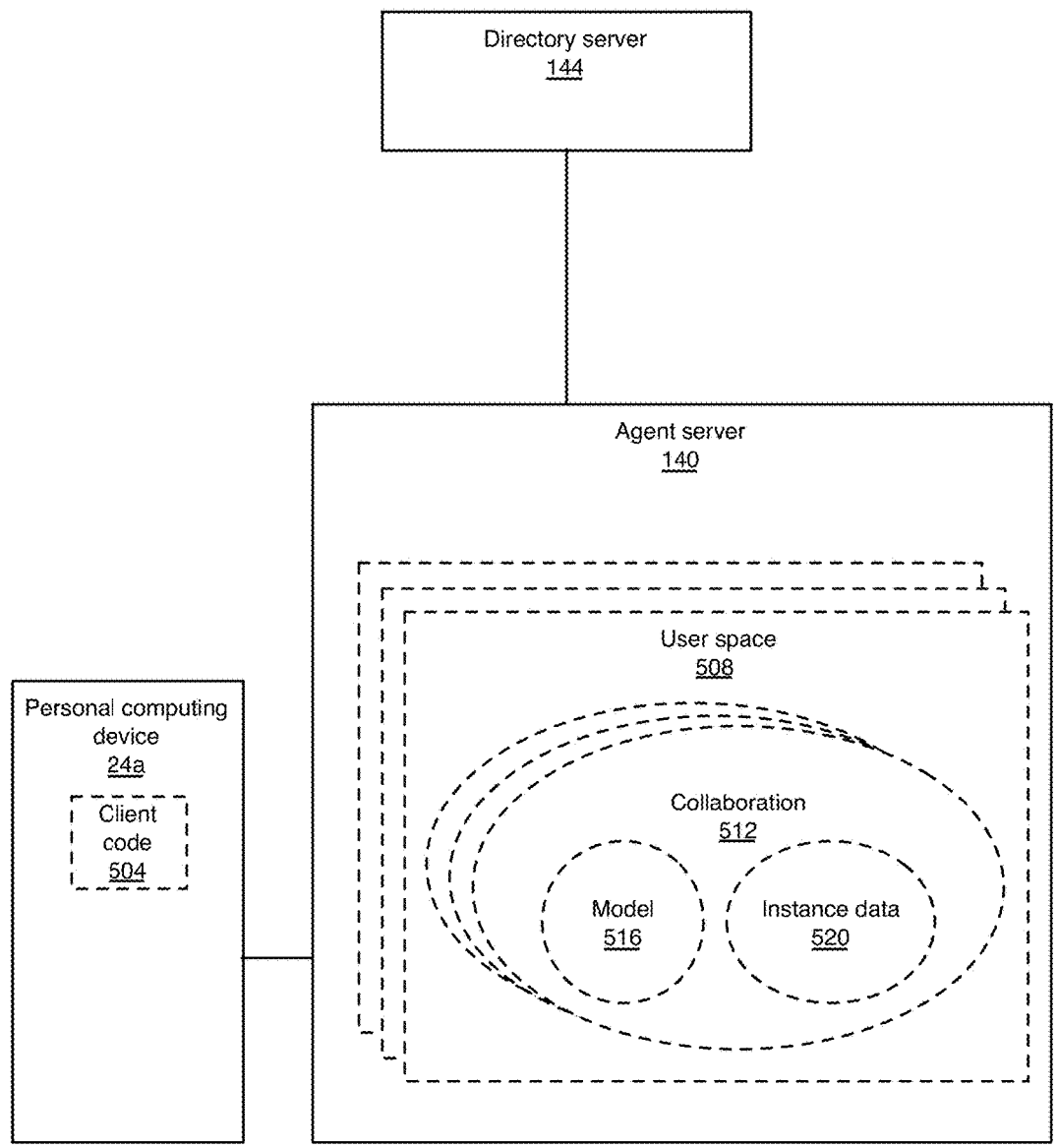
FIG. 8 illustrates the logical creation of a collaboration by the data-sharing server computer system of FIGS. 1 to 3.
Figure 9A:
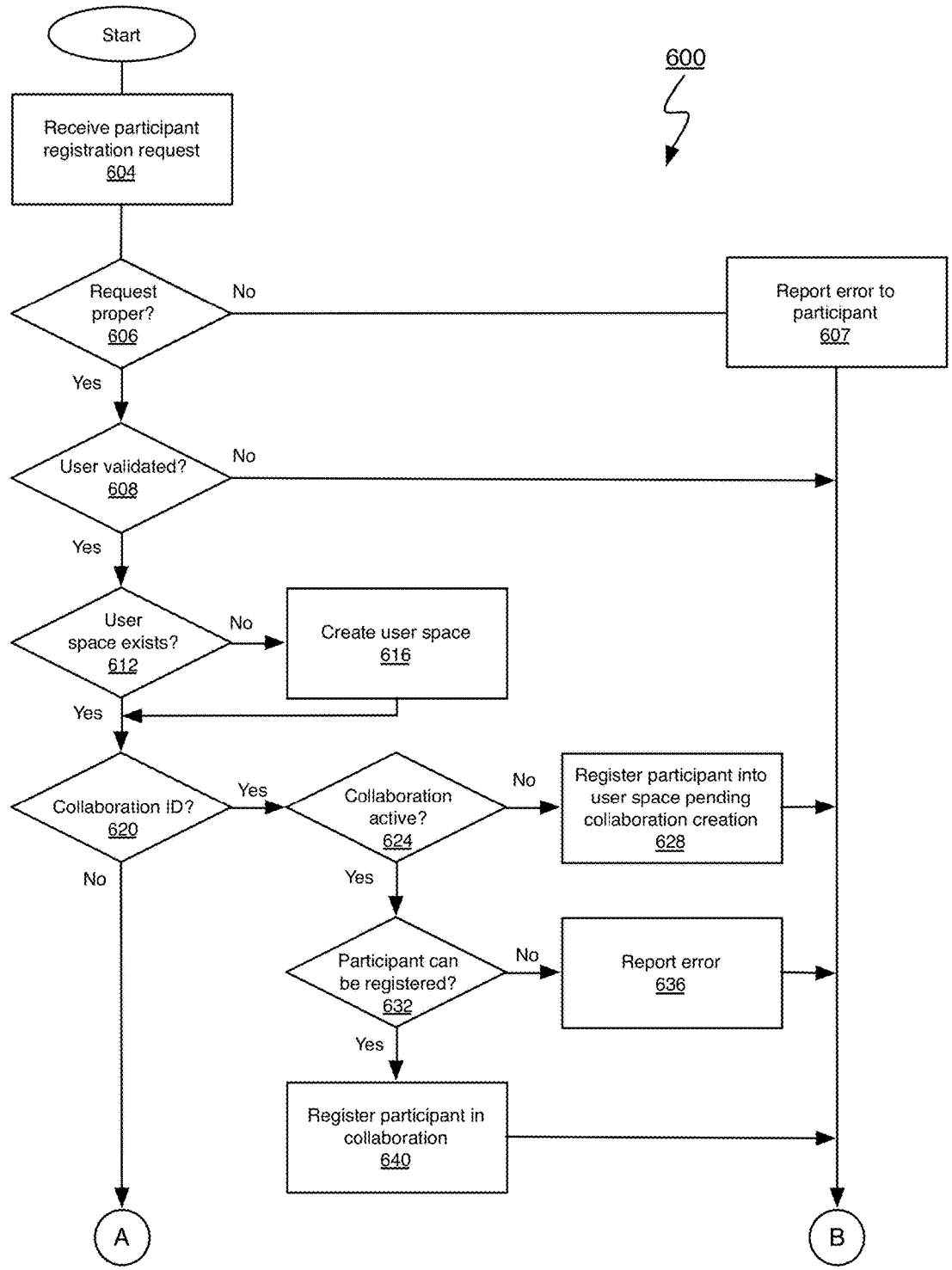
FIGS. 9A and 9B show a flow chart of the general method of registering a client-side participant by the data-sharing server computer system of FIGS. 1 to 3.
Figure 9B:
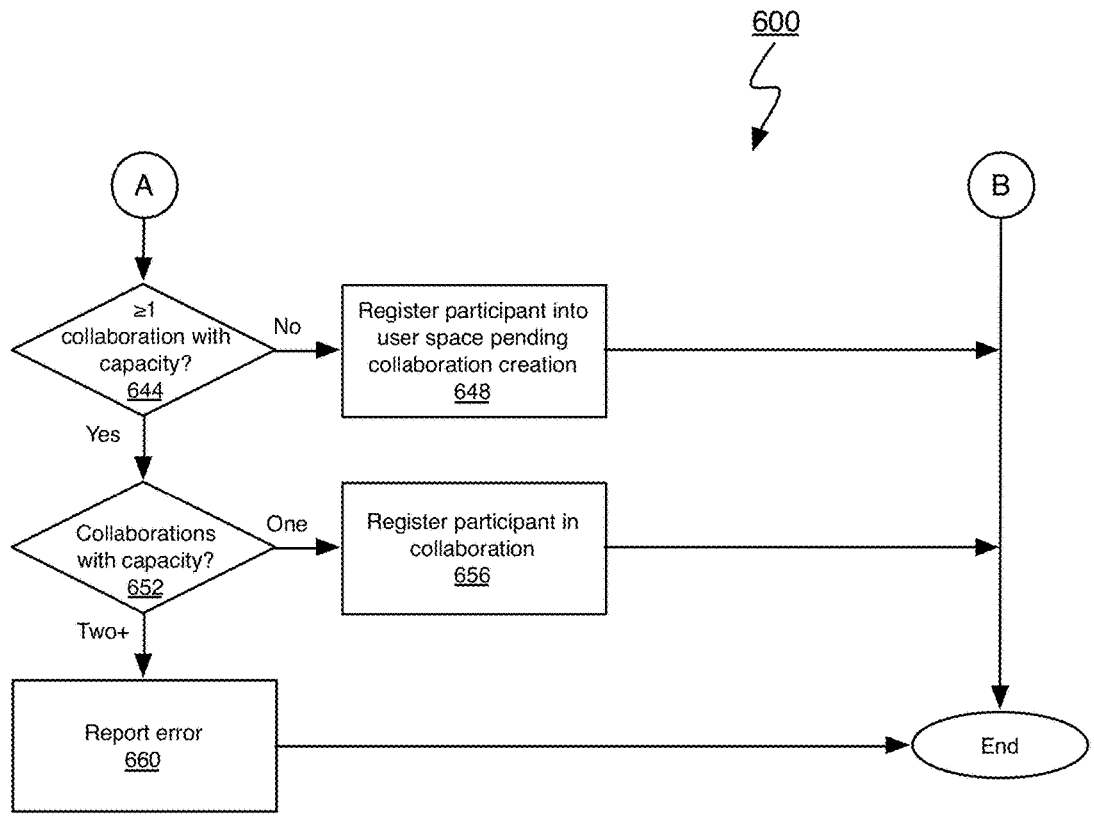

FIG. 8 illustrates client code 504 executing on a personal computing device 24a that communicates a collaboration creation request to the agent server 140 via the API made available by the agent server 140 to launch a collaboration. In the case of a collaboration created during the process of launching a semantic form, the client code 504 represents the agent JavaScript API. The agent server 140 manages a number of user spaces 508 in virtual memory spaces that are isolated from each other to avoid cross-contamination of data. Within each user space 508, the agent server 140 can maintain one or more collaborations 512 created via method 400. Each collaboration 512 contains a collaboration model 516 and instance data 520. The collaboration model 516 contains a set of RDF triples (i.e., declarations) representing information about the participant types allowed to join the collaboration, the participant configuration information including any view configuration data, the share definitions and consume request definitions for each participant type, the ontology sets that are employed to resolve consume request definitions to data items in the share definitions, and any collaboration destruction conditions from the corresponding collaboration definition. The instance data 520 also contains a a set of RDF triples representing a list of currently registered participants and consume requests, initialization data, user data such as name and login credentials, log files for activity in the collaboration, and any data item values shared by any participant during the life of the collaboration.

Returning again to FIG. 6, once the agent server 140 has created and registered the collaboration, the agent JavaScript API registers a collaboration participant and its primary directory consume request with the agent server 140 (340). The agent JavaScript API has prior knowledge of the form of the collaboration participant URI and its primary directory consume request given the URI of the collaboration definition. That is, given the collaboration definition URI of http://www.example.com/semanticformapp/collab, the agent JavaScript API assumes that the URI of the collaboration participant is http://www.example.com/semanticformapp/collab/participant and that its primary directory consume request URI is http://www.example.com/semanticformapp/collab/participant/dir-cr. Collaboration participants are client-side participants that retrieve configuration information for the collaboration from its participant definition 208. Such configuration information can include, for example, the text string to display in the title bar of the web browser for the web page, and the URI for the participant definition of the master semantic form. Upon registration of the primary directory consume request of the collaboration participant, the agent server 140 returns the URI of the participant definition for the master semantic form to the agent JavaScript API.

Client-Side Participant Registration

The method 600 of registering client-side participants by the agent server 140 will now be described with reference to FIGS. 1 to 9A and 9B. Client-side participants such as collaboration participants and semantic forms are generally initialized on a personal computing device and attempt to register with the agent server 140. Server-side participants are, instead, invoked by the agent server 140 as previously described.

The method 600 commences with the receipt of a participant registration request (604). When a software system component that acts as a participant is launched, it attempts to register with the agent server 140 by generating a participant registration request. For semantic forms and associated collaboration participants, the agent JavaScript API executing in the web browser generates the participant registration request. The participant registration request includes:

the user token;
the URI of the participant definition 208 corresponding to the participant requesting registration;
the URI of any consume request definitions listed in the participant definition identifying what sets of data items the participant would like to receive when the state of the consume request changes; and
optionally, a collaboration ID identifying a specific instance of the collaboration that the participant wishes to join.

The agent JavaScript API and other participants are configured with knowledge of the corresponding participant definition URI. In particular, the agent JavaScript API knows the naming pattern for the collaboration participant's participant definition URI and receives the master semantic form's participant definition URI from the collaboration participant. The consume requests provided by the participant in the participant registration request, as specified by the consume request definition URIs, should be subsets of the consume request definitions set out in the corresponding participant definition 208. While the participant definition 208 delineates what data items participants of that type are allowed to share and consume, the participants may actually be configured to share and/or consume a subset of the data items that it is permitted to share and/or consume. The collaboration ID optionally provided with the participant registration request specifies a particular collaboration that the participant is configured to be registered in.

In the case of semantic forms, the user token is passed with the browser domain cookie received from the directory server 144, and the collaboration ID is maintained and transmitted by the agent JavaScript API to the agent server 140 with each communication. A first participant registration request sent by the agent JavaScript API includes a primary directory consume request. The primary directory consume request includes a request for the list of consume requests for the participant. A second participant registration request sent by the agent JavaScript API for the same participant includes the list of consume requests received as a result of the first registration of the participant.

Upon receipt of the participant registration request, the agent server 140 determines if the request is proper (606). If the agent server 140 determines that the participant definition URI provided in the participant registration request does not correspond with a participant definition 208 in the directory 146, the agent server 140 determines that the participant registration request is improper. Further, if the agent server 140 determines that the consume request definition URIs specified in the participant registration request do not match ones in the corresponding participant definition 208, the agent server 140 determines that the participant registration request is improper. If the agent server 140 determines that the participant registration request is improper, the participant registration request is discarded, and the agent server 140 reports an error to the participant (607), after which the method 600 ends.

Upon validating the participant registration request, the agent server 140 authenticates the user (608). The agent server 140 passes the user token it receives with the participant registration request to the identity server 148. As previously noted, for participants registered by the agent JavaScript API, the browser domain cookie includes the user token. In response, the identity server 148 either confirms or rejects the authenticity of the user to the agent server 140. If the user is not authenticated by the identity server 148 at 608, the participant registration request is discarded and the method 600 ends. If, instead, the user is authenticated at 608, the agent server 140 determines if it is managing a user space for the user (612). If the agent server 140 is not yet managing a user space on behalf of the user, the agent server 140 creates a user space for the user (616).

Once the agent server 140 has a user space for the user, the agent server 140 determines if a collaboration ID was provided with the participant registration request (620). If a collaboration ID was included in the participant registration request received at 604, the agent server 140 determines if it is managing an active collaboration with that collaboration ID (624). If the agent server 140 determines that it is not actively managing a collaboration with that collaboration ID, the agent server 140 generates a participant ID for the participant and registers the participant ID, its participant definition, and the consume requests received with its participant registration request in the user space pending the creation of a collaboration with the specified collaboration ID (628), after which the method 600 of registering the participant ends. The agent server 140 generates a corresponding participant token, records its association to the participant ID and forwards it to the participant.

Figure 10:
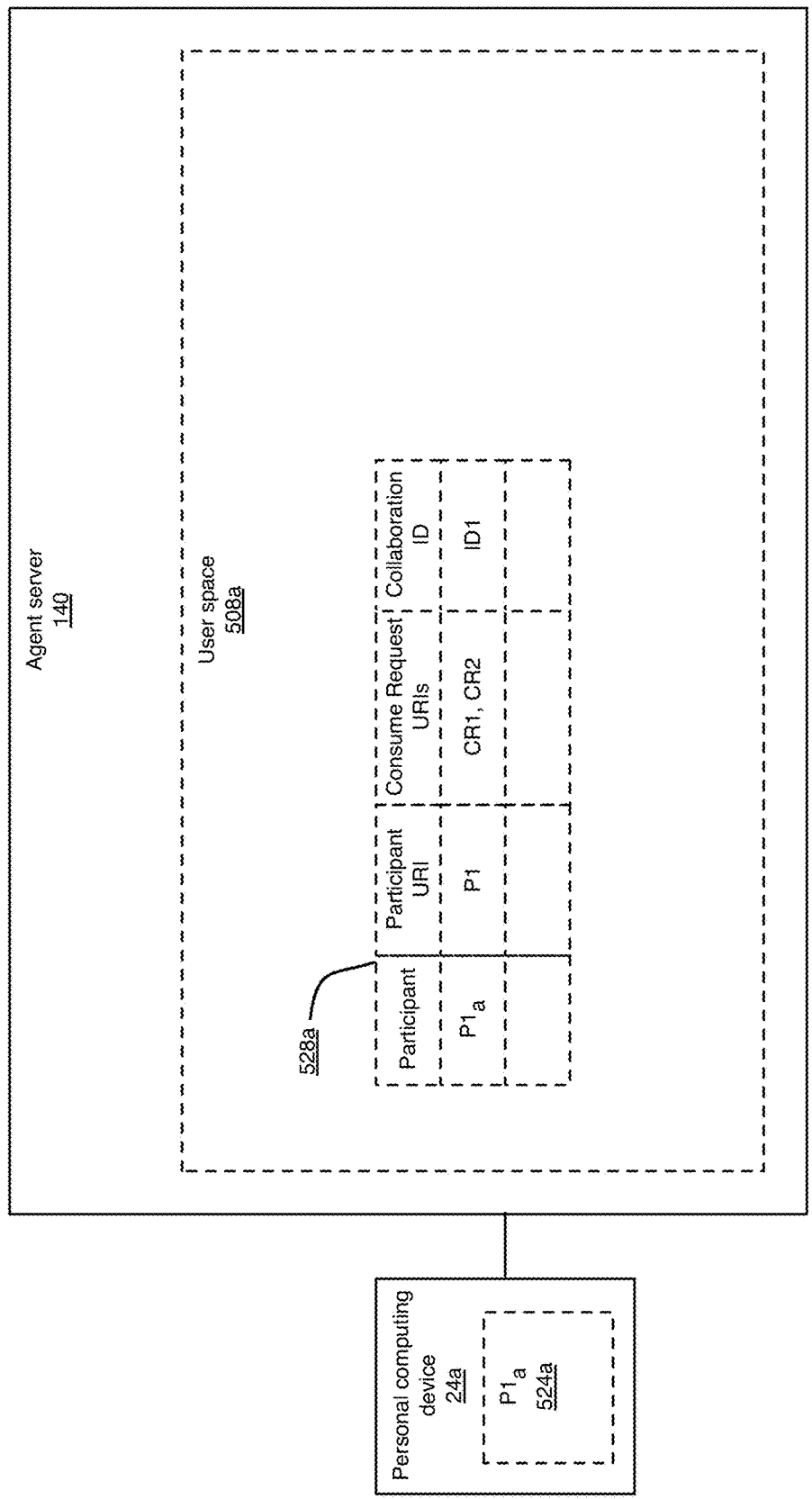
FIG. 10 shows the registration of a participant in a user space by the data-sharing server computer system of FIGS. 1 to 3 when the collaboration specified by the participant does not exist in the user space.

FIG. 10 illustrates the agent server 140 having created a user space 508$a$ for the user of the personal computing device 24$a$. A participant software system P1$_a$ 524$a$ is executing on the personal computing device 24$a$. Participant P1$_a$ 524$a$ is an instance of participant type P1. Upon receiving a participant registration request for a collaboration having a particular collaboration ID from participant P1$_a$ 524$a$ and having determined that a collaboration having the collaboration ID specified in the participant registration request does not yet exist, the agent server 140 creates a pending participant entry 528$a$ for the participant P1$_a$ 524$a$ in the user space 508$a$. The pending participant entry 528$a$ includes a participant ID for the participant, the URI of the corresponding participant definition 208, the consume request URIs it is registering, and the collaboration ID of the collaboration that it would like to join.

Returning again to FIGS. 9A and 9B, if, instead, the agent server 140 determines that it is actively managing a collaboration with the particular collaboration ID specified in the participant registration request, the agent server 140 determines if the participant can be registered in the specified collaboration (632). That is, the agent server 140 determines if (a) the participant is of a participant type permitted to be registered in the collaboration; and (b) if the participant is permitted to be registered therein, whether the specified collaboration has capacity for that particular participant type. A participant can be permitted to be registered in a collaboration if the corresponding collaboration definition (instantiated in the collaboration model) includes the URI for the participant definition 208 corresponding to the participant. As only one participant of each participant type specified by the participant definitions 208 identified in the collaboration definition 204 is permitted in a collaboration, the agent server 140 ensures that there is capacity (i.e., a vacant slot) for the participant in the collaboration. The agent server 140 makes an exception here if a participant previously registered with only a primary directory consume request (as further evidenced by the participant token provided with the participant registration request), and allows the participant to re-register with other consume requests. If the participant is not permitted to be registered in the collaboration because the collaboration does not permit that particular participant type to register, or if the specified collaboration does not have capacity for the participant (that is, if a participant of the same participant type has already been registered in the collaboration), the agent server 140 reports an error (636), after which the method 600 of registering the participant ends.

Figure 11:
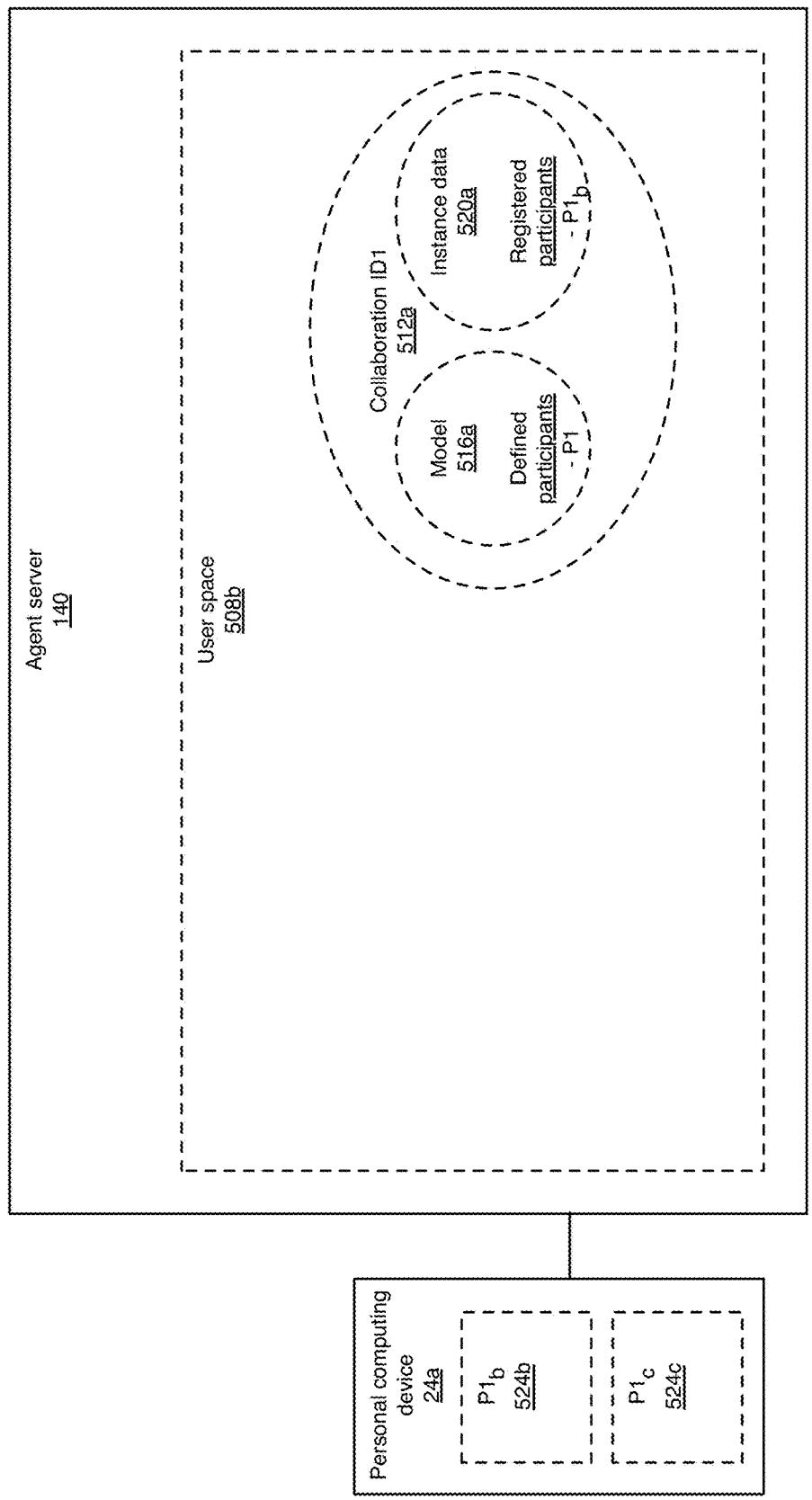
FIG. 11 shows a single collaboration managed in a user space by the data-sharing server computer system of FIGS. 1 to 3 that does not have capacity for a new participant of type P1.

FIG. 11 illustrates a circumstance where the personal computing device 24$a$ executes two separate participants P1$_b$ 524$b$ and P1$_c$ 524$c$ of the same participant type, P1. The agent server 140 is managing a user space 508$b$ for the user of the personal computing device 24$a$, and a collaboration 512$a$ within the user space 508$b$ having a collaboration ID ID1. The model 516$a$ of the collaboration 512$a$ indicates that the collaboration 512$a$ takes a participant of participant type P1. Participant P1$_b$ 524$b$ has previously been registered in the instance data 520$a$ of the collaboration 512$a$ by the agent server 140. Upon receiving a participant registration request from participant P1$_c$ 524$c$ for a collaboration having the collaboration ID ID1, the agent server 140 determines that the collaboration definition for the collaboration 512$a$ permits the participant type P1 to be registered therein, but that the participant P1$_b$ 524$b$ of the same type as participant P1$_c$ 524$c$ has already been registered in the collaboration 512$a$ that has this collaboration ID. As a result, the agent server 140 determines that the collaboration 512$a$ has no capacity available for participant P1$_c$ 524$c$ in. Accordingly, it generates and reports an error at 636.

Returning again to FIGS. 9A and 9B, if, instead, capacity is available for the participant in the specified collaboration, the agent server 140 registers the participant and its consume requests in the collaboration (640). The agent server 140 generates a unique participant ID for the participant, and registers the participant ID in the instance data of the collaboration. Further, the agent server 140 instantiates the consume request definitions from the collaboration model for the consume request definition URIs specified in the participant registration request. As the participant can be configured to register only a subset of the consume request definition URIs from the participant definition, not all of the consume request definitions from the participant definition in the collaboration model are necessarily instantiated in the collaboration instance data. The agent server 140 then generates a participant token and records the association between the participant token and the participant ID of the particular participant and the collaboration ID of the collaboration into which the participant has been registered. The agent server 140 returns the participant token to the participant for future use. The participant token can be re-provided by the participant to the agent server 140 with further communications to enable the agent server 140 to look up who the participant is and what collaboration the participant is participating in. Upon placing the participant in the collaboration, the method 600 ends.

Figure 12:
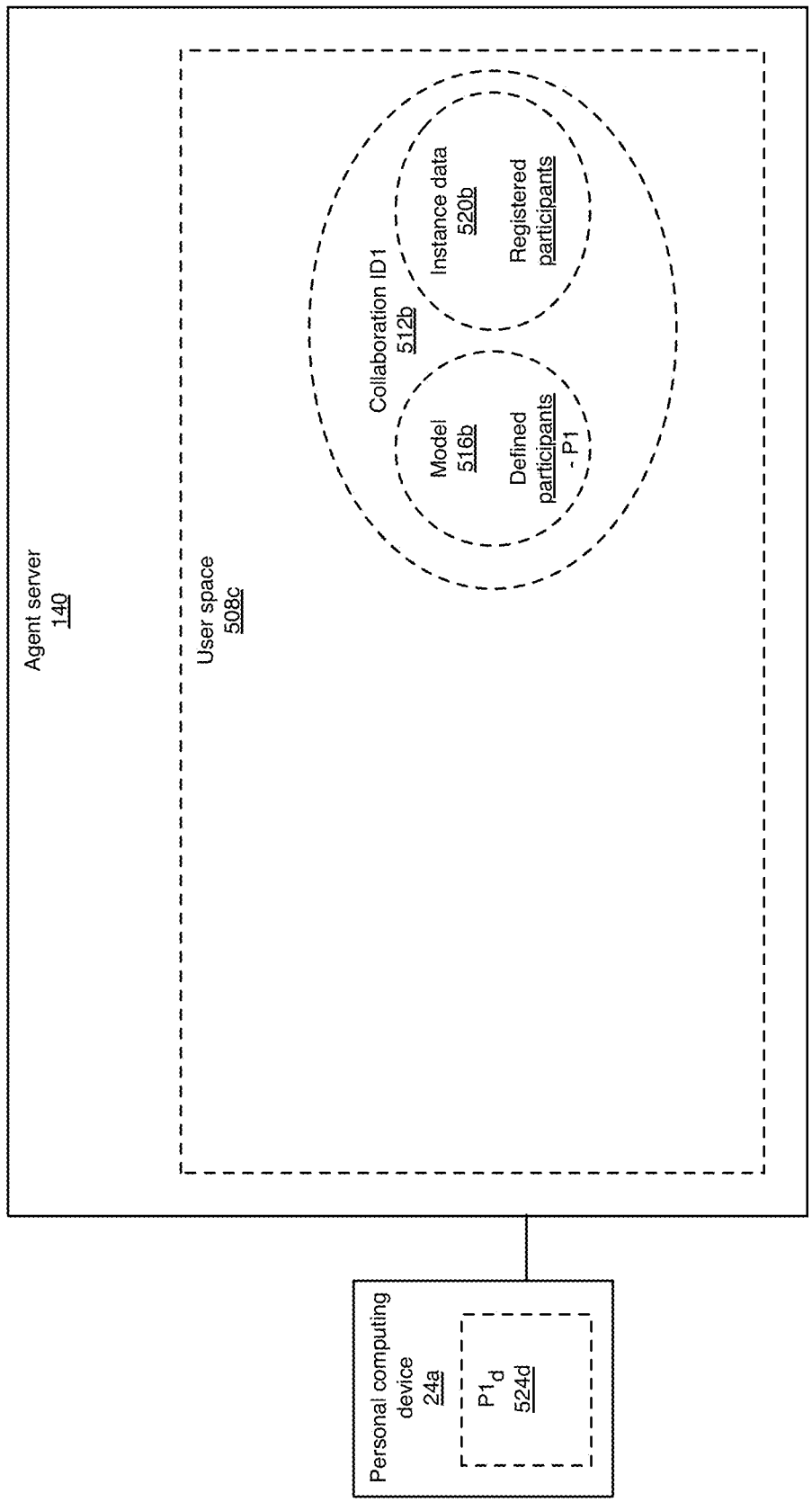
FIG. 12 shows a single collaboration managed in a user space by the data-sharing server computer system of FIGS. 1 to 3 that has capacity for a new participant of type P1.

FIG. 12 illustrates a circumstance where the personal computing device 24$a$ executes a participant P1$_d$ 524$d$. The agent server 140 is managing a collaboration 512$b$ in user space 508$c$ for the user of the personal computing device 24$a$. The model 516$b$ indicates that the collaboration 512$b$ takes a participant of participant type P1. A participant of participant type P1 is not currently registered in the collaboration 512$b$. Upon receiving a participant registration request from participant P1$_d$ 524$d$ executing on the personal computing device 24$a$ for a collaboration having the particular collaboration ID ID1, the agent server 140 determines that the collaboration definition 204 for the collaboration 512$b$ that has that collaboration ID permits the participant type P1 to register, and that a participant of the participant type P1 is not currently registered in the collaboration 512$b$. Accordingly, the participant P1$_d$ 524$d$ is eligible to be registered in the collaboration 512$b$.

Figure 13:
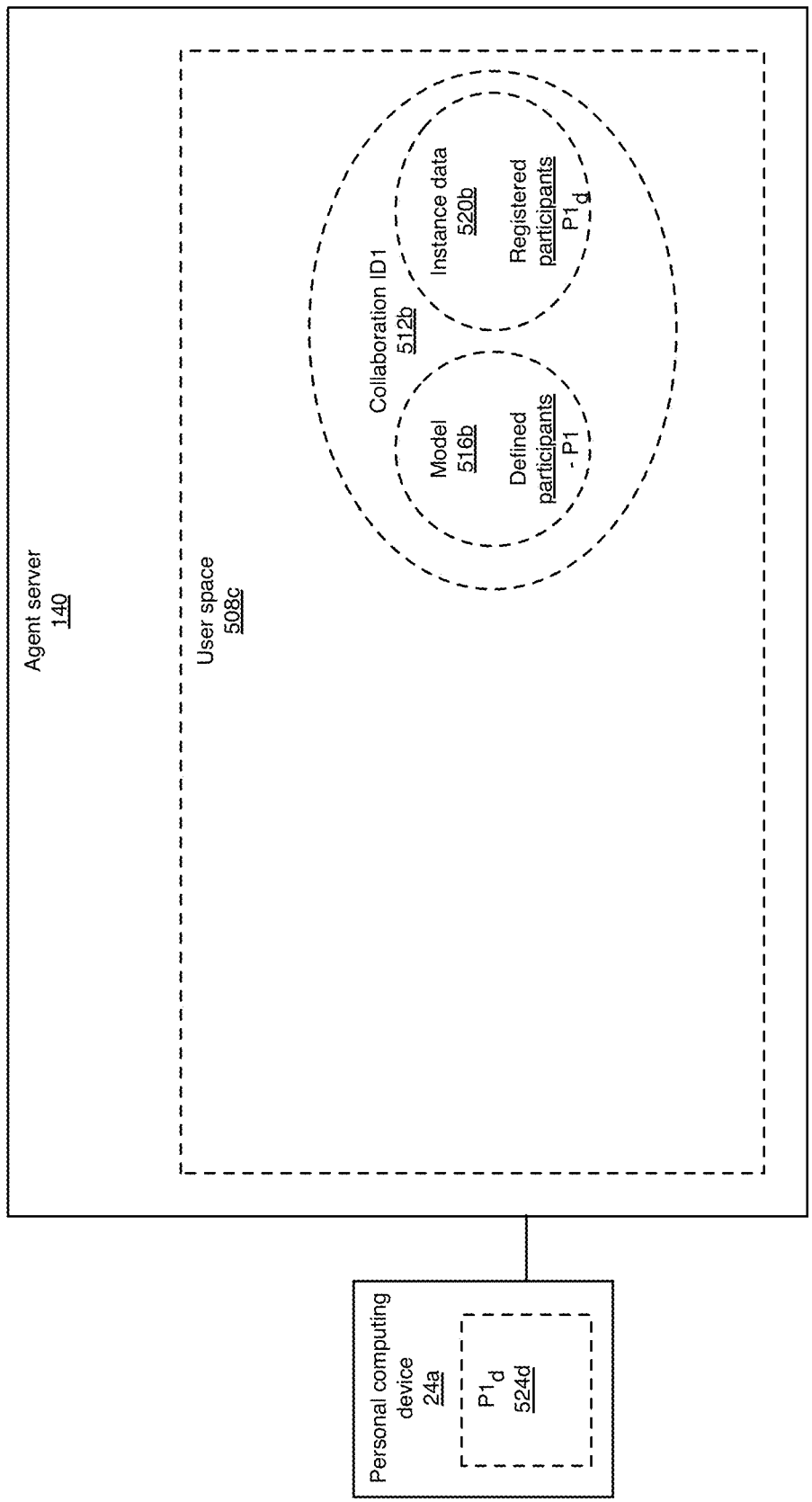
FIG. 13 shows the single collaboration of FIG. 12 after registration of a participant therein.

FIG. 13 illustrates the collaboration 512$b$ of FIG. 12 after registration of participant P1$_d$ 524$d$ in the instance data 520$b$ of the collaboration 512$b$ by the agent server 140.

Returning again to FIGS. 9A and 9B, if the agent server 140 instead determines that a collaboration ID was not included in the participant registration request received at 620, the agent server 140 determines if it is managing one or more collaborations that the participant that generated the participant registration request can be registered in and have capacity for the participant (644). As noted above, a participant can be registered in a collaboration if the corresponding collaboration definition 204 includes the URI for the participant definition 208 corresponding to the participant, and if the collaboration has capacity for that participant type. If the agent server 140 is not actively managing a collaboration that the participant is eligible to be registered in and that has capacity for the participant, the agent server 140 stores a pending participant entry in the user space pending the creation of a collaboration that the participant can be registered in (648), after which the method 600 ends. The pending participant entry includes a participant ID generated by the agent server 140 for the participant, its participant definition URI, and its consume requests, but does not include a collaboration ID as none was specified in the participant registration request.

Figure 14:
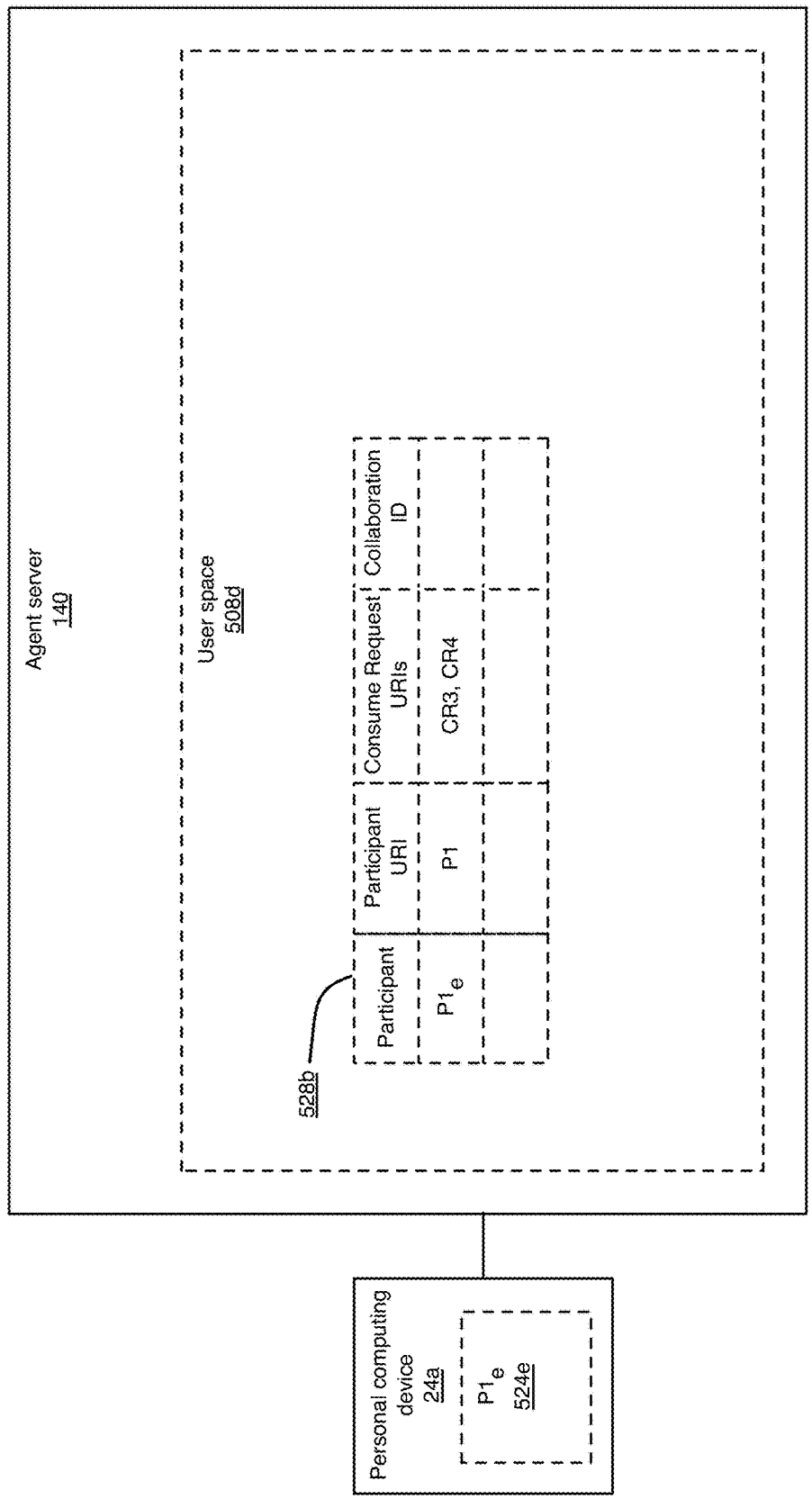
FIG. 14 shows the registration of a participant in a user space by the data-sharing server computer system of FIGS. 1 to 3 when a collaboration having capacity for the participant does not exist.

FIG. 14 illustrates a circumstance where the personal computing device 24*a* executes a participant $P1_e$ 524*e*. The agent server 140 is managing a user space 508*d* for the user of personal computing device 24*a*. Upon receiving a participant registration request from participant $P1_e$ 524*e* without specification of a collaboration ID, the agent server 140 determines that a collaboration that the participant $P1_e$ 524*e* can be registered in and that has capacity for a participant of the participant type P1 of the participant $P1_e$ 524*e* does not exist. Accordingly, the agent server 140 creates a pending participant entry 528*b* for participant $P1_e$ 524*e* in the user space 508*d*.

Returning again to FIGS. 9A and 9B, if, instead, the agent server 140 is managing at least one collaboration that the participant is eligible to be registered in and that has capacity for the participant, the agent server 140 determines if one or more than one collaboration that the participant is eligible to be registered in has capacity for the participant type of the participant (652). If there is one active collaboration that the participant is eligible to be registered in that has capacity for a participant of the participant type of the participant, the agent server 140 generates a participant ID and registers the participant ID and the participant's consume requests in that collaboration (656). In addition, the agent server 140 generates a participant token that the agent server 140 has associated with the participant ID and the collaboration ID of the collaboration into which the participant has been registered, and provides the participant token to the participant for future use. The participant token can be re-provided by the participant to the agent server 140 with further communications to enable the agent server 140 to look up the identity of the participant and the collaboration in which it is participating. Upon placing the participant in the collaboration, the method 600 ends.

Figure 15:
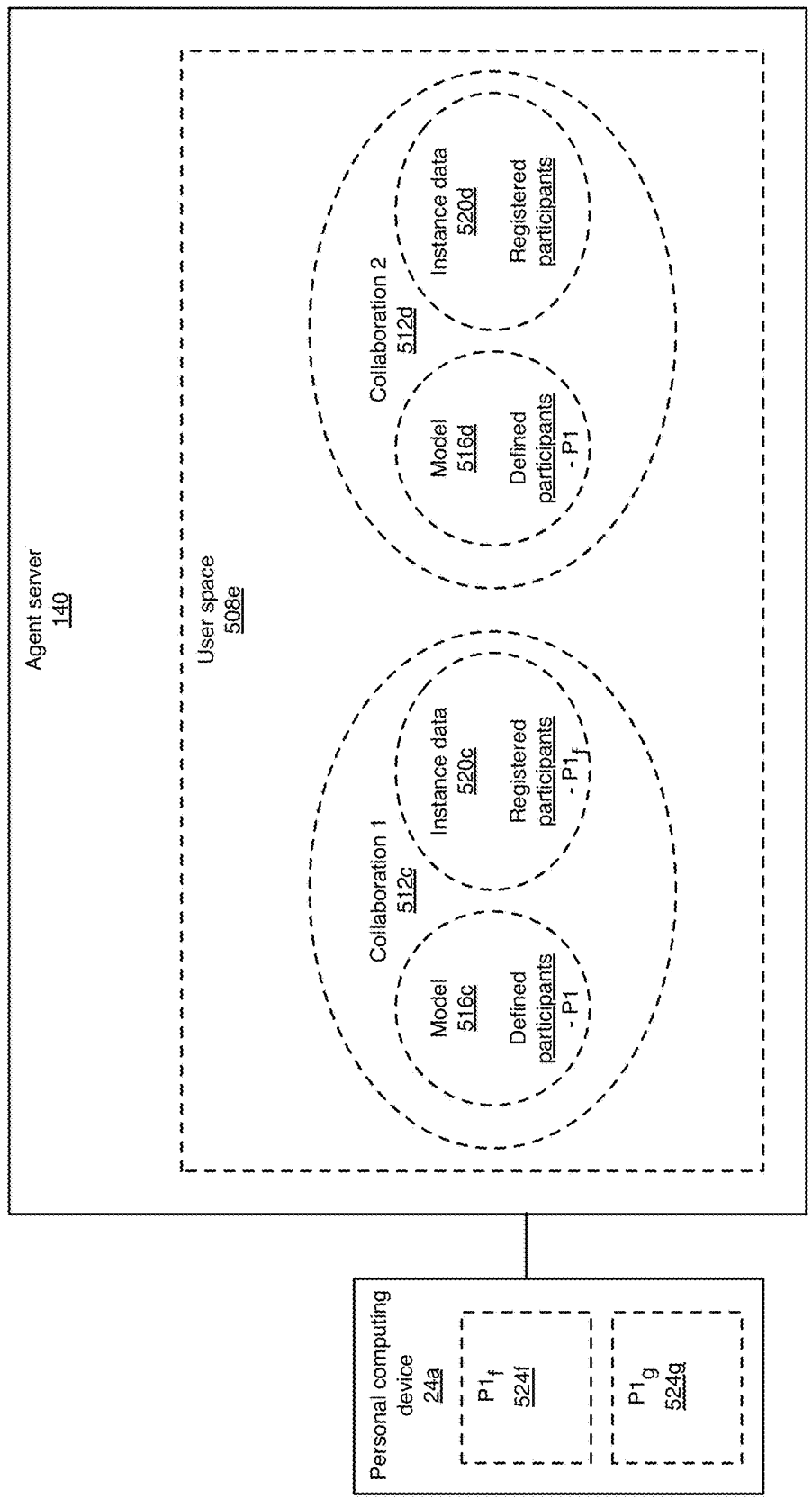
FIG. 15 shows two collaborations managed in a user space by the data-sharing server computer system of FIGS. 1 to 3, wherein one of the collaborations has capacity for a new participant of type P1.

FIG. 15 illustrates a circumstance where the personal computing device 24*a* executes two separate participants $P1_f$ 524*f* and $P1_g$ 524*g* of the same participant type P1. The agent server 140 is managing two separate collaborations 512*c* and 512*d* that take participants of participant type P1 in the user space 508*e* for the user of personal computing device 24*a*. The models 516*c*, 516*d* of collaborations 512*c*, 512*d* respectively indicate that the collaborations 512*c*, 512*d* each take a participant of participant type P1. Participant $P1_f$ 524*f* has previously been registered in the instance data 520*c* of collaboration 512*c* by the agent server 140. The instance data 520*d* for collaboration 512*d* indicates that a participant of the participant type P1 is not currently registered therein. Upon receiving the participant registration request from participant $P1_g$ 524*g*, the agent server 140 determines that there is one and only one collaboration in which the participant $P1_g$ 524*g* is permitted to be registered and has capacity. As a result, the agent server 140 generates a participant ID for the participant $P1_g$ 524*g* and registers it in the instance data 520*d* of collaboration 512*d*, together with the consume requests of the participant $P1_g$ 524*g*.

Returning again to FIGS. 9A and 9B, if, instead, the agent server 140 determines at 652 that there are two or more active collaborations in which participants of the participant type that generated the participant registration request are eligible to be registered in and have capacity therefor, the agent server 140 does not try to determine which collaboration to register the participant in and reports an error (660), after which the method 600 ends.

Figure 16:
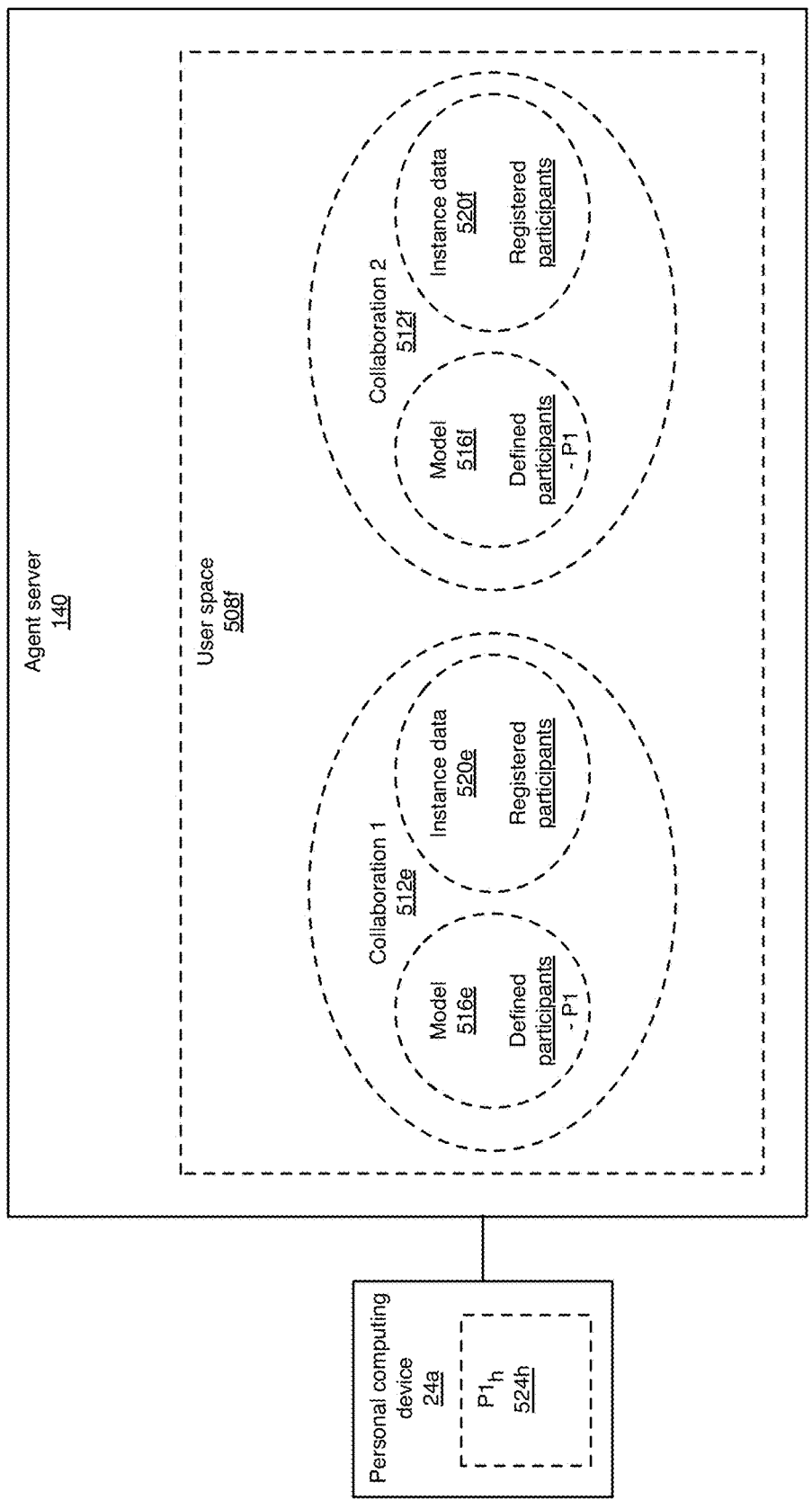
FIG. 16 shows two collaborations managed in a user space by the data-sharing server computer system of FIGS. 1 to 3, wherein both of the collaborations have capacity for a new participant of type P1.

FIG. 16 illustrates a circumstance where the personal computing device 24*a* executes a participant $P1_h$ 524*h* of the participant type P1. The agent server 140 is managing two separate collaborations 512*e* and 512*f* in which participants of the participant type P1 are permitted to be registered and that have capacity for a participant of this participant type in user space 508*f* for the user of the personal computing device 24*a*. The models 516*e*, 516*f* of collaborations 512*e*, 512*f* respectively indicate that the collaborations 512*e*, 512*f* each permit a participant of participant type P1 to be registered therein. The instance data 520*e*, 520*f* for collaborations 512*e*, 512*f* respectively indicate that a participant of the participant type P1 is not currently registered in either of these collaborations.

Upon receiving the participant registration request from participant $P1_h$ 524*h* for a collaboration of the collaboration type corresponding to the specified collaboration definition URI, the agent server 140 determines that there are at least two collaborations in which the participant $P1_h$ 524*h* can be registered. As a result, the agent server 140 does not register the participant $P1_h$ 524*h* in a collaboration and instead generates and reports an error to participant $P1_h$ 524*h*.

Upon the registration of the primary directory consume request for the collaboration participant, the agent JavaScript API directs the semantic form util module to retrieve and load various semantic form JavaScript libraries (350).

Figure 17:
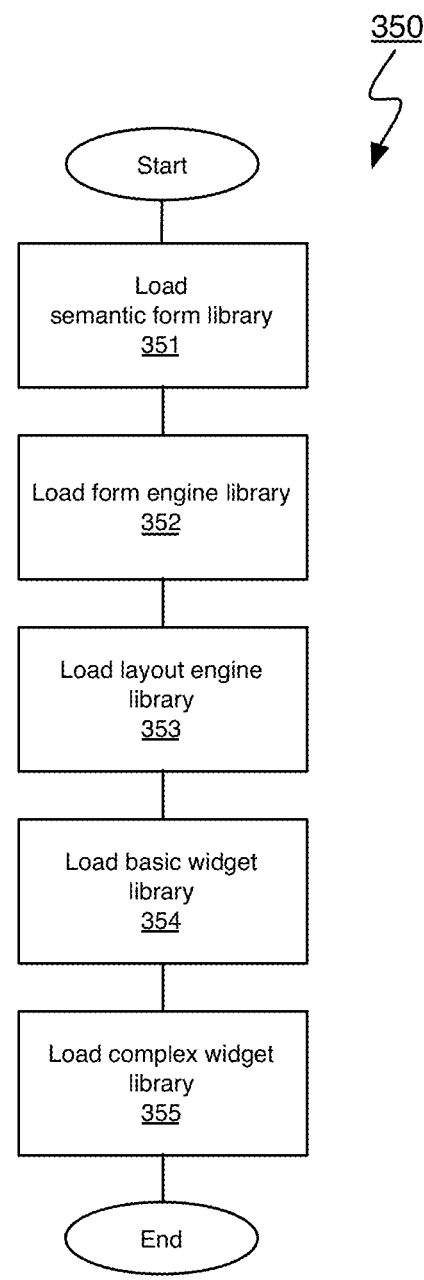
FIG. 17 is a flow chart of the process of loading JavaScript modules in the method of FIG. 6.

FIG. 17 shows the loading of the various semantic form JavaScript libraries in greater detail. The JavaScript libraries are program code that perform part of the rendering of a semantic form in a web browser. The semantic form util module retrieves all of the JavaScript libraries from the directory server 144. First, the semantic form util module retrieves the semantic form library (351). The semantic form library includes a set of methods for a semantic form participant. These methods include:

the sharing and receiving of data in a collaboration;
    the registration of consume requests;
    the de-registration of the semantic form participant;
    the destruction of the semantic form for removing the semantic form from the web page;
    the hiding and showing of the semantic form in the web page; and
    the resetting of the fields of the semantic form.

Next, the semantic form util module retrieves the form engine library (352). The form engine library includes a set of methods for receiving RDF data from the agent server 140 in JavaScript Object Notation ("JSON") format. JSON is a text-based open standard designed for human-readable data interchange. It is derived from the JavaScript scripting language for representing simple data structures and associative arrays, called objects. The JSON format is used for serializing and transmitting structured data between the agent server 140 and a semantic form. The form engine parses semantic form data and calls the appropriate other modules/objects to help generate the view.

The semantic form util module then retrieves the layout engine library (353). The layout engine library includes a set of methods for determining the location of graphical objects in a semantic form. Graphical objects are items that can be manipulated as a single unit, such as a text field, a dropdown list, a button, etc.

Then, the basic widget library is retrieved (354). This library includes a set of methods for generating simple graphical objects, such as text fields, dropdown lists, buttons, etc. using input provided as parameters. The basic widget library also includes various JavaScript snippets for rendering these controls.

Finally, the semantic form util module retrieves the complex widget library (355). The complex widget library includes a set of methods for generating more complex graphical objects, such as charts, templates for advanced data layout formats, subforms, using input provided as parameters. Subforms are semantic forms that are embedded in other semantic forms. The complex widget library also includes scripts for rendering the various controls.

Returning again to FIG. 6, once the semantic form JavaScript libraries are retrieved, the semantic form object, the form engine object and the layout engine object are then instantiated (360). The semantic form object is instantiated by the semantic form util module from the semantic form library loaded at 351. The semantic form object then instantiates the form engine object from the form engine library loaded at 352. The form engine object then instantiates the layout engine object from the layout engine library loaded at 353.

Upon instantiation of the various JavaScript objects, the semantic form object registers the master semantic form participant using the participant definition URI for the master semantic form received by the agent JavaScript API at 340 and its consume requests (370).

Figure 18:
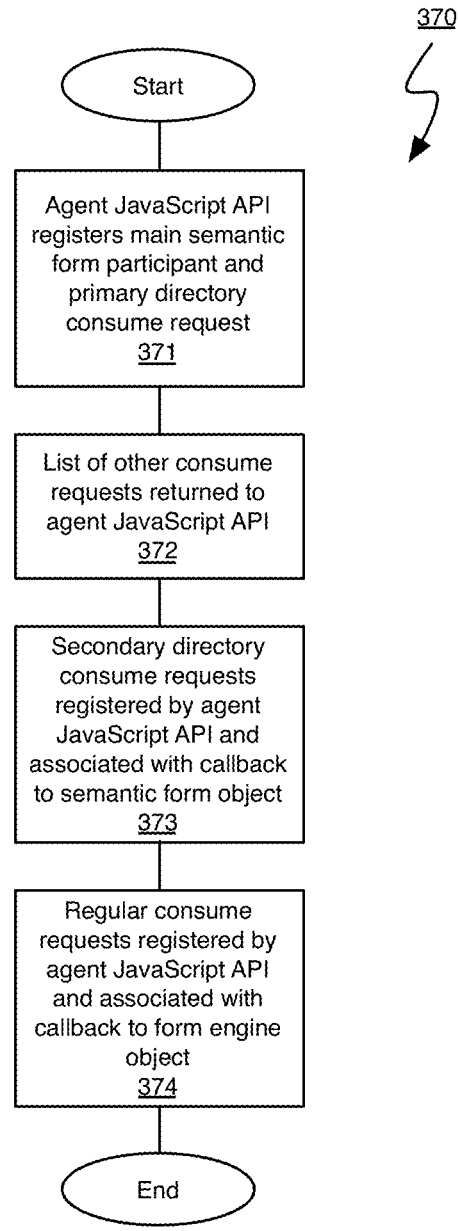
FIG. 18 is a flow chart of the process of registering the master semantic form and its consume requests in the method of FIG. 6.

FIG. 18 illustrates the registration of the master semantic form participant and its consume requests in more detail. The agent JavaScript API first registers the master semantic form participant with the primary directory consume request (371). It uses its prior knowledge of the form of the URI of the primary directory consume request given the URI of the participant definition for the master semantic form. That is, given the participant definition URI for the master semantic form of http://www.example.com/semanticformapp/mainsemanticform, the agent JavaScript API assumes that the primary consume request definition URI of the primary directory consume request for the master semantic form is http://www.example.com/semanticformapp/mainsemanticform/dir-cr. The primary directory consume request returns a list of URIs for the other consume requests definitions defined for the master semantic form participant (372). This list includes URIs for any secondary directory consume requests and regular consume requests. The agent JavaScript API then re-registers the semantic form participant with the secondary directory consume requests (373). In doing so, the agent JavaScript API records an association between the data keys in the secondary directory consume requests with a callback to the semantic form object. Next, the agent JavaScript API re-registers the semantic form participant with the regular consume requests (374). In doing so, the agent JavaScript API records an association between the data keys in the regular consume requests with a callback to the semantic form object. Upon registering the regular consume requests, the agent JavaScript API's task of registering the consume requests is complete.

Returning again to FIG. 6, the view configuration data is received from the agent server 140 (378). Upon receiving the view configuration data, the agent JavaScript API passes it to the semantic form object.

The semantic form is then generated and rendered (380).

Figure 19:
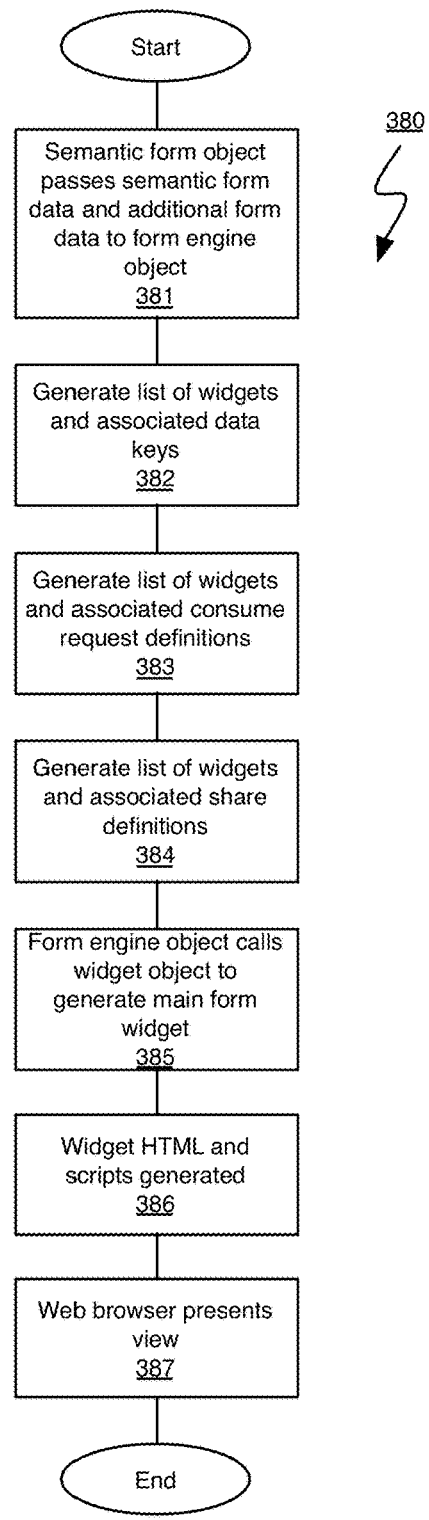
FIG. 19 is a flow chart of the process of rendering a semantic form in the method of FIG. 6.

FIG. 19 shows the process of generating and rendering the semantic form in greater detail. First, the semantic form object passes the view configuration data including data keys for generating widgets, as well as URIs for consume request definitions (apart from directory consume request definitions) and share definitions associated with the widgets, to the form engine object (381). The form engine object parses the data received to identify the data keys, the widgets, and the associated consume request definitions and share definitions. The list of widgets and associated data keys is generated by the form engine object (382). Next, the list of widgets and associated consume request definitions is generated by the form engine object (383). The form engine object then generates a list of widgets and associated share definitions (384). Upon generating the lists of widgets and associated data keys, consume request definitions, and share definitions, the form engine object calls the appropriate widgets object to generate the HTML code and any associated script(s) for the main form widget (385). Each semantic form includes a main form widget. The code for the widget is then generated (386).

Figure 20:
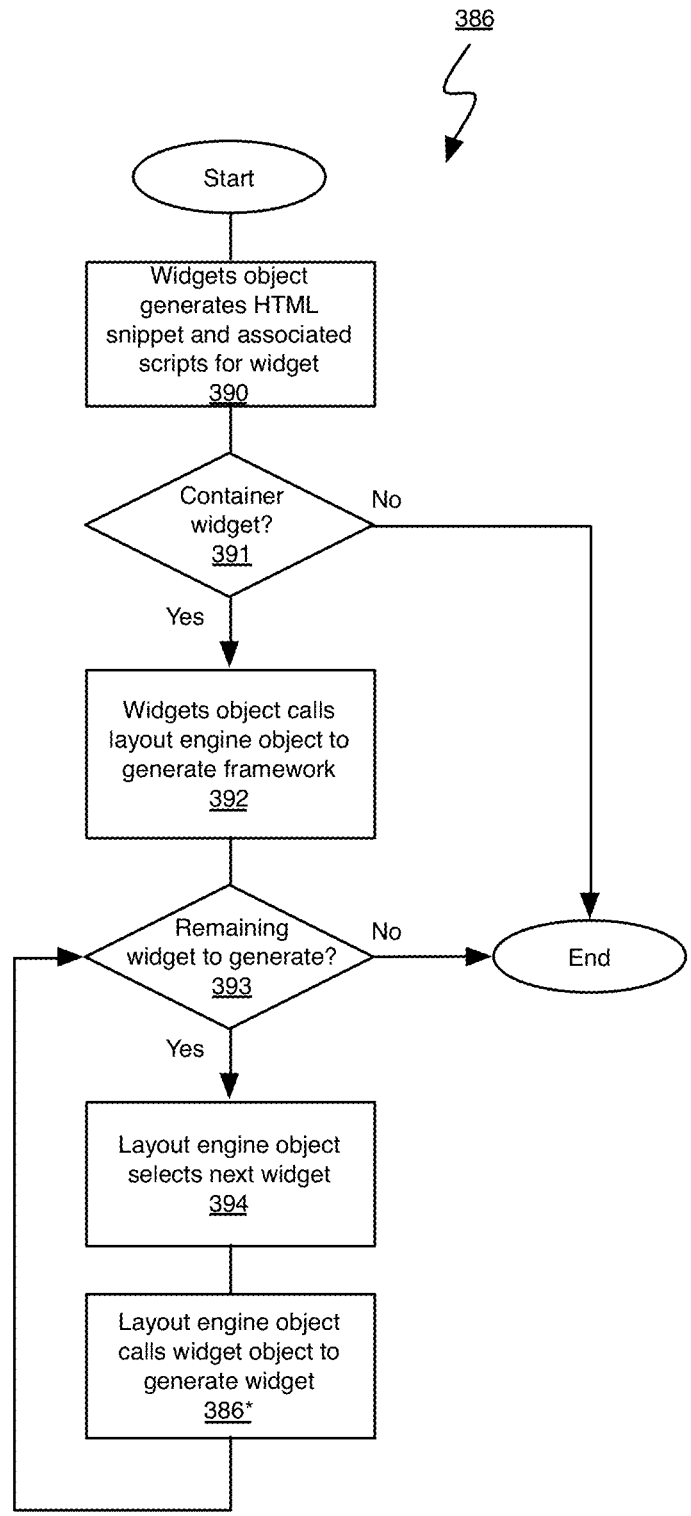
FIG. 20 is a flow chart of the process of generating the HTML code and associated scripts for a widget in the method of FIG. 19.

FIG. 20 shows the method of generating the HTML code and associated scripts for a widget generally at 386. Widgets can range in complexity from simple text fields and controls to large elements with widgets nested therein. Widgets can be broadly classified as either a container widget or a terminal widget. A container widget can contain other widgets (terminal or container). The framework of the body of a container widget that specifies the layout of the other widgets contained therein is specified in a layout specification JSON string. In contrast, a terminal widget does not contain other widgets and thus does not have a layout specification JSON string tied to its definition. The main form widget included in each semantic form is a container widget that acts as a container for all of the widgets defined in the semantic form. When the HTML code and associated scripts are generated for container widgets, the form engine object generates the framework for the widget and then proceeds to generate and insert the HTML code and associated scripts for each container widget in the appropriate location. Contained widgets can themselves be container widgets and contain one or more other widgets. Thus, the process of generating the HTML code and associated scripts for these container widgets is self-referring. The form engine object populates the document object model ("DOM") that the Web browser uses to present the view.

The method 386 begins with the generation of the HTML code and any associated scripts for the widget (390). Where the widget provides access to data in the collaboration or uses such data in its generation, the HTML snippet and the associated scripts will contain reference(s) to the data key(s) associated with that data. The scripts provide the functionality of the particular widget type and may include callbacks to the widget object to refer to script libraries. For example, where the widget includes an animated control such as a drop down list, JavaScript is used to render this functionality within a browser. The particular JavaScript is stored by the widget objects and may in some cases then inserted into the HTML in the appropriate locations, such as between <script> and </script> tags. In other cases, the JavaScript may include one or more callbacks to a method of the widget object that contains the required JavaScript to provide the functionality. The data keys are used to identify where the values from the collaboration are to be used in the semantic form, and are used to identify where values from the semantic form are to be shared within the collaboration. The widget object places the generated HTML code and associated scripts in the DOM.

Upon generating the HTML code and associated scripts for the widget, the form engine object then determines whether the widget is a container widget (391). If the widget is determined to not be a container widget at 391, the method 386 of generating the code for the widget is complete. If, instead, the widget is determined to be a container widget at 391, the basic or complex widgets object, as appropriate, calls the layout engine object to generate the HTML code and any associated script(s) for the body of the widget (392). As the widget contains other widgets, the framework surrounding these other widgets is generated by the layout engine object. The widgets object for the container widget, in fact, notifies the form engine object that the HTML code for the framework of the widget in which other widgets are to be placed needs to be generated. In turn, the form engine object calls the layout engine object to generate the HTML code for the body of the widget. After generating this framework, the layout engine object proceeds to have the HTML code and associated scripts for the contained widgets generated one by one. Thus, the layout engine object determines if there are any contained widgets for which the code is to be generated (393). If it is determined that the code for all of the contained widgets has already been generated, the method 386 of generating the code for the widget is complete. If, instead, there remain contained widgets for which the code has not yet been generated, the layout engine object selects a next widget to generate the HTML code and any associated script(s) for (394). The layout engine object then calls the appropriate widget object to generate the HTML code and any associated script(s) for the widget at 386. That is, the method 386 invokes itself in a nested manner in order to generate the HTML code and associated scripts for the nested widgets. In particular, the layout engine object notifies the form engine object that the HTML code and associated scripts are to be generated for a particular widget. In turn, the form engine object calls the appropriate widgets object to generate the HTML code and associated scripts for the widget. Upon generating the HTML code for the widget, the method 386 returns to 393, where it is determined whether there remain any contained widgets for which the code needs to be generated. If there are not any remaining widgets for which the code needs to be generated, the method 386 ends.

The resulting HTML code and associated scripts for the semantic form are stitched together from the generated HTML code and associated scripts for the widgets, but is, at this point, missing the values that are used to populate the fields, generate charts that are inserted into widgets, etc.

Once the HTML code and associated scripts have been generated for the semantic form, the web browser presents the view (387). The web browser renders the information placed into the DOM by the widget objects and the layout engine object, including the HTML and associated scripts.

Returning again to FIG. 6, once the semantic form is rendered, data is received from the collaboration and used to control and/or augment the semantic form (395). The data received may be used to augment and/or modify the presentation and behavior of the semantic form, and populate fields of the semantic form.

Figure 21:
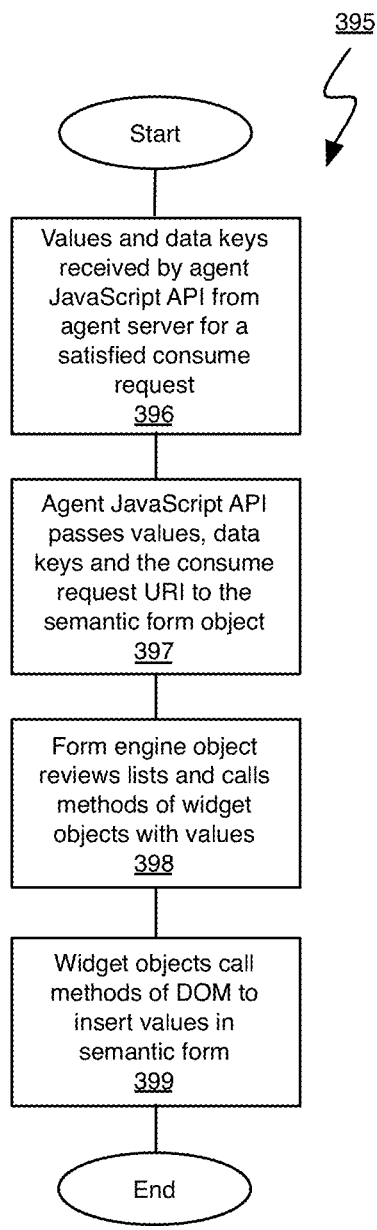
FIG. 21 is a flow chart of the process of revising the rendered semantic form with data from a collaboration in the method of FIG. 6.

FIG. 21 shows the process 395 of receiving and deploying data received from the agent server 140 in greater detail. First, values and data keys are received by the agent JavaScript API from the agent server 140 for a satisfied consume request (396). Upon satisfaction of a consume request, the agent server 140 flags the consume request as newly-satisfied. When the agent JavaScript API polls the agent server 140 to determine if the state of any consume requests have changed, the agent server 140 notifies the agent JavaScript API of the newly-satisfied consume request. The agent JavaScript API then retrieves the values and data keys from the agent server 140. The agent server 140 is aware of the data keys as they are coded into the consume request definitions and provides them with the values. The values and data keys are transmitted in JSON format. The agent JavaScript API then passes the consume request URI, the values that satisfied it and the associated data keys to the semantic form object via the second callback (397). The semantic form object passes these values to the form engine object which, in turn, reviews the lists of widgets and associated data keys and consume requests and, for each value or set of values, calls a method of the associated widget object to pass on the value(s) (398). In particular, the form engine object calls a "setvalue" method of the appropriate widget object. The widget object has knowledge of where in the DOM the data keys are located. In order to inject the value(s) received from the collaboration into the semantic form, the widget object calls a method of the DOM (399). Upon receiving the value(s) from the widget object, the web browser revises the view for the new values.

Returning again to FIG. 6, as further consume requests are satisfied, the revising of the semantic form for the new values is repeated at 395.

Figure 22:
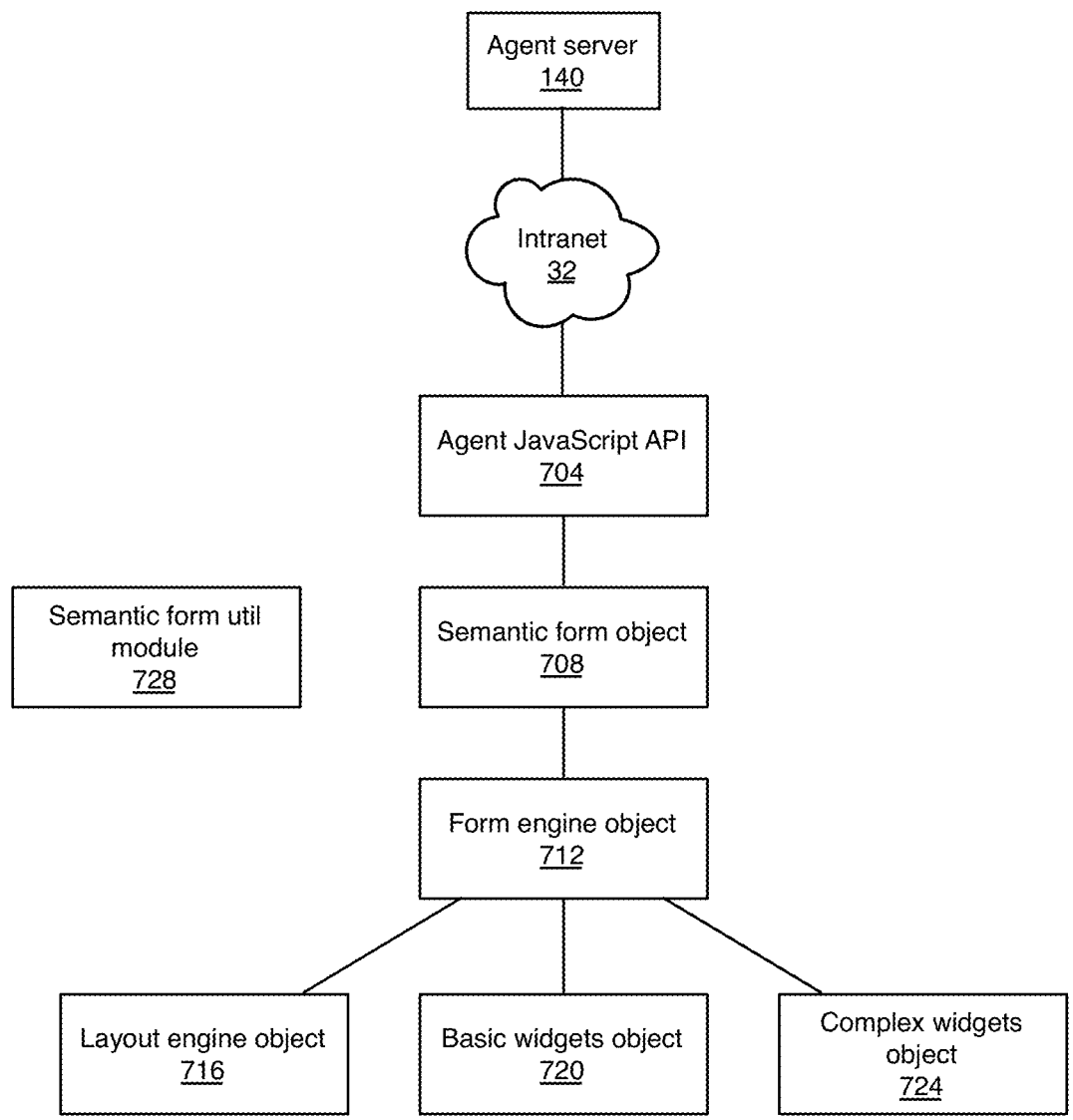
FIG. 22 illustrates the communication between various JavaScript modules and objects for implementing semantic forms in the system of FIG. 1.

FIG. 22 illustrates communication between the core JavaScript modules and the various instantiated JavaScript objects for participating in a collaboration, and generating and rendering a semantic form. The agent JavaScript API 704 is shown in communication with the agent server 140 over the communications network 32, exposing the various methods available via the agent server 140 locally. The semantic form object 708 includes a set of methods for participating in the collaboration, assembling data received from the collaboration for generating and rendering the semantic form, and for delegating the generating and rendering of the semantic form. The form engine object 712 is provided the JSON data received from the collaboration for the semantic form and assembled together by the semantic form object, and manages its generation and rendering. The form engine object 712 delegates the determination of the placement of graphical objects in a view to the layout engine object 716. Where a basic or complex widget is specified, the form engine object instantiates the basic widget object 720 or the complex widget object 724 for each occurrence to generate these components of the view. Using the locations provided by the layout engine object 716, the basic widget objects 720 and the complex widget objects 724, together with style information for the semantic form, the form engine object 712 generates the HTML code and associated scripts for the view of the semantic form.

Semantic form definitions can specify other semantic forms to be presented as subforms in the semantic form using the complex widgets object 724. These semantic forms are registered in the collaboration, and generated and rendered as graphical objects within a semantic form much in the same way that the master semantic form is. In such cases, the participant definition URI for a semantic form to be generated and rendered as a subform of the master semantic form is included in the view configuration data for the master semantic form, along with any parameters it requires.

A participant will not receive any consume request notifications regarding updated data item values in the collaboration from the agent server 140 until it sends an enable notifications request to the agent server 140. This gives the participant time to finish its initialization before it starts receiving notifications from the agent server 140. Upon receiving an enable notifications request from a participant, the agent server 140 determines which, if any, of the participant's consume requests have undergone state changes and continually does so upon receipt of updates to data item values. Further, the participant regularly polls the agent server 140 to determine if the agent server 140 has flagged any consume requests as having undergone a state change. Continued receipt of these polls indicates to the agent server 140 that the particular participant is active. Conversely, cessation of receipt of these polls from a participant causes the agent server 140 to conclude that the particular participant has become inactive.

A participant may transmit a de-registration message to the agent server 140 to indicate that it no longer wants to participate in a collaboration. Alternatively, a participant can transmit a suspension request to indicate that it wants to temporarily suspend participation in the collaboration. Receipt of a de-registration request causes the agent server 140 to remove the participant and its consume requests from the instance data so that another participant of the same type can register in the collaboration, whereas receipt of a suspension request maintains the participant's spot in the collaboration. Thereafter, the suspended participant may re-register in the same collaboration to recommence participating in the collaboration.

The method by which a participant stops participating in a collaboration is relevant to the enable notifications request as it affects the consume requests that a participant receives when it enables notifications again. When a participant de-registers and then registers again, its consume requests are evaluated exactly the same as though the participant was joining for the first time. Any satisfied consume requests at the time the enable notifications request is made generate a consume request notification, even if the participant had already received a notification for the same values satisfying the consume request before de-registration. Instead, when a participant sends a suspension request, the behavior is slightly different. The participant will only be notified if there are newly-updated data item values for which the participant has not already received a consume request notification.

When a participant wishes to share data, it generates a data share message with the data item values and transmits it to the agent server 140. The data share message includes the URI of the share definition in the participant definition 208 corresponding to the values being shared. Upon receiving the data share message, the agent server 140 determines if the participant is permitted to share the specified data item values using the participant definition 208 stored in the collaboration model. If the agent server 140 determines that the participant is permitted to share the particular data item values with the collaboration, the agent server 140 then processes the shared values to update the data item values in the collaboration and determine if any registered consume requests undergo a state change as a result.

Sharing Data

The method of receiving and providing shared data item values by the stateful data-sharing service will now be described with reference to FIGS. 1 to 5, and 23 to 25.

When a user interacts with a semantic form, such as by entering in text into a text input field, or by selecting a different item from a drop down list, the DOM is notified of the most current value of that field. In one scenario, a control within the semantic form, such as a button, is associated with a callback to a method of the form engine object, notifying the form engine object that a share action has been initiated by the user. In turn, the form engine object notifies each of the widget objects to retrieve their most recent values from the DOM. The widget objects then return these values to the form engine object. The form engine object passes all of these values (forming part of a single share) to the semantic form object for relaying to the agent server 140 via the agent JavaScript API.

The agent server 140 uses the concept of transactions in processing data item value updates to properly isolate changes across participants so that the data item values passed on to participants upon a change of state of consume requests are consistent and current. For example, if a collaboration contains address information and a person, then transactions help to ensure that only address information related to the person currently active in the collaboration instance data is currently active, thus maintaining consistency in the information for the context of the user. Having several addresses for different people all active in the collaboration instance data at the same time could result in inconsistent information being delivered to participants that need relevant addresses. By grouping data item values according to transactions, consistency of data in a collaboration that is provided to participants can be ensured.

Transactions are sets of one or more logically-related operations performed on data item values. One or more participants can cooperatively perform the operations without knowledge of each other's existence or functions. When a set of data item values that was generated independent of any values received from the collaboration is shared via the agent server 140, it is referred to as the root of a transaction and is assigned a new transaction ID. As any of the root set of data item values is used by other participants to generate values for additional data items, those data item values form part of the same transaction and are assigned the same transaction ID. Participants receive the current transaction ID when they are notified with values matching their consume requests, and communicate this transaction ID when sharing data item values derived from the received values to enable the agent server 140 to identify which transaction the shared data item values relate to. In this manner, the agent server 140 tracks and segregates data item values for separate transactions, ensuring that the data item values that it receives form part of the current transaction and not part of a prior transaction.

The agent server 140 coordinates the transactions by simply receiving consume requests for data, and registering when the state of these consume requests change. The state of a consume request includes whether or not the consume request is satisfied by the data item values in the collaboration instance data and, if satisfied, the data item values that satisfied it. The share definitions and consume requests defined for the participants enable such transactions to be data-driven.

Figure 23:
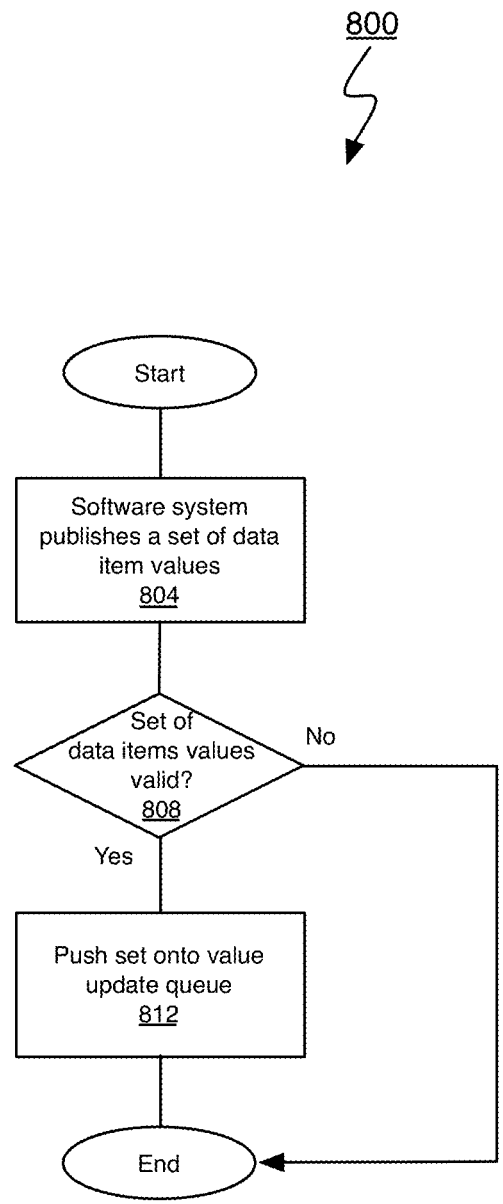
FIG. 23 is a flow chart of the general method of pre-processing sets of data item values shared by a participant used by the data-sharing server computer system of FIGS. 1 to 3.

FIG. 23 shows the method of pre-processing data item values shared by a participant (i.e., software system) generally at 800. The method 800 commences with a participant sharing a value of one or more data items (804). The participant provides the following as parameters of an HTTP request to the agent server 140:

the user token;
the participant token provided by the agent server 140 that the agent server 140 uses to look up the participant ID for the participant, and the collaboration ID of the collaboration in which the participant is participating;
a share definition URI identifying what is being shared;
value(s) for the shared data items; and
a transaction ID for the set of data item value(s), if any, used to generate the data item value being published.

The agent server 140, upon receipt of the set of shared data item values, determines if the set of shared data item values is valid and should therefore be used to update the instance data in the collaboration (808). In particular, the agent server 140 determines if the share definition URI provided with the shared values is present in the corresponding participant definition stored in the collaboration model, and that the values being shared match the criteria for the data items in the share definition. If the agent server 140 determines that the share definition URI is not in the corresponding participant definition in the collaboration model or if it determines that the values being shared do not match the criteria for the data items in the share definition, the agent server 140 discards the shared set of data item values and the method 800 ends.

If, instead, the agent server 140 determines that the share definition URI is in the corresponding participant definition in the collaboration model and if it determines that the values being shared match the criteria for the data items in the share definition, the agent server 140 pushes the shared set of data item values onto a value update queue that it maintains (812). The agent server 140 also includes any transaction IDs received with the data item values. After placement of the set of data item values in the value update queue, the method 800 ends.

Updating Data in the Collaboration

The agent server 140 processes the sets of data item values in the value update queue and updates the instance data in the collaboration accordingly. In some cases, a software system may generate and share a set of data item values in response to receiving a set of data item values from the agent server 140 corresponding to one of its consume requests. The agent server 140, however, may know that the values used by the software system are obsolete due to a new transaction having been started. In this case, the agent server 140 discards the set of data item values received from the software system as it knows they relate to an old transaction. The agent server 140 assigns a unique transaction ID to each set of data item values that form part of a transaction.

Figure 24:
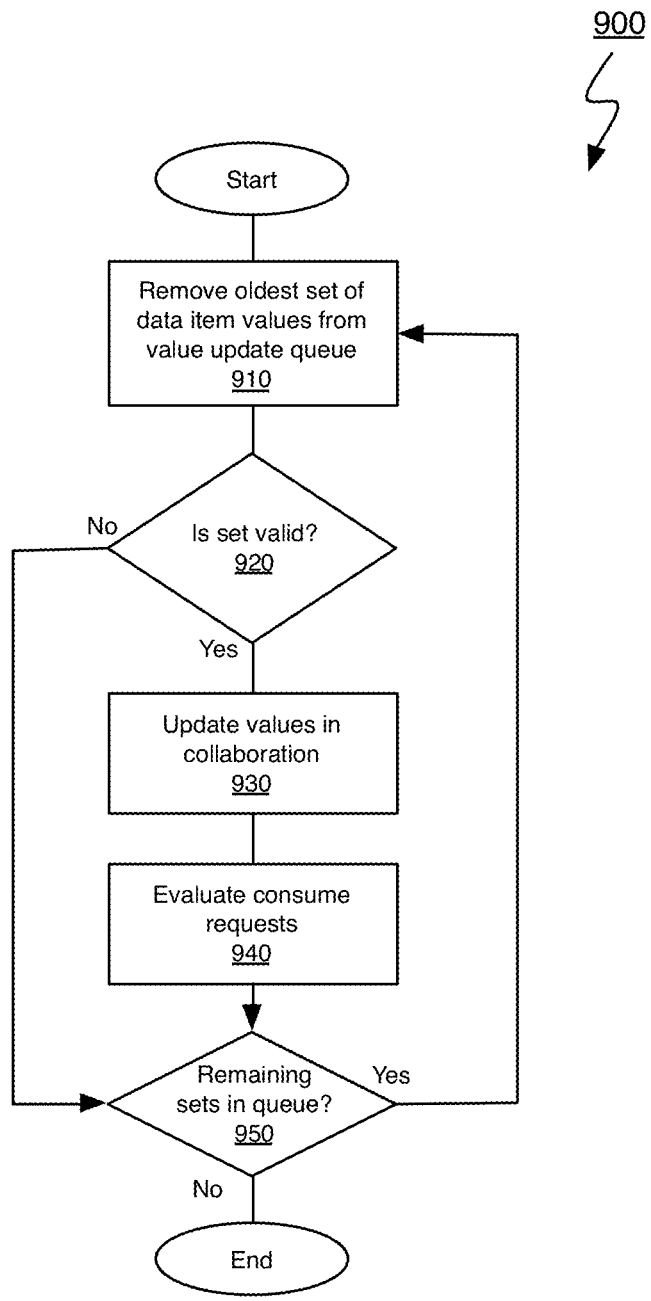
FIG. 24 is a flow chart of the general method of processing sets of data item values shared by a participant used by the data-sharing server computer system of FIGS. 1 to 3.

FIG. 24 shows the method of processing sets of data item values in the value update queue generally at 900. This method 900 is executed whenever the value update queue has at least one set of data item values for updating in it. The method 900 begins with the removal of the oldest set of data item values from the value update queue (910). The agent server 140 generally processes sets of data item values in the order that they are received. The set of data item values is accompanied by the URI of the share definition for the set of shared values and the transaction ID, if any, identifying the transaction to which the data item values belong. The agent server 140 then determines if the data item values in the set removed from the value update queue are valid (920). In particular, the agent server 140 determines if the data item values are part of a current or outdated transaction. If the set of data item values removed from the value update queue was not accompanied by a transaction ID, the set of data item values are taken to begin a new transaction. If the set of data item values removed from the value update queue were accompanied by a transaction ID, the agent server 140 examines the transaction ID to determine if it is still current. That is, the agent server 140 determines if the set of data item values put into the value update queue correspond to an outdated or current transaction. If the data item values are part of a prior transaction, the data item values are deemed to be invalid.

If the set of data item values removed from the value update queue are determined to be valid by the agent server 140 at 920, the agent server 140 updates the set of data item values in the instance data of the collaboration (930). If the set of data item values does not have a transaction ID, then the agent server 140 also generates a new unique transaction ID for the set of data item values placed in the instance data of the collaboration.

Once the agent server 140 has updated the instance data in the collaboration for the new data item values, the agent server 140 evaluates the registered consume requests (940) for all participants. If a consume request has undergone a state change, the agent server 140 flags the consume request as having undergone a state change so that the participant will be notified upon receiving the next poll. For connector participants, the agent server 140 provides the data item values to the corresponding proxy connector participant. Upon evaluating all of the registered consume requests for the data item values updated, the updating of the set of data item values is complete and the agent server 140 determines if there are remaining sets of data item values in the value update queue (950). Additionally, if the set of data item values are deemed invalid at 920, the agent server 140 then determines if there are remaining sets of data item values left in the value update queue at 950. If the agent server 140 determines there are remaining sets of data item values to be updated in the value update queue at 950, the method 900 returns to 910, wherein the agent server 140 removes the oldest remaining set of data item values from the value update queue. If, instead, the agent server 140 determines that there are no remaining sets of data item values in the value update queue, the method 900 ends.

Evaluating Consume Requests

Figure 25:
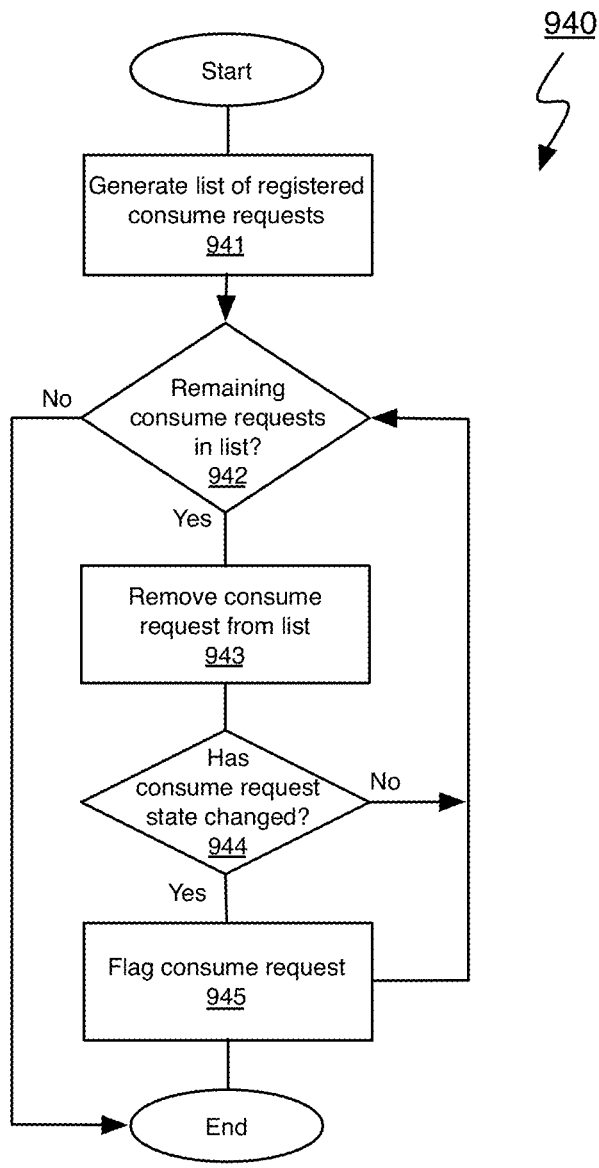
FIG. 25 is a flow chart of the general method of evaluating consume requests used by the data-sharing server computer system of FIGS. 1 to 3.

FIG. 25 shows the process of evaluating the consume requests at 940 in the method 900 in greater detail. First, the agent server 140 generates a list of all registered consume requests (941). The agent server 140 only reviews consume requests registered in the instance data in the collaboration; that is, registered consume requests for software systems that are believed to be active. The list of consume requests generated at 941 may be empty or may include one or more consume requests. The agent server 140 then determines if there are any remaining consume requests in the list (942).

If there are remaining consume requests in the list, then the agent server 140 removes a consume request from the list (943). The agent server 140 determines if the consume request removed from the list has undergone a state change (944). As previously noted, consume requests have undergone a state change if the consume request becomes satisfied or becomes unsatisfied, or, if satisfied, if the data item values that satisfied it have changed.

The consume request is satisfied if the query evaluator can semantically resolve the data requested in the included standing query to valid data item values in the instance data in the collaboration using the semantic descriptors for those data items; that is, if the standing query returns results.

As previously noted, consume requests can be defined to query the data only in the collaboration model (directory consume requests), in the instance data (consume requests), or can query the data in both the collaboration model and the instance data (multi-graph consume requests).

Multi-graph consume request definitions can be defined for information from both the participant definition and other data in the collaboration. Multi-graph consume requests can specify a preference for requested data from the collaboration model or the instance data. That is, a multi-graph consume request can specify a query for data in the collaboration model and the instance data, but that data in the instance data overrides the data in the collaboration model. Alternatively, a multi-graph consume request can specify that the data in the collaboration model overrides the data in the instance data. This capability allows the static participant definition to provide defaults that can be easily overriden or augmented from information from the live collaboration. This ability to easily combine static and dynamic information as part of the form definition within a consistent representation is an important advantage of the system.

If the consume request has not undergone a state change, the agent server 140 determines if there are remaining consume requests in the list at 942. If the consume request has undergone a state change, the agent server 140 flags the consume request (945). After the consume request is flagged at 945, the agent server 140 determines if there are remaining consume requests in the list at 942. Once the agent server 140 determines that there are no remaining consume requests in the list at 942, the process of evaluating the consume requests is complete.

It is undesirable to process consume requests for participants that are no longer registered in the collaboration. In order to ensure that the agent server 140 only processes consume requests for active or suspended participants in the collaboration, consume requests for de-registered participants are removed from the instance data in the collaboration. When a software system is configured to terminate participating in a collaboration, such as when it is shutting down, the software system transmits a de-registration request with its participant token and user token to the agent server 140. In response, the agent server 140 notes the de-registration of the software system and removes the consume requests of the software system and the registration of the software system itself from the instance data in the collaboration. Additionally, when the agent server 140 stops receiving polls from a software system, the agent server 140 can de-register the software system and its consume requests from the collaboration. The agent server 140 maintains the data item values in the instance data in the collaboration provided by a software system 116 that de-registers, unless directed otherwise by the software system.

During operation, the agent JavaScript API polls the agent server 140 to determine if the states of the consume requests that it has registered have changed (i.e., if the consume requests are flagged). Upon being notified by the agent server 140 that one or more consume requests have changed state, the agent JavaScript API requests the values that satisfied the consume requests. When the values satisfying the consume requests are received from the agent server 140, the agent JavaScript API references the associations recorded at 374 and uses the callbacks to pass the newly-received values to the semantic form object, along with the associated data keys and an identifier of which consume request each value relates to. In turn the semantic form object passes the values and associated data keys and consume requests to the form engine object.

As the form engine object receives this data, it references its internal lists of widgets and associated data keys and consume request definitions generated at 382 and 383 to pass these values to the respective widget objects. In turn, the widget objects call a method of the DOM to inject the newly-received values.

Representative Types of Participants in Collaborations

Figure 26A:
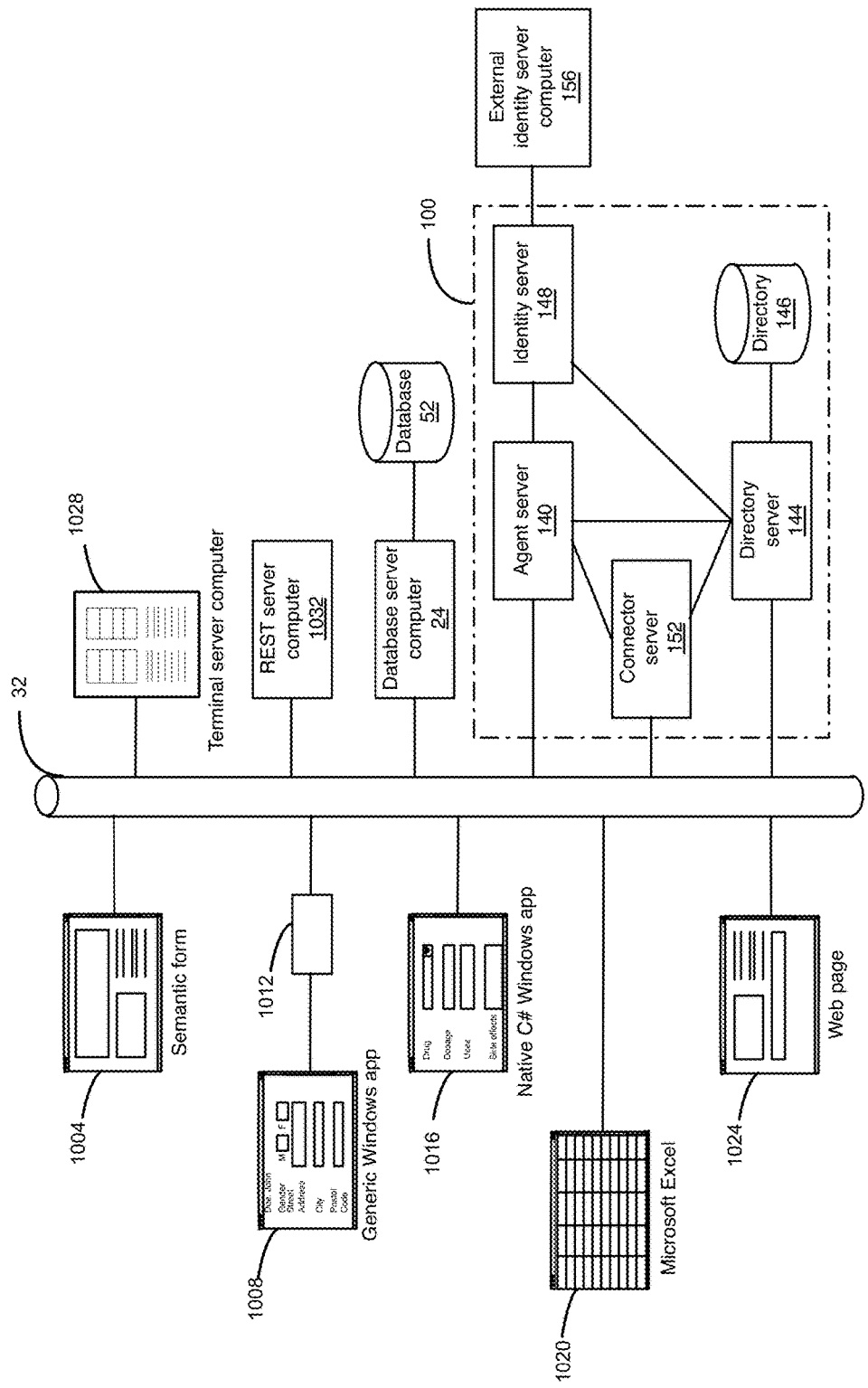
FIG. 26A shows a schematic diagram of various logical components of software systems that can participate in a collaboration managed by the data-sharing server computer system of FIGS. 1 to 3.

FIG. 26A illustrates various representative types of software modules, programs, applications, services, etc. that can make up software systems that can participate in a collaboration. A semantic form 1004 is shown executing in a web browser on a personal computing device is shown in communication with the communications network 32. A generic MICROSOFT WINDOWS application 1008 is also executing on a personal computing device is shown in communication with the communications network 32 via a MICROSOFT WINDOWS application adapter 1012. A native C# MICROSOFT WINDOWS application 1016, MICROSOFT Excel 1020, and a web page 1024 also executing on the same or other personal computing devices are also shown in communication with the communications network 32. Further, a terminal server computer 1028, a REST server computer 1032, and the database server computer 28 are in communication over the communications network 32. Further, the agent server 140, the directory server 144 and the connector server 152 are also in communication with some or all of the other above-noted components via the communications network 32.

Figure 26B:
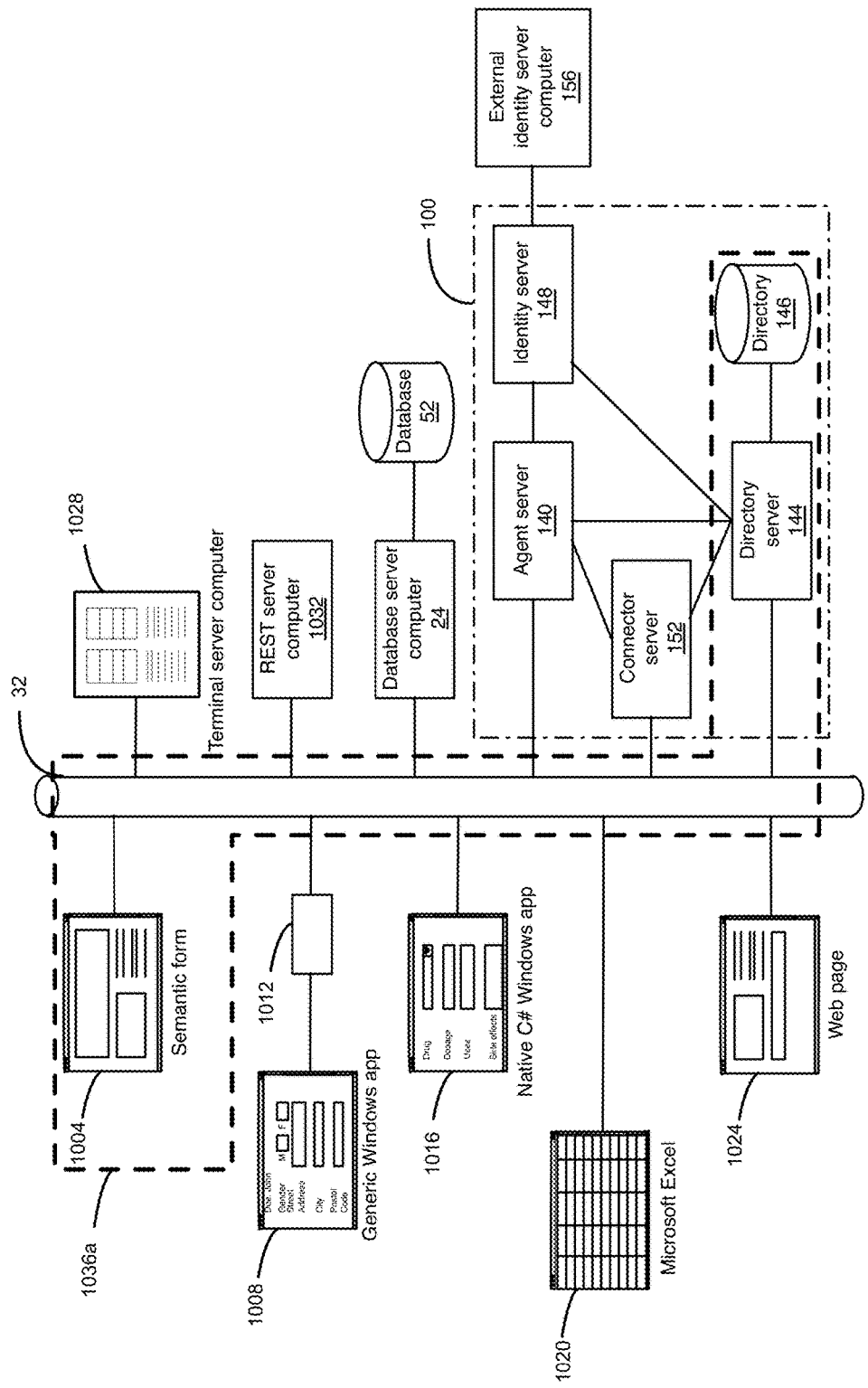
FIGS. 26B to 26I show the delineation of each separate software system that can participate in a collaboration managed by the data-sharing server computer system of FIGS. 1 to 3.

FIG. 26B shows a first software system 1036*a*, wherein the semantic form is programmed to interact with the agent server 140 to participate in collaborations. The participant definition 208 stored by the directory server 144 for the semantic form includes view configuration data that is placed in a collaboration at its creation and provided by the agent server 140 to a web browser. It specifies at least one consume request for additional view configuration data provided by other software systems in the collaboration, as well as any form data used to populate the view.

Figure 26C:
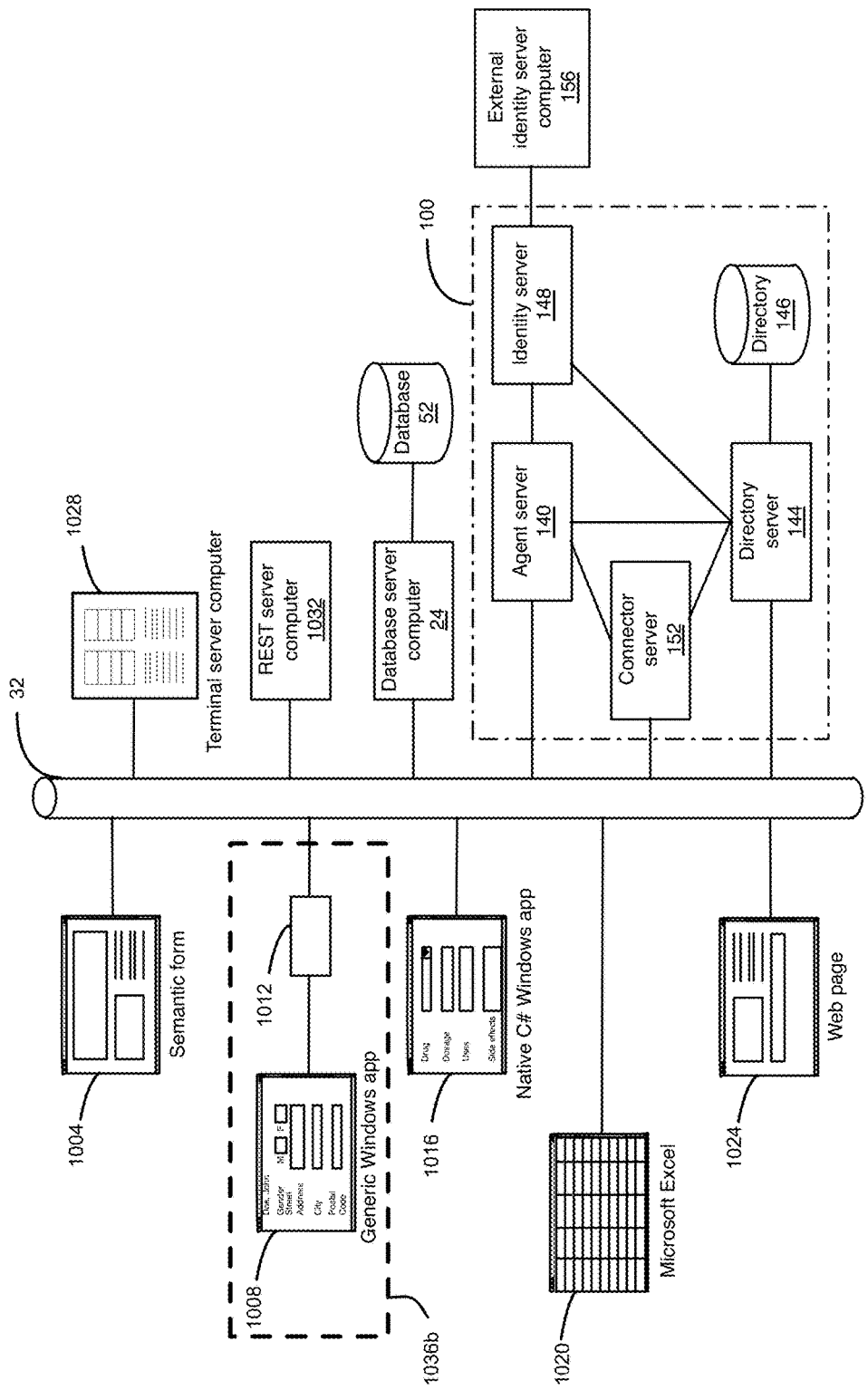

FIG. 26C shows a second software system 1036*b*, wherein the MICROSOFT WINDOWS application adapter 1012 communicates with the generic MICROSOFT WINDOWS application 1008 via MICROSOFT User Interface Automation functionality to enable the MICROSOFT WINDOWS application 1008 to participate in the collaboration. When this functionality is enabled on a MICROSOFT WINDOWS-based computer, the MICROSOFT WINDOWS application adapter 1012 can observe the generic MICROSOFT WINDOWS application 1008 and share data item values that are updated therein. The MICROSOFT WINDOWS application adapter 1012 polls the agent server 140 for consume request notifications and retrieves updated values for data items corresponding with consume requests and uses those values to populate the fields of the generic MICROSOFT WINDOWS application 1008.

Figure 26D:
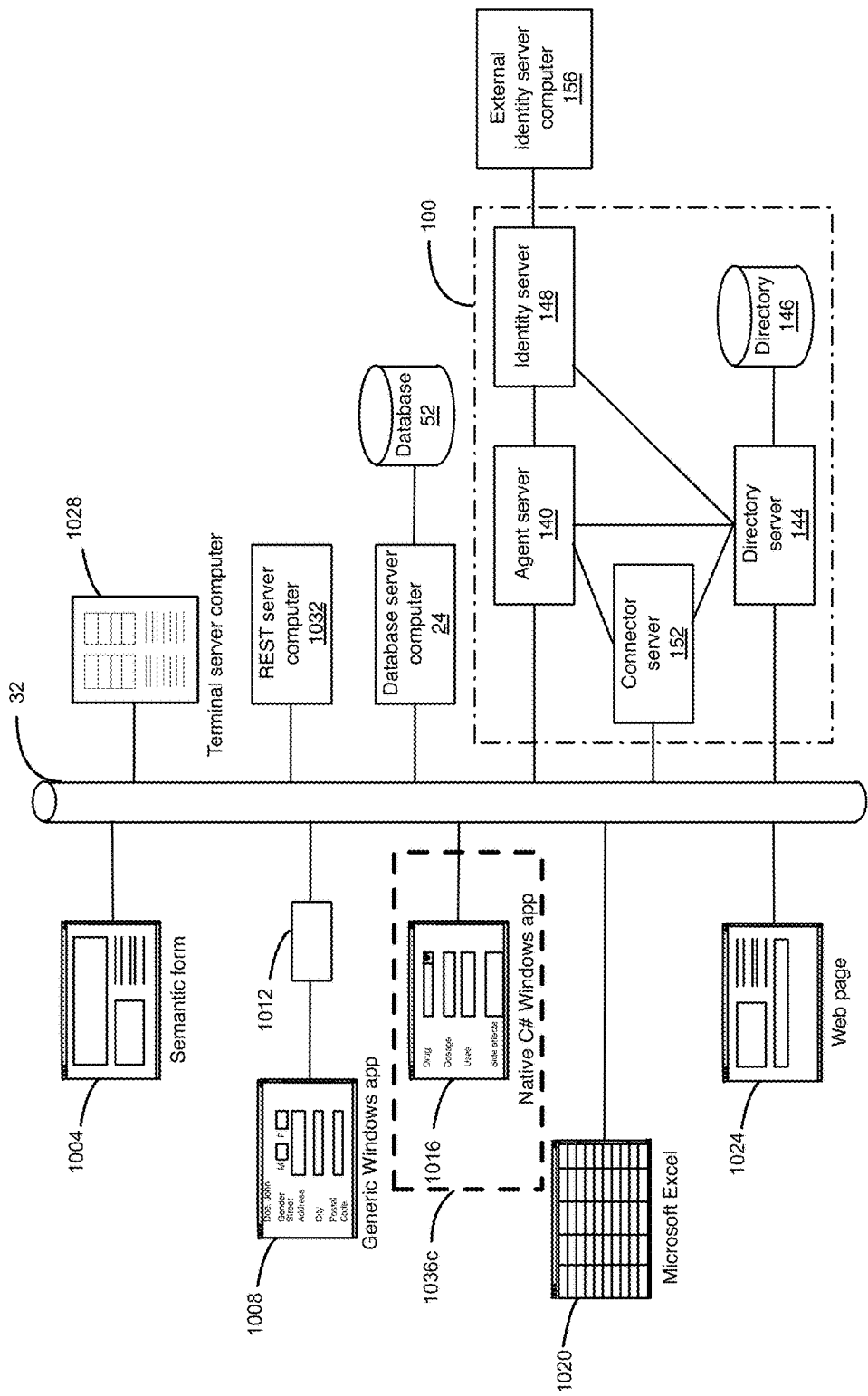

FIG. 26D shows a third software system 1036*c*, wherein the native C# MICROSOFT WINDOWS application is programmed to interact with the agent server 140 to participate in collaborations.

Figure 26E:
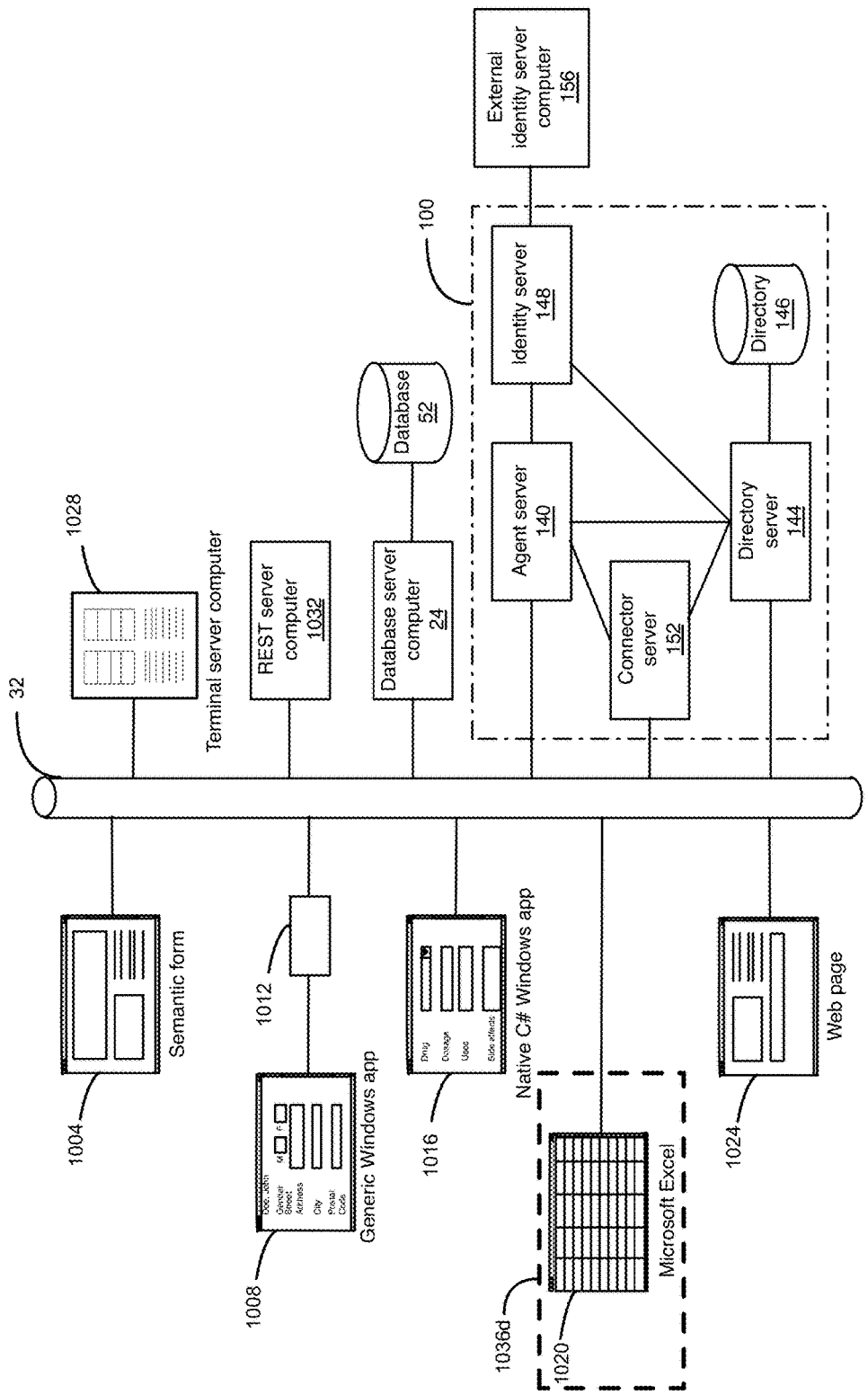

FIG. 26E shows a fourth software system 1036*d* that includes MICROSOFT Excel 1020. An add-in is installed in MICROSOFT EXCEL. The add-in extends the functionality of Excel by defining a set of custom functions that permit share definitions and consume requests to be defined in cells of a spreadsheet. In addition, the custom functions enable a user to provide login credentials entered in the spreadsheet to the stateful data sharing service when the spreadsheet is opened. The share definition function provided with the add-in causes updated values of the function to be communicated to the agent server 140. The consume request function provided with the add-in periodically queries the agent server 140 for consume request notifications.

Figure 26F:
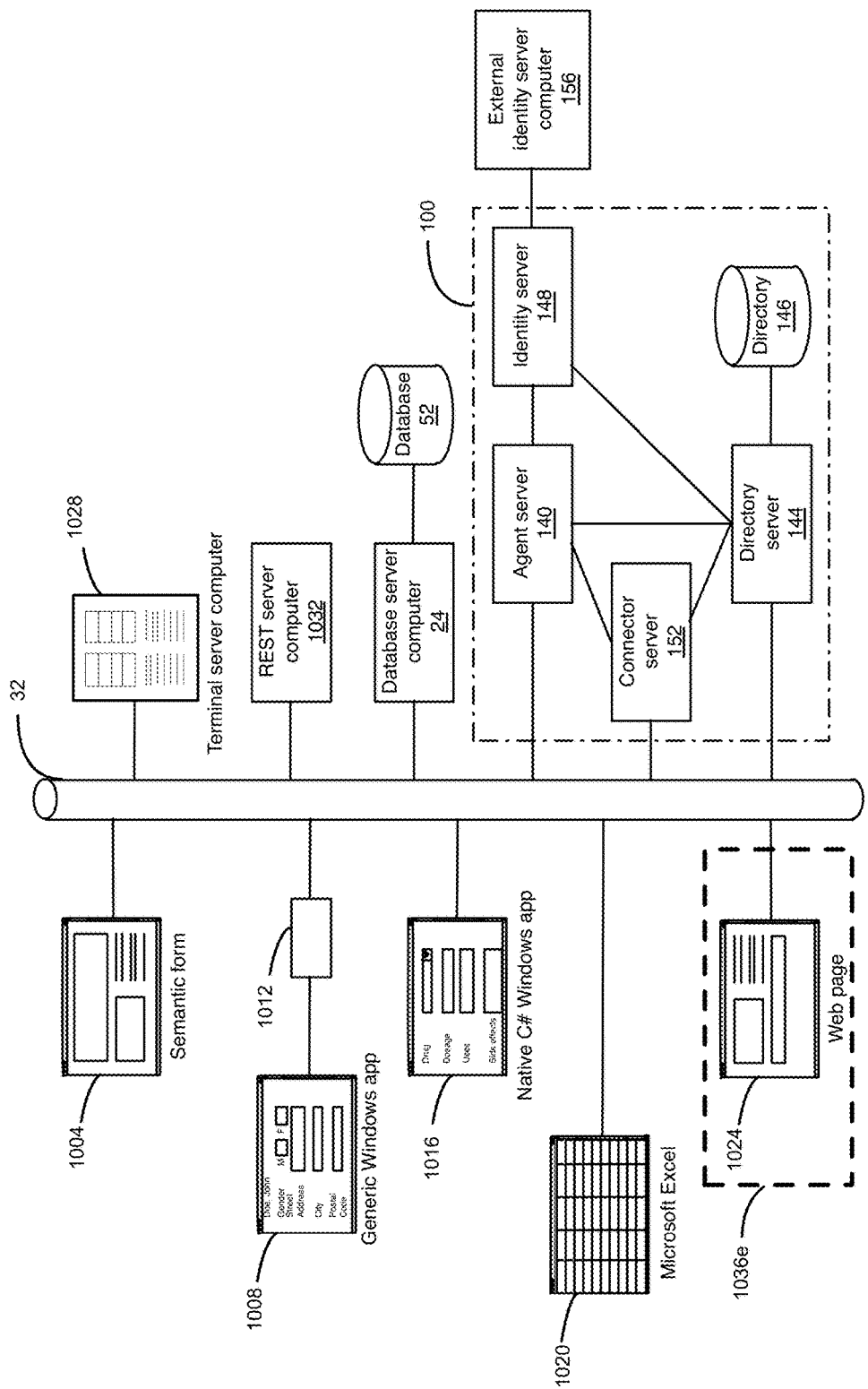

FIG. 26F shows a fifth software system 1036*e*, wherein the web page 1024 communicates data typed into or retrieved with a web page from a web server computer to the agent server 140. This is implemented in one of two ways. In a first mode, native JavaScript is injected into web pages received from the web server computer, by a browser extension, dynamic proxy, or server-side filter, enabling them to interact with the agent server 140 to participate in collaborations and share data within web pages. In a second mode, the web page generated by the web server computer include scripts to cause the web page to interact with the agent server 140 to participate in collaborations and share data within the web pages.

Figure 26G:
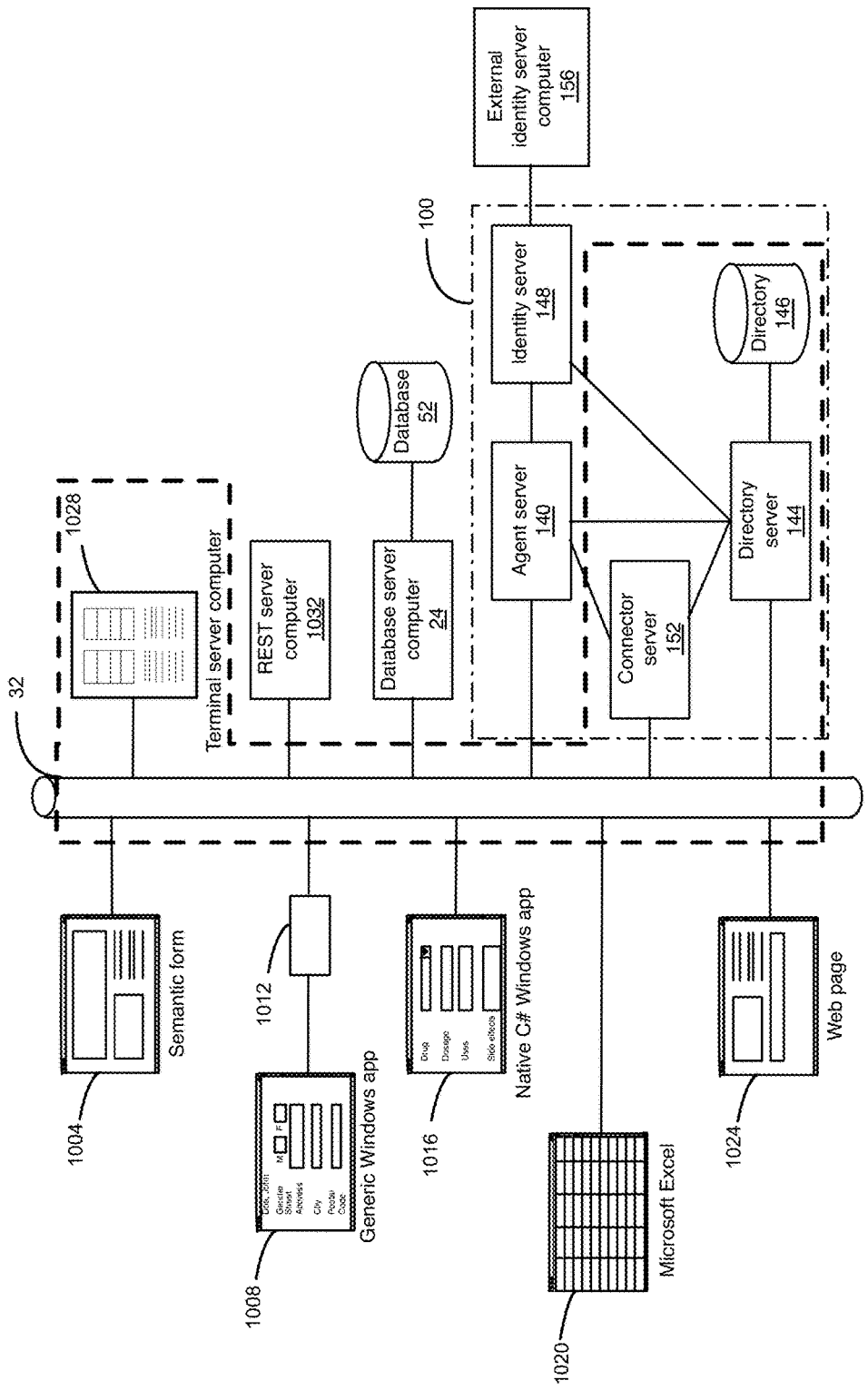

FIG. 26G shows a sixth software system 1036f, wherein a terminal services connector executed by the connector server 152 connects to the terminal server 1028. The consume requests within the participant definition 208 include the URL of the terminal server 1028 and terminal commands to be executed when data item values in the collaboration cause the consume request state to change. A consume request can have an associated share definition in the participant definition corresponding to data item values generated by the terminal server 1028 in response to the terminal commands that are to be shared with the collaboration. When a collaboration is created that includes a proxy connector participant associated with the terminal services connector, the agent server 140 instantiates and registers the proxy connector participant. As the proxy connector participant is provided data item values for a consume request that underwent a state change, it passes the values to the terminal services connector, together with the user token, the participant definition URI, and the consume request definition URI. In response, the terminal services connector retrieves the consume request definition and any associated share definitions from the directory server 144. The consume request definition includes the URL of the terminal server 1028 and any syntax for generating associated terminal commands. The terminal services connector then generates terminal commands including these data item values and transmits them to the terminal server 1028, and provide data item values returned by the terminal server 1028 to the proxy connector participant in response to the terminal commands. The proxy connector participant, in turn, shares these values with the collaboration via the agent server 140.

Figure 26H:
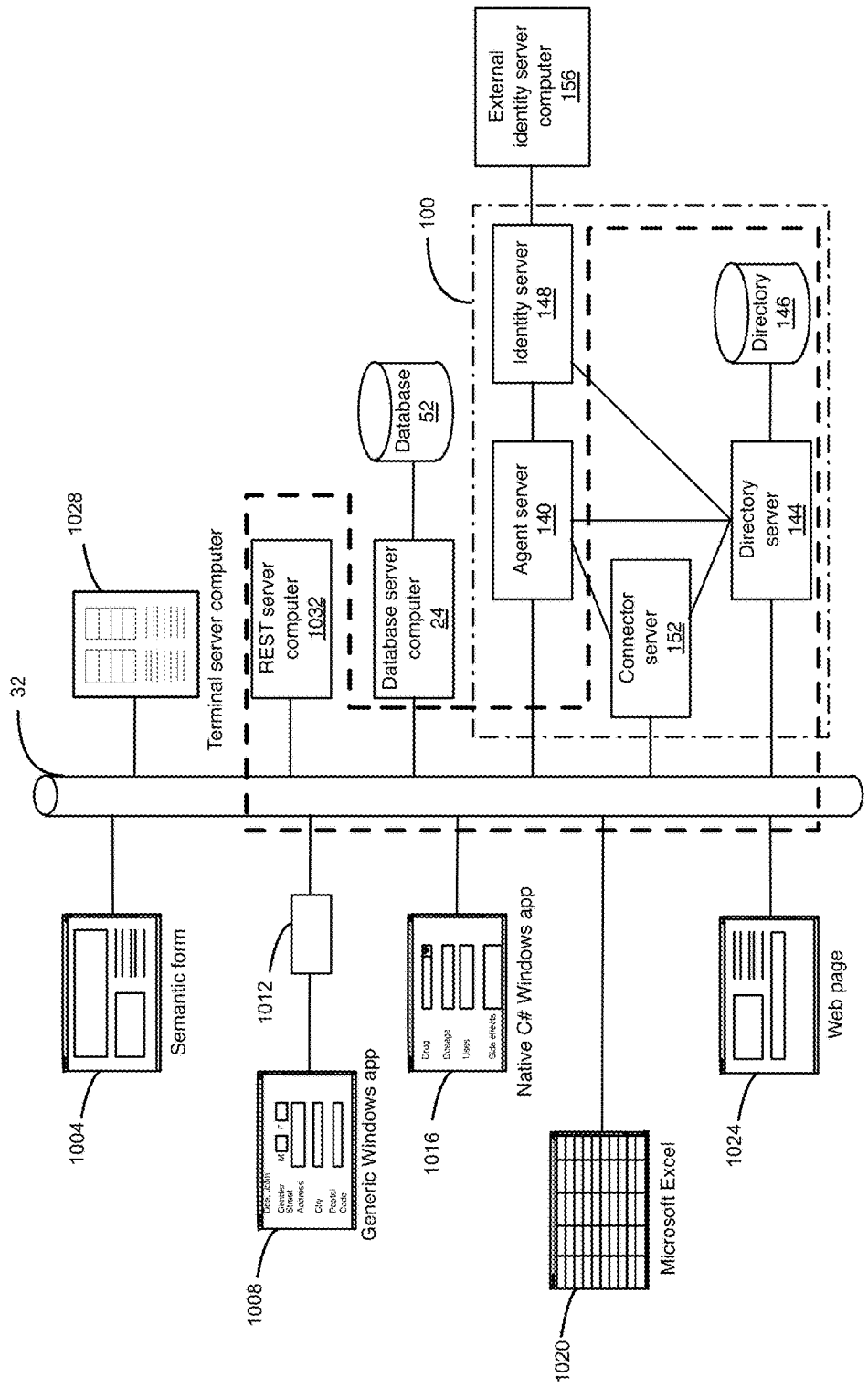

FIG. 26H shows a seventh software system 1036g, wherein a REST connector executed by the connector server 152 connects to the REST server computer 1032. The consume requests within the participant definition 208 include the URL of the REST server computer 1032, as well as mapping statements that allow information from the collaboration to be used to generate, and determine the type (GET/POST) of the resource request. When a collaboration is created that includes a proxy connector participant associated with the REST connector, the agent server 140 instantiates and registers the proxy connector participant. As the proxy connector participant is provided data item values for a consume request that underwent a state change, it passes the values to the REST connector, together with the user token, the participant definition URI, and the consume request definition URI. In response, the REST connector retrieves the consume request definition and any associated share definitions from the directory server 144. The consume request definition includes the URL of the REST server computer 1032 and any syntax for generating associated commands. The REST connector can then generate and send REST requests including the data item values to the REST server computer 1032, and provide data item values returned by the REST server computer 1032 to the proxy connector participant in response to the REST requests. The proxy connector participant, in turn, shares these values with the collaboration via the agent server 140.

Figure 26I:
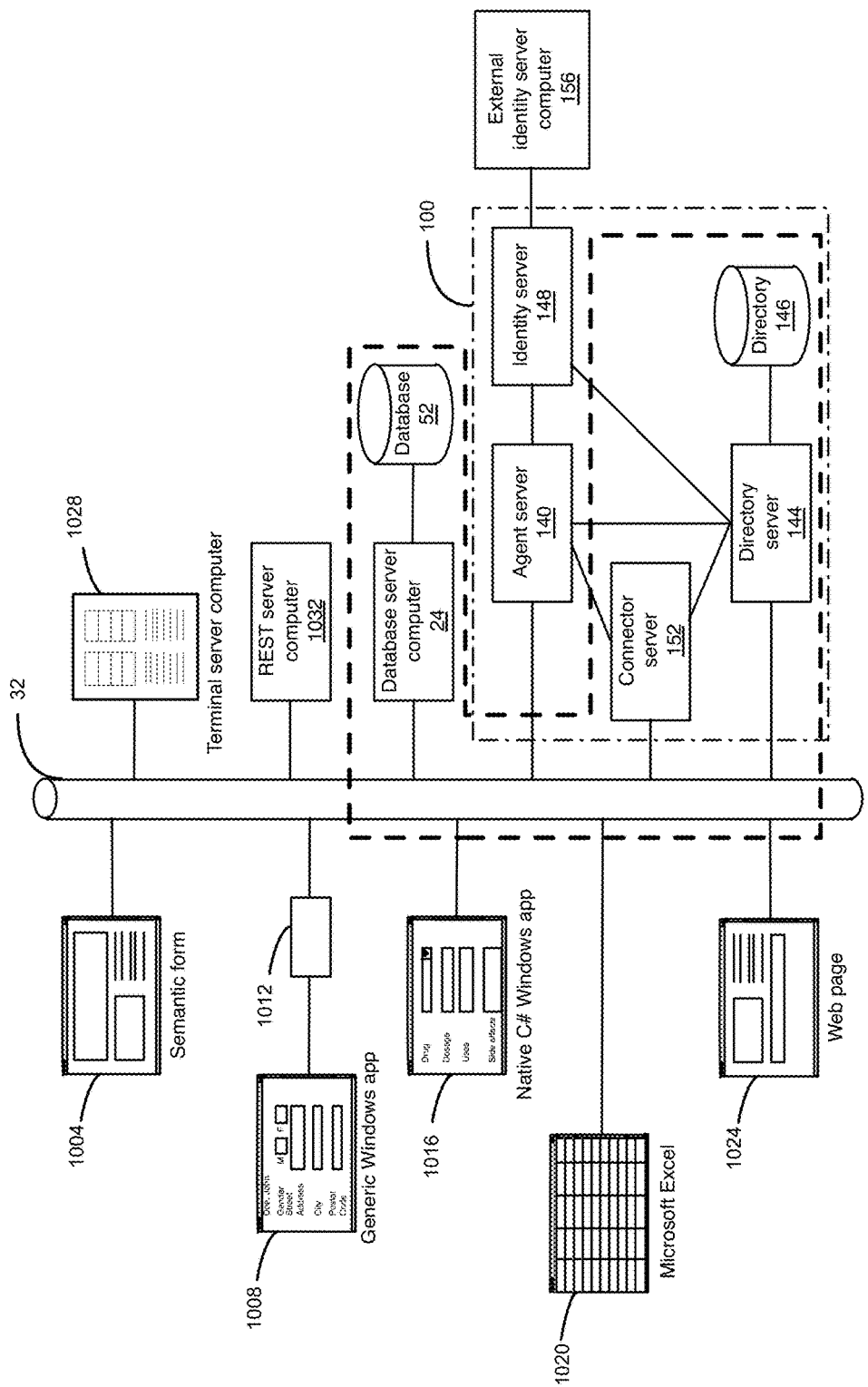

FIG. 26I shows a eighth software system 1036h, wherein a database connector executed by the connector server 152 connects to the database server computer 28. The consume requests within the participant definition 208 include the URL of the database server computer 28 and parameters for constructing database queries and write messages. When a collaboration is created that includes a proxy connector participant associated with the database connector, the agent server 140 instantiates and registers the proxy connector participant. As the proxy connector participant is provided data item values for a consume request that underwent a state change, it passes the values to the terminal services connector, together with the user token, the participant definition URI, and the consume request definition URI. In response, the database connector retrieves the consume request definition and any associated share definitions from the directory server 144. The consume request definition includes the URL of the database server computer 28 and any syntax for generating associated database requests. The database connector then generates database queries and write messages using the information from the consume request definition and transmits them to the database server computer 28. The database connector can then provide data item values returned by the database server computer 28 to the proxy connector participant in response to the database queries. The proxy connector participant, in turn, shares these values with the collaboration via the agent server 140.

Figure 26J:
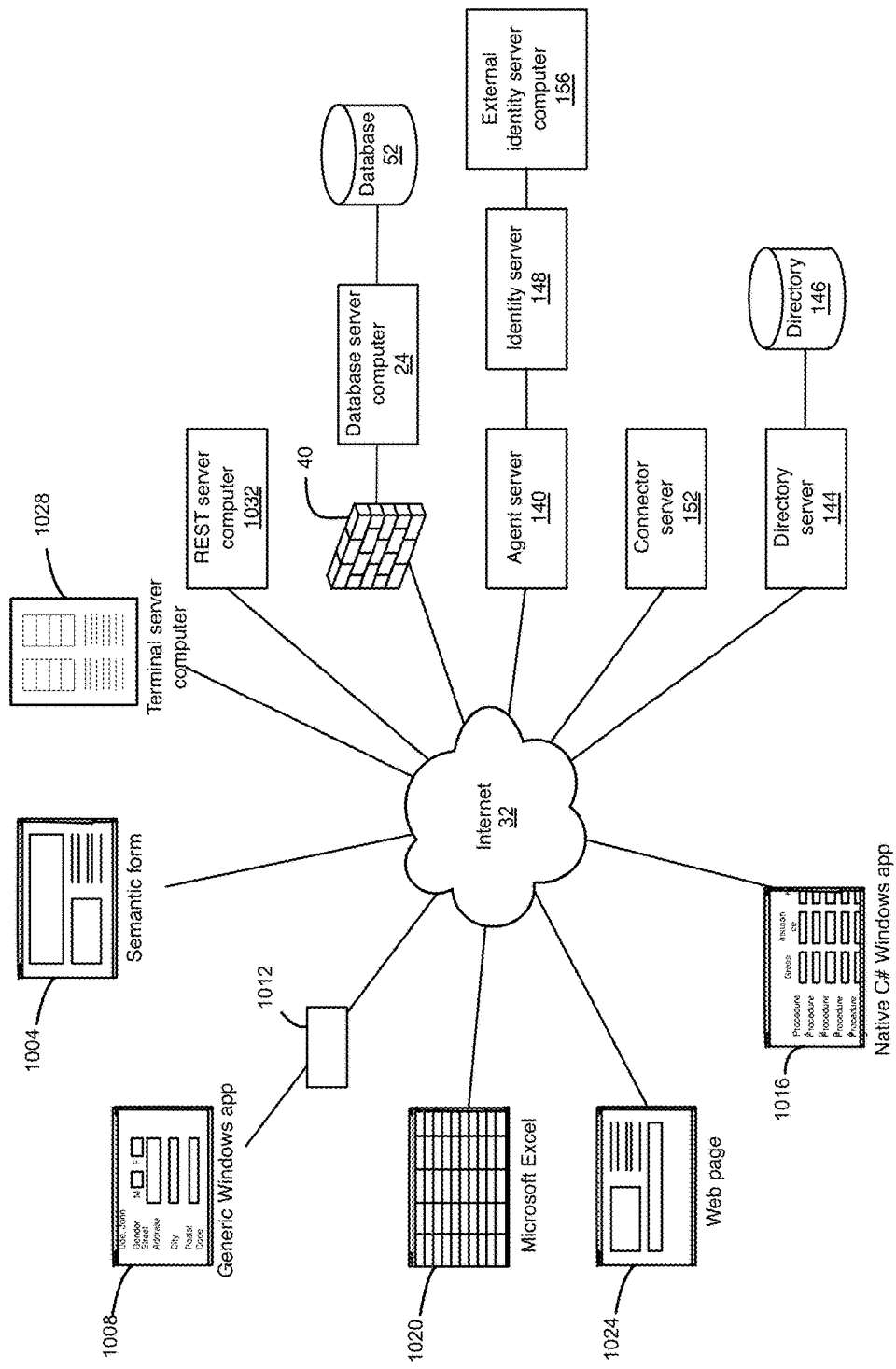
FIG. 26J shows an alternative configuration of the logical components of the software systems and the data-sharing server computer system of FIG. 26A.

FIG. 26J shows an alternative configuration for the components shown in FIG. 26A. In this alternative configuration, each of the components is in communication with the other components over the Internet 40. The directory server 144, connector server 152 and agent server 140 can all be located remotely from one another. Even though the identity server 148 and the external identity server computer 156 are shown in direct communication with the agent server 140, it should be understood that these services can also be located remotely from the other components. This is made possible as the addresses of each server are provided as a URL. In such a configuration, it may be desirable to have one or more ports opened on the firewall 44 for database connectors in the connector server 152 to talk to the database server computer 28.

In another configuration, it may be desirable to locate a connector server 152 topologically adjacent the resource(s) and/or server computer(s) providing functionality that they are accessing for performance and/or security reasons.

Exemplary Collaboration and Participant Definitions

In order to illustrate the functioning of the system, the collaboration definition and associated participant definitions for the exemplary configuration of FIG. 3 will now be described. In this simple exemplary collaboration, a view is generated for a user via a semantic form.

Figure 27:
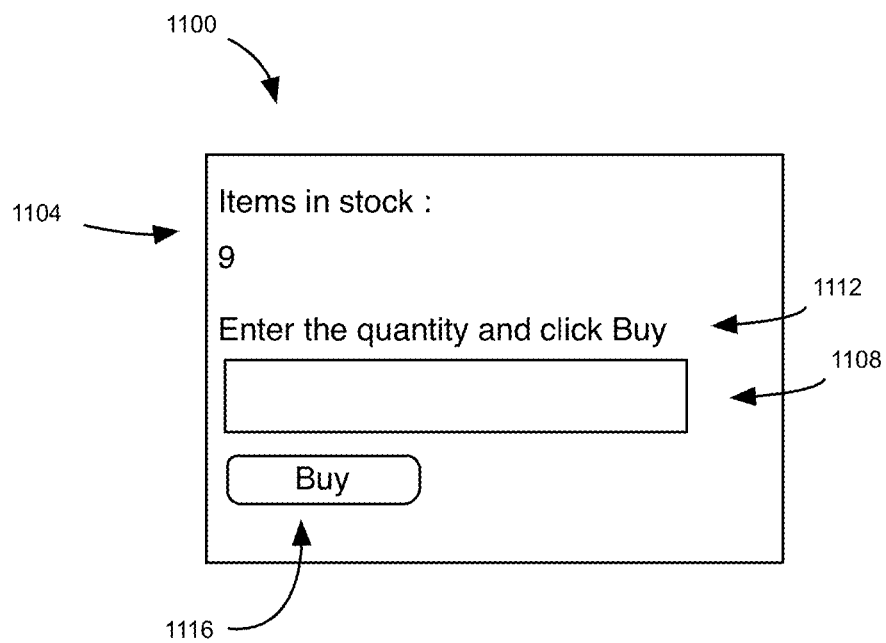
FIG. 27 illustrates an exemplary view generated using the system of FIGS. 1 to 3.
Figure 30B:
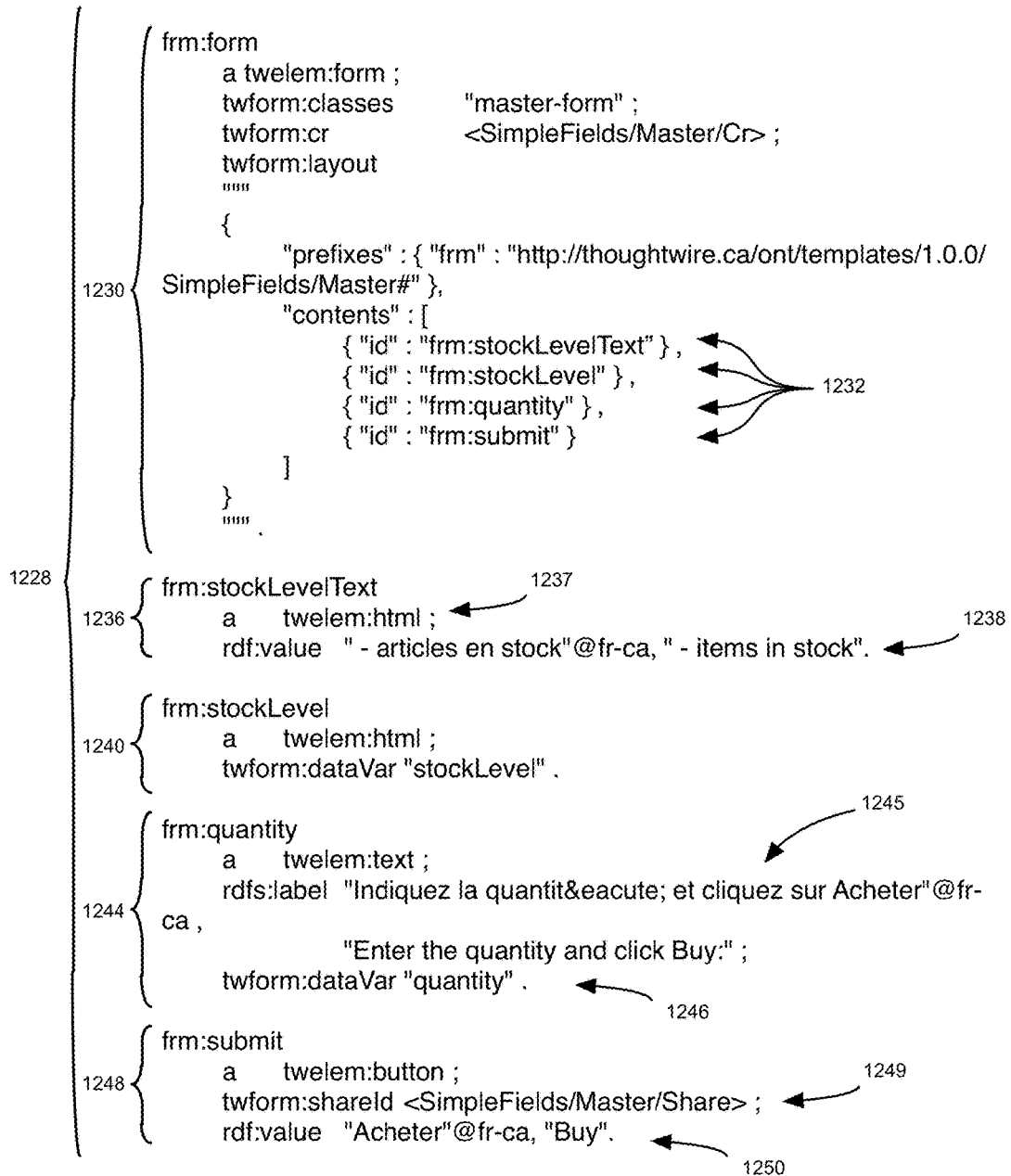

FIG. 27 illustrates a view 1100 generated from the semantic form. The view 1100 includes information text 1104, a text input field 1108, some prompt text 1112 for the text input field 1108, and a button 1116. The information text 1104 indicates the number of items remaining in stock and some text to provide context to the number. This number is provided by an inventory software system in the collaboration. The prompt text 1112 indicates what should be inputted into the text input field 1108 by a user. Activation of the button 1116 by clicking shares the entry inside the text input field 1108 in the collaboration.

The view 1100 is embedded in a commerce web site page that provides information about a product, including a price. The commerce web site page enables the purchase of a particular product. Next-to-real-time inventory information for the product is provided by the database server computer 40 and displayed dynamically in the view 1100, thus allowing a user to make a purchasing decision that may be influenced by the inventory information. The information text 1104, the prompt text 1112 and the text on the button 1116 are presented in either English or in French, depending on a user language preference retrieved from the REST server computer 36.

The collaboration definition and some of the participant definitions identified therein are presented in FIGS. 28 to 31B.

FIG. 28 shows the collaboration definition for this collaboration. The collaboration definition specifies a base path 1204 and a set of prefixes 1208 that can be used thereafter without the need to retype these paths. Basic information 1212 about the collaboration indicates that a collaboration type is being defined, provides comments about the collaboration type, and includes a label string for it. The collaboration definition also includes a set of four participant definition URIs 1216 that can participate in the collaboration. The four participant definition URIs 1216 are for a collaboration participant (with a fully qualified URI of <http://thoughtwire.ca/on/templates/1.0.0/SimpleFields/Participant>), a master semantic form participant (with a fully qualified URI of <http://thoughtwire.ca/on/templates/1.0.0/SimpleFields/Master>), a REST server connector participant (with a fully qualified URI of <http://thoughtwire.ca/on/templates/1.0.0/SimpleFields/User>), and a database server connector participant (with a fully qualified URI of <http://thoughtwire.ca/on/templates/1.0.0/SimpleFields/Inventory>). The collaboration participant provides some basic information about the collaboration. The master semantic form participant defines the basis for the layout of the view. The REST server connector participant communicates with the REST server computer 36 to obtain a user language preference for the user. The user language preference is optional and may be any language. The database server connector participant communicates with the database server computer 40 to regularly retrieve the stock level of a product.

FIGS. 29A and 29B show the participant definition for the collaboration participant. The participant definition specifies a base path and prefixes like in the collaboration definition presented in FIG. 28. In addition, the participant definition includes participant configuration information 1220, including a participant definition URI 1221 for the master semantic form participant to be loaded when the page is launched. A primary consume request definition 1222 enables the participant configuration information 1220 to be retrieved by the collaboration participant from the collaboration model during runtime.

FIGS. 30A to 30G show the participant definition for the master semantic form participant. The participant definition specifies a base path and prefixes like in the collaboration definition and the participant definition for the collaboration participant. View configuration data within participant configuration information 1228 of the participant definition includes a set of declarations that provides the basis for a view that is generated in a web browser.

A first widget object definition 1230 is for a container widget that encapsulates the other widgets for the master semantic form. Four references 1232 within the first widget object definition 1230 identify the encapsulated basic widget objects. The definitions for the encapsulated widget objects include a second widget object definition 1236, a third widget object definition 1240, a fourth widget object definition 1244, and a fifth widget object definition 1248.

The second widget object definition 1236 provides a portion of the information text 1104 that gives context to the stock level. The second widget object definition 1236 includes a widget type 1237 for the widget object, and a text string set 1238. The text string set 1238 includes a default text string, "Items in stock:", and an alternative text string, "Articles en stock:", to display in case the user language preference data value indicates that a user prefers French Canadian over other languages (as indicated by a value of "fr-ca" for the user language preference data value). The text string set 1238 is placed in the collaboration model during creation of the collaboration. When the second widget object definition 1236 is retrieved from the context via a consume request, the SPARQL query returns either the default text string or the alternative text string if the user language preference in the instance data (provided by the REST server computer 36) is "fr-ca".

A third widget object definition 1240 displays a value from the collaboration with a data key of "stockLevel" representing the most current stock level in the information text 1104.

A fourth widget object definition 1244 displays the text input field 1108 with the prompt text 1112. The fourth widget object definition 1244 includes a prompt string set 1245 and a data key 1246 for the entry in the text input field 1108. Similar to the text string set 1238 of the second widget object definition 1236, the prompt string set 1245 includes a default text string, "Enter the quantity and click Buy", and an alternative text string, "Indiquez la quantité et cliquer sur Acheter" that are selected from based on whether the user language preference shared in the instance data of the collaboration by the REST server computer 36 has a value of "fr-ca".

A fifth widget object definition 1248 is for the button 1116 that triggers the sharing of the value of the text input field 1108 from the third widget in the collaboration. A share definition 1249 is identified as a triggered action when the button is clicked. A button text string set 1250 is also provided. Similar to the text string set 1238 of the second widget object definition 1236, the button text string set 1250 includes a default text string, "Buy", and an alternative text string, "Acheter" that are selected from based on whether the user language preference data value shared by the REST server computer 36 in the collaboration is "fr-ca".

Included in the participant definition are a set of consume requests and a share definition.

A first consume request definition 1252 is defined for retrieving the stock level shared by the database server computer 40 in the collaboration and associating it with a data key of "stockLevel".

A share definition 1256 is defined for sharing the value (i.e., with a data key of "quantity") from the text input field 1108 in the collaboration upon activating the button 1116.

A second consume request definition 1260 is defined as a primary directory consume request definition for retrieving the basic (non-widget-specific) portion of the view configuration data 1228 housed in the participant definition 208 and instantiated in the collaboration model. This basic view configuration data 1228 includes a list of the consume requests, and the share definition.

A third consume request definition 1264 is defined for retrieving the portion of the view configuration data 1228 relating to widgets that is housed in the participant definition 208 and instantiated in the collaboration model, as well as the user language preference from the database server computer 40 in the instance data. The third consume request definition 1264 uses the user language preference retrieved from the instance data to conditionally select the appropriate text string for each widget.

FIGS. 31A to 31C show the participant definition for the participant definition for the proxy connector participant that communicates with the REST server computer 36 via a REST connector. The participant definition also specifies a base path and prefixes. A set of participant configuration information 1260 indicates that the participant definition is for a REST connector participant, provides an address for the REST server, and identifies the consume request definitions and share definitions that the participant uses. A first consume request definition 1264 requests the identity of the user from the collaboration. A share definition 1268 shares the user language preference retrieved from the REST server computer 36 once the user identity is received. A second consume request definition 1272 is a primary directory consume request for the participant configuration information 1260 in the participant definition.

The participant definition for the proxy connector participant that communicates with the database server computer 40 to regularly obtain inventory information is not shown.

Referring back to FIGS. 3, 6 and 17 to 22, upon generating and transmitting a request for the launch web page having the collaboration definition URI to the directory server 144 via a web browser at 310, the directory server 144 authenticates the user via an intermediate login page at 315. Once the user's credentials have been entered and authenticated, the directory server 144 generates a launch web page with the collaboration definition URI included in it and returns it to the web browser at 320. The JavaScript loader in the launch web page retrieves the agent JavaScript API 704 and semantic form util module 728 from the directory server 144 at 325. The agent JavaScript API 704 then sends a collaboration registration request to the agent server 140 using the collaboration definition URI received in the launch web page at 330.

Upon registering the collaboration, the agent server 140 places the participant definitions identified in the collaboration definition in the model data of the collaboration and determines that the participants with the URIs of <http://thoughtwire.ca/on/templates/1.0.0/SimpleFields/User> and <http://thoughtwire.ca/on/templates/1.0.0/SimpleFields/Inventory> are server-side connector participants. It instantiates a first proxy connector participant, configures it using the participant definition for the REST connector participant as illustrated in FIGS. 31A and 31B. Upon instantiation, the first proxy connector participant registers itself with the agent server 140 in the collaboration with its primary directory consume request based on its primary directory consume request definition, receives its consume request definition URIs and share definition URIs as a result of its primary directory consume request being satisfied, and registers an additional consume request based the consume request definition 1264. When the additional consume request is satisfied for that server-side connector participant, the agent server 140 sends the user identity satisfying the consume request to the proxy connector participant. The proxy connector participant, in turn, communicates with the REST server computer 36 via the REST connector to obtain the user language preference for the user identity. The proxy connector participant then shares the user language preference in the collaboration, referencing the share definition 1268 by URI. Concurrently, the agent server 140 instantiates a second proxy connector participant, which registers itself with the agent server 140 in the same manner as the first proxy connector participant. The second proxy connector participant frequently retrieves the stock level from the database server computer 40 via the database connector of the connector server 152, and shares it in the collaboration.

The agent JavaScript API 704 registers the collaboration participant and its consume requests at 340. Upon registration of the collaboration participant's primary directory consume request, the master semantic form participant definition URI 1220 is received with the participant configuration information from the collaboration participant at 345. The semantic form util module 728 then retrieves various semantic form JavaScript libraries from the directory server 144 at 350 and instantiates the semantic form object 708, the form engine object 712 and the layout engine object 716 from these libraries at 360.

The semantic form object 708 then registers the master semantic form participant and its consume requests at 370. First, the master semantic form participant is registered with its primary directory consume request (based on the primary directory consume request definition 1260. Upon registration of the primary directory consume request, the agent server 140 returns the list of consume request definition URIs from the basic portion of the view configuration data 1228 in the participant definition to the semantic form object 708 via the agent JavaScript API 704 in JSON format. The semantic form object 708 then registers consume requests for the consume request definition URIs received with the satisfied primary directory consume request. The agent JavaScript API 704 records the consume requests registered by the semantic form object 708 together with a callback to the antic form object 708.

As the registered consume requests are identified as being satisfied by the agent server 140, the semantic form object 708 receives the view configuration data from the agent server 140 via the agent JavaScript API 704 at 378. The consume request based on the consume request definition 1264 retrieves the view configuration data 1228 from the collaboration model, as well as view configuration data (I.e., the user language preference) from the instance data. When doing so, the RDF declarations in the collaboration model are evaluated in combination with the RDF declarations in the instance data relating to the user language preference and the label strings chosen in view of the user language preference are returned.

The semantic form object 708 then passes the view configuration data to the form engine object 712 for generating and rendering at 380. As the view configuration data is delivered, the form engine object 712 generates lists of widgets and associated data keys, consume requests and share definitions.

Referring now to FIG. 27, FIGS. 30A to 30F, and FIGS. 32A to 32C, the lists of widget object definitions and associated data keys, consume requests and share definitions respectively that are generated by the form engine object 712 from the view configuration data are illustrated. In particular, two widget object definitions are shown as either using or modifying data items in FIG. 32A. The third widget object definition 1240 with a URI of "http://thoughtwire.ca/ontology/2010/10/Form#stockLevel" presents the inventory count for the information text 1104 and thus retrieves the value for the data item with a data key of "http://thoughtwire.ca/ont/templates/1.0.0/stockLevel". The fourth widget object definition 1244 with a URI of "http://thoughtwire.ca/ontology/2010/10/Form#quantity" associates data entered by a user via the text input field 1108 with the amount of units to be purchased, having a data key of "http://thoughtwire.ca/ont/templates/1.0.0/quantity".

The first widget object definition 1232 with a URI of "http://thoughtwire.ca/ontology/2010/10/Form#form" is shown in FIG. 32B as being associated with the consume request definition 1252 with a URI of "http://thoughtwire.ca/ont/templates/1.0.0/SimpleFields/Master/Cr" for retrieving the value having a data key of "quantity" from the collaboration that is presented by the second widget object definition 1236.

The fifth widget object definition 1248 with a URI of "http://thoughtwire.ca/ontology/2010/10/Form#submit" is shown in FIG. 32C as being associated with the share definition 1256 with a URI of "http://thoughtwire.ca/ont/templates/1.0.0/SimpleFields/Master/Share" for sharing the value having a data key of "quantity" entered by a user into the text input field 1108 in the collaboration.

The form engine object 712 then calls on the appropriate widget objects to generate the HTML code and associated program code for each widget, and on the form layout object 716 to generate the framework for rendering widgets within container widgets. The HTML code and associated program code for the widgets of the semantic form are placed in the DOM of the web browser for presentation in the web browser window.

Returning again to FIG. 27, the view 1272 of the semantic form is generated using the collaboration definition and participant definitions of FIGS. 28 to 31B. In generating the HTML code for the semantic form, the form engine object 712 first generates the HTML code for the container widget and the layout engine object generates the HTML framework. The form engine object 712 then directs the widget objects to generate the HTML code and associated program code for the text widget that generates the information text 1104, the text input widget that generates the text input field 1108 and the prompt text 1112, and the button widget that generates the button 1116. All such snippets of HTML code are then concatenated together by the form engine object 712 and ultimately inserted into the DOM as a single HTML string. This results in a whole new DOM sub-tree created at the semantic form parent DOM node, which serves as the attach point.

When consume requests are satisfied, the agent server 140 passes values satisfying the consume requests in JSON format to the semantic form object 708 through the agent JavaScript API 704. In turn, the semantic form object 708 passes the values and associated data to the form engine object 712. The form engine object 712 looks to the mapping of data keys and consume request to widgets to determine which widget object uses the received data values. It then passes the values to the appropriate widget objects, which then inject these values into the DOM and thus the semantic form using the DOM's methods.

When the button 1116 is clicked on or otherwise activated, a callback in the DOM associated with the button 1116 causes the web browser to notify the form engine object 712 that values are ready to be shared in the collaboration. In turn, the form engine object 712 looks up the widget objects that are associated with the share definition associated with the button activation and directs them to collect all of the required data for that share definition. In this case, the form engine object 712 notifies the widget object that generated the text input box that the contents of the text input field 1108 should be shared. The particular widget object then queries the DOM to obtain the current value for the text input field 1108 and returns it to the form engine object 712. The form engine object 712 passes the value for the share definition to the semantic form object 708 together with the data key "quantity", which then communicates them to the agent server 140 via the agent JavaScript API 704. Thus, the same identifier provided by the agent server 140 with the form definition is used to communicate the value back to the agent server 140. The agent server 140 is then able to map the received value back into RDF for placement in the collaboration.

By storing both static declarations from a view definition that include view configuration data as well as additional declarations that can provide supplemental view configuration data and also form data associated with the view configuration data in the same metadata data language, resolving consume requests to subsets of these declarations using semantic descriptions, and then generating a view from the subset of declarations, dynamic views with complex interactions can be generated.

In addition to the advantages illustrated in the above example, the view configuration data from the static participant definition can be combined with other data to generate dynamic views in a number of ways.

The view configuration data from the participant definition can be augmented with additional view configuration data received from other software systems in the collaboration. As both the view configuration data from the participant definition and the view configuration data from other software systems in the collaboration are in RDF format, requests can be made for data from both the collaboration model and the instance data, the view configuration data from the instance data can used to affect how the view is generated and rendered. For example, the additional view configuration data in the instance data of the collaboration can be used as a parameter in a CSS class statement for a DIV (a section of an HTML document) so that format that is applied to the DIV can be controlled via that additional data. CSS classes can be defined to display or hide a DIV, enabling the additional data to control the appearance of a section of a semantic form.

The data type and mask for a display field, traditionally defined at the time the view is defined (i.e., before deployment) can be controlled with the additional data from the collaboration. Data types and display masks for values can be shared in a collaboration together with the values, and all of these can be requested in a consume request. Then, form data values, their data types and display masks can be used as parameters for generating widgets. In this way, the widget can be made to handle various data types and the display masks applied to the form data values can be controlled at runtime. For example, another software system can consume the user language preference and then share an appropriate mask for currency amounts; i.e., "$ x,xxx.xx" for English, "x.xxx,xx $" for French-Canadian, etc.

Parts of the user interface, such as page numbers, hyperlinks, branding, and images, can be stored in the collaboration and then retrieved as required.

Further, view configuration data from other software system can be pulled in from the collaboration to make the generated view highly dynamic.

For example, where a semantic form is designed for presenting a consolidated financial planning view, it can be desirable to only generate and present views when required. Information about all of the parts of the view are maintained in the semantic form configuration, however it is instance data that can vary by collaboration that determines which parts should be displayed. This allows the form to determine at runtime what parts of the form should be displayed as the instance data in the collaboration changes. To enable this, a first consume request can be defined for the RDF declarations that specify instance data values for the retirement savings account balances, deposits, withdrawals, account number, etc. (i.e., form data) from the collaboration. These data values are to be shared with the collaboration by another software system, such as a traditional financial planning system. One of these data values from the instance data (such as the retirement savings account balance) can act as an indicator of whether the person has a retirement savings account.

A second consume request can be defined for the RDF declarations for view configuration data for the portion of the view to be inserted so that there is structure in which to present retirement savings account information. This second consume request can depend on the indicator value, the retirement savings account balance, to determine whether that part of the form is relevant. This ability to dynamically evaluate the view configuration data from both the participant definition for the semantic form and the instance data (typically from other software systems) to resolve the displayed view is enabled because the view configuration data in the participant definition is specified and maintained in the same format as the view configuration data in the instance data: RDF.

The RDF declarations for this portion of the view define which data values should be displayed from the first consume request within the view by referring to locally unique data keys. These data keys are then used to resolve to the values requested in the first consume request.

Upon launching the collaboration for the master semantic form, the semantic form's consume requests are registered and the view configuration data is retrieved by the semantic form object. The traditional financial planning system, likely accessed via a server-side connector, shares data in the collaboration. In particular, the traditional financial planning system shares values for the retirement savings account balances, deposits, withdrawals, account number, etc. These values are received and converted into RDF declarations by the proxy connector participant within the agent server 140. These declarations, in combination with the view configuration data from the participant definition, define the view, and include the retirement savings account portion only if the user has a retirement savings account. If the indicator data value (i.e., the retirement savings account balance) is present in the collaboration, the second consume requests is satisfied and that portion of the form is displayed.

The data values satisfying the first consume request relating to the RDF declarations for the retirement savings account balances, deposits, withdrawals, account number, etc. are delivered to the form engine object whenever the consume request is satisfied. These values are uniquely identified with data keys within the context of the consume request. The data keys provided with the values satisfying consume requests match data keys used in the view configuration data to define the information (i.e., form data) that should be presented in various parts of the form. The form definition references both a particular consume request that provides information for a section of the form and the unique data key for the value within that consume request.

In this manner, a view for a semantic form that is dynamically-generated based on the available data is rendered.

All of the above examples benefit from the fact that the semantic form receives the results of consume requests as the status of the consume requests changes. Thus, the view generated for a semantic form can dynamically change as the data in the collaboration changes. Other software systems/participants can register and de-register during the course of the collaboration. Additionally, participants can add and remove values from the instance data in the collaboration.

In one example, a semantic form for a blood test for cholesterol could include a dynamic presentation of the main indicator values for the test. If the patient has had only one recent test then the presentation could use a simple text layout which highlights the important values and shows how they compare to the normal values for the patient's demographic. For patients that are taking tests regularly, possibly as part of a hospital stay, it is more important to show trends over time than the most recent value. A semantic form could decide at runtime based on the number of blood test values available whether to display a chart or a textual presentation of the values based on the number of blood test values available in the collaboration and the current diagnostic indicators for the patient, changing the display based on the different indicators that are important for kidney function versus post cardiac surgery monitoring. The blood test information could be delivered by a third-party lab information system. To further improve the relevance of the displayed information, the view configuration data could respond to information in the collaboration about the individual who is using the form, providing different details to the surgeon than to the duty nurse.

The ability to determine form presentation directly as part of the semantic forms system greatly simplifies the ability to dynamically alter the form presentation to respond to contextual clues. Competing systems require a mix of programming languages with both procedural and declarative aspects that can be very hard to develop and maintain.

The unified data model for the declarations in the view definition and the instance data provides other advantages. Typically, it is the responsibility of a static view definition to define all of the formatting required for the information to be displayed. This can make it difficult to maintain consistent rules for presentation of things like significant digits, date formats and other rules specific to particular data types and instance values. In contrast, view configuration data in the view definition does not need to include all of this information directly since they can easily find the information from the definition of the data values to be displayed. One simple example of this capability is the label to be used to describe a data value when it is displayed. These labels are typically chosen to be meaningful to the widest cross-section of the user community, respect corporate branding and standards, and must be translated into multiple languages. The system allows these labels to be attached to the definition of the data values themselves instead of to the form definition. Then, when a data value is referenced by a data key from the form definition, the semantic form engine can retrieve the corresponding label to use in the form, allowing the same label to be used in any form without extra effort.

Further, a user interface using the method disclosed herein can be developed with knowledge of fewer languages as the declarations defining the view, the declarations for data used to alter the view, and the declarations for data used to populate the view are all expressed in the same metadata data model. This enables more rapid design and testing of such user interfaces.

While the method of managing data sharing sessions in accordance with the invention has been described with respect to a particular embodiment, those skilled in the art will appreciate that various modifications can be made without affecting the underlying inventive approach.

While the main embodiment describes the various components of the stateful data-sharing service residing on the same physical computer, those skilled in the art will appreciate that the components can reside on separate physical computers.

While the invention is described with reference to web browsers, those skilled in the art will appreciate that it can be used with other clients and platforms. For example, it can be used to generate and render views on a rich desktop or a mobile user interface.

When registering a collaboration, the system can be configured to have a collaboration ID included with the collaboration registration request. For example, the directory server 144, when generating the launch web page, can generate a collaboration ID and embed it in the launch web page. Alternatively, the client-side code, when loaded via the launch web page, can generate a collaboration ID to be transmitted with the collaboration registration request.

Any of the view definitions and the sets of declarations in the metadata data model can be stored locally on the machine on which the view is rendered or on a remote machine.

The participant definitions, the collaboration definitions and other artefacts can be stored in various manners, such as files, database entries, etc.

Participant definitions and other artefacts relating to a collaboration can be defined within collaboration definitions and stored as a single artefact and parsed by the data-sharing server computer system in such a manner that participants are not provided access to the participant definitions of other participants, etc. Alternatively, the participant definitions and other artefacts can be assembled with the collaboration definition and delivered to a requesting system at the time the request is made.

While, in the described embodiments, the participant definitions, ontology datasets, etc. are instantiated in a collaboration model, they can also be retrieved from non-volatile storage as needed.

The various artefacts for collaborations can be stored as files, configuration scripts, configuration parameters stored in a database, etc.

While, in the above-described embodiment, the client, via the agent JavaScript API, polls the data-sharing server computer system to determine if updated values are available on behalf of one or more semantic forms, the client can be notified of updates to requested data item values in other ways. For example, the data-sharing server computer system can push updated values or notifications that updated values are available to the client. Other methods by which the software systems can be notified of updated data item values will occur to those skilled in the art.

While the invention has been described with specificity to a JAVA programming language implementation, other types of implementations will occur to those of skill in the art. For example, the stateful data sharing service could be written in any one of a number of programming languages, such as Microsoft's C# or Javascript. Any general purpose programming language could be substituted.

The interfaces of the various components of the stateful data-sharing service could be substituted with any of a variety of interfaces, such as JAVA Remote Method Invocation, MICROSOFT .NET WINDOWS Communication Framework, Message queue style communications or even simple function calls.

RDF can be replaced with other metadata data models.

SPARQL is only one possible query language for use in constructing standing queries. Other examples include XsRQL and RQL.

Any identifier that provides uniqueness within the referenceable address space would work in place of URIs. For example, an integer or a Globally Unique Identifier ("GUID") could be employed.

Various components of the stateful data-sharing service can be used with multiple other instances of a component. For example, a single directory server can be used for two or more agent servers.

The data-sharing server computer system can be configured to create a collaboration when a participant registration request is received from a software system and no existing collaboration which the software system is permitted to join has capacity for it.

Computer-executable instructions for implementing the stateful data sharing service on a computer system could be provided separately from the computer system, for example, on a non-transitory computer-readable medium (such as, for example, an optical disk, a hard disk, a USB drive or a media card) or by making them available for downloading over a communications network, such as the Internet. The computer-executable instructions could be bundled with one or more software systems. For example, visiting a website that includes software system functionality could trigger a download event for the computer-executable instructions.

The above-described embodiments are intended to be examples of the present invention and alterations and modifications may be effected thereto, by those of skill in the art, without departing from the scope of the invention that is defined solely by the claims appended hereto.

What is claimed is:

1. A method for generating a view using a semantic form, comprising:

storing, in storage of a computer system, a first set of declarations in a metadata data model retrieved from a view definition for said semantic form, said first set of declarations for a first set of view configuration data specifying how a first part of a view is to be laid out, said first set of declarations being static and having a first set of semantic descriptions provided for said first set of view configuration data;

storing, in said storage, a second set of declarations in said metadata data model that are associated with said first set of declarations for a second set of view configuration data specifying consistently both (a) a layout specifying how a second part of said view is to be laid out, and (b) data that is to be displayed according to said specified layout in said second part of said view, said second set of declarations, being updatable and having a second set of semantic descriptions provided for said second set of view configuration data;

semantically resolving, via said computer system, at least one request for a set of requested data to a subset of said first set of view configuration data and a subset of said second set of view configuration data using said semantic descriptions provided for said first and second sets of view configuration data and said requested data;

displaying on a display screen said view rendered from said subset of said first set of view configuration data and said subset of said second set of view configuration data with said first and second parts of said view being laid out according to said first and second sets of view configuration data respectively, said view comprising at least one value of said requested data; and updating said view rendered from said subset of said first set of view configuration data and said subset of said second set of view configuration data whenever said subset of said second set of view configuration data, to which the at least one request for a set of requested data was semantically resolved, is updated, said updated view displaying at least one updated value of view configuration data in said subset of said second set of view configuration data.

2. The method of claim 1, wherein said first set of declarations identifies at least some of said set of requested data resolving to one of said second set of declarations.

3. The method of claim 2, wherein said view definition comprises at least some of said requests.

4. The method of claim 1, wherein at least some of said first set of declarations provide view configuration data.

5. The method of claim 1, wherein at least some of said second set of declarations provide view configuration data.

6. The method of claim 5, wherein said first set of declarations correspond to a first software system, and at least some of said second set of declarations are received from a second software system.

7. The method of claim 1, wherein said computer system comprises a server computer system and a personal computing device, wherein said server computer system comprises said storage, and wherein said rendering comprises:
presenting said view by said personal computing device.

8. The method of claim 7, wherein said view is presented by a web browser executing on said personal computing device.

9. The method of claim 8, wherein said rendering comprises: loading program code via said web browser.

10. The method of claim 9, wherein said rendering further comprises:
retrieving, via said program code, view configuration data from said server computer system; and
updating a document object model of said web browser for said view configuration data.

11. The method of claim 10, wherein said rendering further comprises:
retrieving, via said at least one script, updates to said view configuration data from said server computer system; and
updating said document object model of said web browser for said updates to said view configuration data.

12. The method of claim 10, wherein said rendering further comprises:
retrieving, via said at least one script, updates to form data from said server computer system; and
updating said document object model of said web browser for said updates to form data.

13. The method of claim 1, wherein said metadata data model is Resource Description Framework.

14. The method of claim 13, wherein said at least one request is specified in SPARQL.

15. A computer system for generating a view using a semantic form, comprising:
at least one processor;
storage accessible to said processor;
computer executable instructions executed by said at least one processor and causing said at least one processor to:
store, in said storage, a first set of declarations in a metadata data model retrieved from a view definition for said semantic form, said first set of declarations being for a first set of view configuration data specifying how a first part of a view is to be laid out, said first set of declarations being static and having a first set of semantic descriptions provided for said first set of view configuration data;
store, in said storage, a second set of declarations in said metadata data model that are associated with said first set of declarations for a second set of view configuration data specifying consistently both (a) a layout specifying how a second part of a view is to be laid out, and (b) data that is to be displayed according to said specified layout in said second part of said view, said second set of declarations being updatable and having a second set of semantic descriptions provided for said second set of view configuration data;
semantically resolve at least one request for a set of requested data to a subset of said first set of view configuration data and a subset of said second set of view configuration data using said semantic descriptions provided for said first and second sets of view configuration data and said requested data; and
update a view rendered from said subset of said first set of view configuration data and said subset of said second set of view configuration data whenever said subset of said second set of view configuration data, to which the at least one request for a set of requested data was semantically resolved, is updated, said first and second parts of said updated view being laid out according to said first and second sets of view configuration data respectively, and said updated view displaying at least one updated value of view configuration data in said subset of said second set of view configuration data.

16. The computer system of claim 15, wherein said first set of declarations identifies at least some of said set of requested data resolving to one of said second set of declarations.

17. The computer system of claim 16, wherein said view definition comprises at least some of said requests.

18. The computer system of claim 15, wherein at least some of said first set of declarations provide view configuration data.

19. The computer system of claim 15, wherein at least some of said second set of declarations provide view configuration data.

20. The computer system of claim 19, wherein said first set of declarations correspond to a first software system, and at least some of said second set of declarations are received from a second software system.

21. The computer system of claim 15, wherein said computer system comprises a server computer system having said storage, and a personal computing device presenting said view.

22. The computer system of claim 21, wherein said view is presented by a web browser executing on said personal computing device.

23. The computer system of claim 22, wherein said personal computing device loads program code from said server computer system.

24. The computer system of claim 23, wherein said personal computing device retrieves, via said at least one script, view configuration data from said server computer system, and updates a document object model of said web browser for said view configuration data.

25. The computer system of claim 24, wherein said personal computing device retrieves, via said at least one script, updates to said view configuration data from said server computer system, and updates said document object model of said web browser for said updates to said view configuration data.

26. The computer system of claim 24, wherein said personal computing device retrieves, via said at least one script, updates to form data from said server computer system, and updates said document object model of said web browser for said updates to said form data.

27. The computer system of claim 15, wherein said metadata data model is Resource Description Framework.

28. The computer system of claim 27, wherein said at least one request is specified in SPARQL.

29. A method for generating a view using a semantic form, comprising:
receiving, via a computer system, a static first set of declarations for a first set of view configuration data in a metadata data model from a view definition for said semantic form, said first set of declarations having a first set of semantic descriptions provided for said first set of view configuration data, said first set of view configuration data specifying how a first part of a view is to be laid out;
receiving, in said storage, a second set of declarations in said metadata data model that are associated with said first set of declarations for a second set of view configuration data, said second set of view configuration data specifying consistently both (a) a layout specifying how a second part of a view is to be laid out, and (b) data that is to be displayed according to said specified layout in said second part of said view, said second set of declarations being updatable and having a second set of semantic descriptions provided for said second set of view configuration data;
semantically resolving, via said computer system, at least one request for a set of requested data to a subset of said first set of view configuration data and said second set of view configuration data using said semantic descriptions provided for said first and second sets of view configuration data and said requested data; and
updating a view rendered from said subset of said first set of view configuration data and said second set of view configuration data whenever said second set of declarations, to which the at least one request for a set of requested data was semantically resolved, is updated, said first and second parts of said updated view being laid out according to said first and second sets of view configuration data respectively.

30. A computer system for generating a view using a semantic form, comprising:
at least one processor;
storage accessible to said processor;
computer executable instructions executed by said at least one processor and causing said at least one processor to:
receive, via a computer system, a static first set of declarations in a metadata data model from a view definition for said semantic form, said first set of declarations being for a first set of view configuration data specifying how a first part of a view is to be laid out, said first set of declarations having a first set of semantic descriptions provided for said first set of view configuration data;
receive, in said storage, a second set of declarations in said metadata data model that are associated with said first set of declarations for a second set of view configuration data specifying consistently both (a) a layout specifying how a second part of a view is to be laid out, and (b) data that is to be displayed according to said specified layout in said second part of said view, said second set of declarations being updatable and having a second set of semantic descriptions provided for said second set of view configuration data;
semantically resolve, via said computer system, at least one request for a set of requested data to a subset of said first set of view configuration data and said second set of view configuration data using semantic descriptions provided for said first and second sets of view configuration data and said requested data; and
update a view rendered from said subset of said first set of view configuration data and said second set of view configuration data whenever said second set of view configuration data, to which the at least one request for a set of requested data was semantically resolved, is updated, said first and second parts of said updated view being laid out according to said first and second sets of view configuration data respectively, and said updated view displaying at least one updated value of view configuration data in said second set of view configuration data.

31. A method for generating a view using a semantic form, comprising:
receiving, via a server computer system, a static first set of declarations for a first set of view configuration data in a metadata data model from a view definition for said semantic form said first set of declarations being for a first set of view configuration data specifying how a first part of a view is to be laid out, said first set of declarations having a first set of semantic descriptions provided for said first set of view configuration data;
receiving, via said server computer system, a second set of declarations in said metadata data model that are associated with said first set of declarations for a second set of view configuration data specifying consistently both (a) a layout specifying how a second part of a view is to be laid out, and (b) data that is to be displayed according to said specified layout in said second part of said view, said second set of declarations being updatable and having a second set of semantic descriptions provided for said second set of view configuration data;
semantically resolving, via said server computer system, at least one request for a set of requested data to a subset of said first set of view configuration data and said second set of view configuration data using semantic descriptions provided for said first and second sets of view configuration data and said requested data; and
transmitting, via said server computer system, an updated subset of said requested data to a personal computing device whenever said second set of view configuration data is updated.

32. The method of claim 31, further comprising:
updating a view rendered from said requested data on said personal computing device whenever said updated subset of said requested data is received from said server computer system.

33. The method of claim 32, wherein said first set of declarations identifies at least some of said set of requested data resolving to one of said second set of declarations.

34. The method of claim 33, wherein said view definition comprises at least some of said requests.

35. The method of claim 32, wherein at least some of said first set of declarations provide view configuration data.

36. The method of claim 32, wherein at least some of said second set of declarations provide view configuration data.

37. The method of claim 36, wherein said first set of declarations correspond to a first software system, and at least some of said second set of declarations are received from a second software system.

38. The method of claim 32, wherein said view is presented by a web browser executing on said personal computing device.

39. The method of claim 38, wherein said rendering comprises: loading, via said personal computing device, program code via said web browser.

40. The method of claim 39, wherein said rendering further comprises:
   retrieving, via said program code executed by said personal computing device, view configuration data from said server computer system; and
   updating a document object model of said web browser on said personal computing device for said view configuration data.

41. The method of claim 40, wherein said rendering further comprises:
   retrieving, via said program code executed by said personal computing device, updates to said view configuration data from said server computer system; and
   updating said document object model of said web browser on said personal computing device for said updates to said view configuration data.

42. The method of claim 41, wherein said rendering further comprises:
   retrieving, via said program code executing on said personal computing device, updates to form data from said server computer; and
   updating said document object model of said web browser on said personal computing device for said updates to said form data.

43. The method of claim 32, wherein said metadata data model is Resource Description Framework.

44. The method of claim 33, wherein said at least one request is specified in SPARQL.

* * * * *